United States Patent
Hayashi

(10) Patent No.: US 10,671,226 B2
(45) Date of Patent: Jun. 2, 2020

(54) DISPLAY DEVICE AND ELECTRONIC DEVICE

(71) Applicant: Japan Display Inc., Tokyo (JP)

(72) Inventor: Makoto Hayashi, Tokyo (JP)

(73) Assignee: Japan Display inc., Tokyo (JP)

( * ) Notice: Subject to any disclaimer, the term of this patent is extended or adjusted under 35 U.S.C. 154(b) by 44 days.

(21) Appl. No.: 15/940,085

(22) Filed: Mar. 29, 2018

(65) Prior Publication Data

US 2018/0224970 A1    Aug. 9, 2018

Related U.S. Application Data

(62) Division of application No. 14/189,033, filed on Feb. 25, 2014, now abandoned.

(30) Foreign Application Priority Data

Mar. 22, 2013  (JP) ................. 2013-060914

(51) Int. Cl.
*G06F 3/044*  (2006.01)
*G06F 3/041*  (2006.01)

(52) U.S. Cl.
CPC ............ *G06F 3/044* (2013.01); *G06F 3/0412* (2013.01); *G06F 3/0416* (2013.01)

(58) Field of Classification Search
CPC ....... G06F 3/044; G06F 3/0412; G06F 3/0416
See application file for complete search history.

(56) References Cited

U.S. PATENT DOCUMENTS

| | | |
|---|---|---|
| 2007/0074914 A1 | 4/2007 | Geaghan |
| 2010/0182273 A1 | 7/2010 | Noguchi et al. |
| 2010/0295814 A1 | 11/2010 | Kent |
| 2010/0309162 A1* | 12/2010 | Nakanishi ............... G06F 3/044 345/174 |
| 2012/0044195 A1 | 2/2012 | Nakanishi |
| 2012/0075239 A1 | 3/2012 | Azumi |
| 2012/0218482 A1 | 8/2012 | Hwang |
| 2015/0153767 A1 | 6/2015 | Nakayama et al. |

FOREIGN PATENT DOCUMENTS

| | | |
|---|---|---|
| JP | 2009-244958 | 10/2009 |
| WO | 2014/045604 | 3/2014 |

OTHER PUBLICATIONS

Japanese Office Action dated Mar. 22, 2016 in corresponding Japanese Application No. 2013-060914.

* cited by examiner

*Primary Examiner* — Wing H Chow
(74) *Attorney, Agent, or Firm* — K&L Gates LLP

(57) ABSTRACT

A touch-sensor-equipped display device has: a panel unit including a screen area in which units of detection constituting a touch-sensor function and pixels constituting a display function are formed in a matrix pattern; a plurality of shared electrodes which are formed in the screen area, parallel to an X-direction, and for both display drive and touch drive; a plurality of common electrodes for display drive which are parallel to the X-direction and respectively alternately disposed with the plurality of respective shared electrodes in a Y-direction; a plurality of detection electrodes which are parallel to the Y-direction and intersecting with the plurality of shared electrodes and the plurality of common electrodes; and the units of detection corresponding to respective capacitors formed by intersections of the plurality of shared electrodes and the plurality of detection electrodes.

8 Claims, 36 Drawing Sheets

DISPLAY DEVICE AND ELECTRONIC DEVICE

CROSS REFERENCES TO RELATED APPLICATIONS

The present application is a divisional of U.S. patent application Ser. No. 14/189,033, filed on Feb. 25, 2014, which application claims priority to Japanese Priority Patent Application JP 2013-060914 filed in the Japan Patent Office on Mar. 22, 2013, the entire content of which is hereby incorporated by reference.

BACKGROUND

The present invention relates to techniques of a display device, an electronic device, etc. provided with a touch-sensor function.

Various electronic devices and display devices such as smartphones are equipped with a touch-sensor device (also referred to as a touch panel) as input means. Examples of the touch-sensor device include a touch-sensor device of a capacitive type, etc. Examples of the touch-sensor device include a touch-sensor-equipped display device in which electrodes constituting the touch-sensor function are built in a display panel. Note that the touch-sensor-equipped display device in which the electrodes constituting the touch-sensor function is built in the display panel is also referred to as an in-cell-type touch-sensor-equipped display device. Also, examples of the touch-sensor-equipped display device include a touch-sensor-equipped display device in which the touch-sensor device of the capacitive type is applied to a liquid-crystal display device.

The touch-sensor device of the capacitive type has drive electrodes and detection electrodes as the electrodes which compose the touch-sensor function. In the touch-sensor device, in a surface serving as a touch detection area, for example, the plurality of drive electrodes are parallel to an in-plane horizontal direction, the plurality of detection electrodes are parallel to an in-plane perpendicular direction, and the pairs of the drive electrodes and the detection electrodes mutually intersect, with a distance therebetween, in the perpendicular direction of the surface of the touch detection area. The intersections of the pairs of the drive electrodes and the detection electrodes form capacitors corresponding to units of touch detection. Note that, for the sake of explanation, the units of the touch detection will be referred to as units of detection. In the touch-sensor device, the plurality of units of detection are formed in a matrix pattern in the touch detection area.

The touch-sensor device has a circuit unit connected to the above-described drive electrodes and the detection electrodes. The circuit unit inputs touch-drive signals to the drive electrodes and detects the signals, which are output from the detection electrodes through the units of detection based on the signals. When the capacitance(s) at the unit(s) of detection is changed by a touch with a conductor such as a finger with respect to the surface of the touch detection area, the circuit unit detects the change of the capacitance as an electric signal. As a result, the touch-sensor device can detect the presence/absence, position, etc. of the touch to the touch detection area.

The in-cell-type touch-sensor-equipped display device, for example, has a configuration in which at least one of the drive electrodes and the detection electrodes, for example, the drive electrodes serving as the electrodes constituting the above-described touch-sensor function are built in the liquid-crystal display panel unit. The in-cell-type touch-sensor-equipped display device of this configuration, for example, has electrodes made by integrating common electrodes and the above-described drive electrodes of liquid-crystal display in a TFT (thin-film transistor) board and has the above-described detection electrodes in a color filter board.

As a drive method, for example, a method in which a display period of a display function of the liquid-crystal display and a touch detection period of the touch-sensor function are separated in terms of time to carry out drive is used to the above-described in-cell-type touch-sensor-equipped display device. The drive method using this time division has an advantage that the influence of noise generated from the liquid-crystal display panel unit in the display period does not easily affect the device in the touch detection period.

Conventional technique examples related to the above-described touch-sensor-equipped display device include Japanese Patent Application Laid-Open No. 2009-244958 (Patent Document 1). In Patent Document 1, a configuration example of an in-cell-type touch-sensor-equipped liquid-crystal display device is described.

SUMMARY

As a problem related to the touch drive time, which is time for subjecting the drive electrodes to touch drive for the touch-sensor function, and to the touch detection period, which is a period ensuring the touch drive time, a display device such as the above-described in-cell-type touch-sensor-equipped display device is required to shorten the time.

In the case of the in-cell-type touch-sensor-equipped display device, if the method in which the display period and the touch detection period described above are driven by time division is used, it is difficult to ensure a long time as a matter of design of the touch detection period. More specifically, in the case of the in-cell-type touch-sensor-equipped display device, for example along size expansion of a display area, resolution increase, size expansion of the touch detection area, or density increase of the arrangement of the units of detection, it becomes difficult to ensure the display period and the touch detection period having required lengths in a frame period having a predetermined length.

The display device such as the in-cell-type touch-sensor-equipped display device has the following problems related to shortening of the time. An in-cell-type touch-sensor-equipped display device of a comparative example has a configuration in which the above-described electrodes integrating the common electrodes and the drive electrodes are built in a TFT substrate of a liquid-crystal display panel unit. As a drive method corresponding to this configuration, the above-described method of driving the display period and the touch detection period by time division is used to the in-cell-type touch-sensor-equipped display device of the comparative example. In the in-cell-type touch-sensor-equipped display device of the comparative example, the loads at the paths including the capacitors serving as the units of detection formed by the intersections of the pairs of the drive electrodes and the detection electrodes are high. In the in-cell-type touch-sensor-equipped display device of the comparative example, the touch drive time of the drive electrodes becomes long in accordance with the above-described loads of the paths. When the touch drive time of each of the drive electrodes becomes long, the touch detection period, which is the period including the touch drive time of the plurality of drive electrodes of the touch detection area, becomes long.

A problem of loads of paths upon touch drive and touch detection in the in-cell-type touch-sensor-equipped display device of the above-described comparative example will be explained. In the in-cell-type touch-sensor-equipped display device of the comparative example shown in FIG. 37, capacitors Cx are formed by intersections of drive electrodes Tx and detection electrodes Rx. Units of detection Ux are formed by the capacitors Cx. FIG. 37 briefly shows an equivalent circuit and loads about the paths including the drive electrodes Tx, the units of detection Ux, and the detection electrodes Rx. A touch detection area 933 has the plurality of capacitors Cx formed to respectively correspond to the intersecting portions of the pairs of the plurality of drive electrodes Tx and the plurality of detection electrodes Rx. FIG. 37 briefly shows only one of the capacitors Cx formed by the intersection of the single drive electrode Tx and the single detection electrode Rx.

One of path parts 934 in a touch detection area 933 includes the drive electrode Tx, the detection electrode Rx, and the unit of detection (detection unit) Ux formed by the capacitor Cx formed in the vicinity of the intersecting portion of the drive electrode Tx and the detection electrode Rx. The whole paths including the above-described path part 934 include wirings 901, the drive electrodes Tx, the capacitors Cx or the unit of detection Ux, the detection electrodes Rx, and wirings 902. The wiring 901 is formed on a first board structure 931 and connects the part between the drive electrode Tx of the touch detection area 933 and a circuit of a touch drive unit 950. The wiring 902 is formed on a second board structure 932 and connects the part between the detection electrode Rx of the touch detection area 933 and a circuit of a touch detection part 960.

Upon the touch drive at the above-described path, a signal for touch drive from the touch drive unit 950 is applied to the drive electrode Tx of the touch detection area 933 through the wiring 901. In the path part 934 of the touch detection area 933, the signal is transmitted through the drive electrode Tx and transmitted to the detection electrode Rx via the respective capacitor Cx of the unit of detection Ux. Then, the signal transmitted through the detection electrode Rx is input to and detected by the touch detection part 960 through the wiring 902.

The loads in the whole paths upon the above-described touch drive and touch detection includes first loads 911 and second loads 912, which are present in the drive electrodes Tx and the wirings 901, and loads 921, which are present in the detection electrodes Rx and the wirings 902. The first load 911 includes the load of the wiring connected to a first end of the drive electrode Tx of the touch detection area 933 among the wirings 901, and the second load 912 includes the load of the wiring connected to a second end of the drive electrode Tx. The first load 911 has a capacitor C11 and a resistance R11. The second load 912 has a capacitor C12 and a resistance R12. The load 921 of the detection electrode Rx and the wiring 902 thereof has a capacitor C13 and a resistance R13.

Upon the touch drive and touch detection in the above-described paths, each of the capacitors Cx per se of the path parts 934 in the touch detection area 933 works as a corresponding load with respect to the signal transmitted on the path. In the path parts 934, the capacitors Cx of the intersecting portions, which serve as detection targets with respect to the signals transmitted through the path parts 934, and the other capacitors Cx, which are intermediate pathways and not serving as detection targets at the plurality of intersecting portions, are present. In the path parts 934, the plurality of capacitors Cx not serving as the detection targets are applied as loads to the signals which pass through the capacitors Cx serving as the detection targets.

Upon the touch drive in the paths including the above-described path parts 934, the plurality of capacitors Cx not serving as the detection targets are applied as loads to the signals, which pass through the capacitors Cx serving as the detection targets; therefore, touch drive time corresponding to the level of the loads is needed.

It is a preferred aim of the present invention to provide techniques with which touch drive time and a touch detection period can be shortened by reducing the loads in paths including the capacitors formed by the intersections of the drive electrodes and detection electrodes in relation to a touch-sensor-equipped display device. It is another preferred aim of the present invention to provide techniques with which the sensitivity of touch detection can be maintained or improved together with the shortening of the above-mentioned touch drive time and touch detection period.

Typical embodiments of the present invention relates to a display device provided with a touch-sensor function, an electronic device provided with the display device, etc., having the configurations as described in the following.

(1) A display device according to an embodiment includes: a panel unit including a screen area in which units of detection composing a touch-sensor function and pixels composing a display function are formed in a matrix pattern; a plurality of drive electrodes which are formed in the screen area, parallel to a first direction, and for both display drive and touch drive; a plurality of common electrodes for display drive which are formed in the screen area, parallel to the first direction, and respectively alternately disposed with the plurality of respective drive electrodes in a second direction intersecting with the first direction; a plurality of detection electrodes which are formed in the screen area, parallel to the second direction, and intersect with the plurality of drive electrodes and the plurality of common electrodes; and the units of detection corresponding to respective capacitors formed by intersections of the plurality of drive electrodes and the plurality of detection electrodes.

(2) A width of each of the plurality of drive electrodes in the second direction is larger than a width of each of the plurality of detection electrodes in the first direction and is the same as a width of each of the plurality of common electrodes in the second direction. Alternatively, a width of each of the plurality of drive electrodes in the second direction is larger than the width of the plurality of detection electrodes in the first direction and is smaller than a width of each of the plurality of common electrodes in the second direction. Still alternatively, a width of each of the plurality of drive electrodes in the second direction is larger than a width of each of the plurality of detection electrodes in the first direction and is larger than a width of each of the common electrodes in the second direction.

(3) In the screen area, the plurality of drive electrodes and the plurality of common electrodes are formed in a same layer in a third direction perpendicular to the screen area; and the plurality of drive electrodes are respectively juxtaposed with the plurality of respective common electrodes with a constant interval therebetween.

(4) Each of the plurality of drive electrodes has a thin wiring part extending in the first direction and intersecting with the detection electrode, and a protruding electrode portion protruding from the thin wiring part to the second direction in a region not intersecting with the detection electrode.

(5) Each of the plurality of common electrodes has a thin wiring part extending in the first direction, and a protruding electrode portion protruding from the thin wiring part to the second direction in a region intersecting with the detection electrode.

(6) In the screen area, the plurality of drive electrodes and the plurality of common electrodes are formed in a same layer in a third direction perpendicular to the screen area; and the plurality of drive electrodes are respectively juxtaposed with the plurality of respective common electrodes with a constant interval therebetween.

(7) Each of the plurality of drive electrodes has a plurality of electrode portions provided to be mutually separated in a region not intersecting with the detection electrode in the first direction, and a wiring part which extends in the first direction and couple the plurality of electrode portions to a region thereof intersecting with the detection electrode.

(8) The plurality of common electrodes formed in the screen area is formed as an integrated common electrode in the screen area by connection in the second direction with thin line portions provided between the plurality of electrode portions in the plurality of drive electrodes, and has a plurality of opening portions corresponding to positions at which the plurality of electrode portions are respectively disposed.

(9) In the screen area, the plurality of electrode portions of the plurality of drive electrodes and the integrated common electrode are formed in a same layer in a third direction perpendicular to the screen area; and the plurality of electrode portions of the plurality of drive electrodes are disposed respectively in the plurality of opening portions of the integrated common electrode with a constant interval.

(10) The plurality of electrode portions are formed of a first electrically conductive material; and the wiring part is formed of a second electrically conductive material having a resistance lower than that of the first electrically conductive material.

(11) The wiring part is provided in a first layer in a third direction perpendicular to the screen area; the wiring part has a plurality of wirings parallel to the first direction; the plurality of electrode portions are provided in a second layer in the third direction; and, in each of the plurality of drive electrodes, each of the plurality of electrode portions and the plurality of wirings of the wiring part are coupled to each other by a contact connecting portion in the third direction. The electrode portion is provided above the wiring part in the third direction. Alternatively, the wiring part is provided above the electrode portion in the third direction.

(12) The plurality of detection electrodes are formed of thin line portions disposed at a constant pitch in the first direction. Alternatively, the plurality of detection electrodes are disposed at a constant pitch in the first direction; and each of the plurality of detection electrodes is formed of a thin line portion branched into two in the screen area. Still alternatively, each of the plurality of detection electrodes has, at a position overlapped with the common electrode in a third direction perpendicular to the screen area, a protruding electrode portion protruding in the first direction from the thin line portion extending in the second direction.

(13) In the display device according to the embodiment, the panel unit has a first board structure in which the plurality of drive electrodes and the plurality of common electrodes are formed; a second board structure in which the plurality of detection electrodes are formed; and a display function layer which is provided between the first board structure and the second board structure and is controlled by the pixels in order to display an image. For example, the display function layer is a liquid crystal layer.

(14) A display device according to an embodiment further includes: a first circuit unit which applies touch-drive signals to the plurality of drive electrodes in the screen area; a second circuit unit which applies display-drive signals to the plurality of drive electrodes and the plurality of common electrodes of the screen area; a third circuit unit which applies a display-drive signal to the matrix of the pixels of the screen area; and a fourth circuit unit which detects a touch-detection signal based on the touch-drive signals from the plurality of detection electrodes of the screen area.

(15) In a period corresponding to the display function, the second circuit unit applies a signal of a first voltage to the plurality of drive electrodes and the plurality of common electrodes in the screen area, and the third circuit unit applies the display-drive signal to the matrix of the pixels; and, in a period corresponding to the touch-sensor function, the first circuit unit applies the touch-drive signals to the plurality of drive electrodes of the screen area, and the fourth circuit unit detects the touch-detection signal from the plurality of detection electrodes of the screen area.

(16) In the period corresponding to the touch-sensor function, the second circuit unit applies the signal of the first voltage to the plurality of common electrodes of the screen area.

(17) In the period corresponding to the touch-sensor function, the second circuit unit causes the plurality of common electrodes of the screen area to be in a high-impedance state.

(18) In the period corresponding to the touch-sensor function, the second circuit unit applies a signal of a second voltage different from the first voltage to the plurality of common electrodes of the screen area.

(19) In the period corresponding to the touch-sensor function, the first circuit unit applies the touch-drive signals sequentially to the plurality of drive electrodes of the screen area taking the single drive electrode as a unit of scanning. Alternatively, in the period corresponding to the touch-sensor function, the first circuit unit applies the touch-drive signals sequentially to the plurality of drive electrodes of the screen area taking two or more drive electrodes thereof as a unit of scanning.

(20) In the period corresponding to the touch-sensor function, the first circuit unit applies the touch drive signals to at least one of the drive electrodes serving as a scanning target among the plurality of drive electrodes of the screen area and causes the other drive electrodes to be in a high-impedance state at the same time.

(21) An electronic device according to an embodiment includes a control part which carries out control related to the touch-sensor function and control related to the display function with respect to the display device and acquires touch detection information from the touch-sensor function.

According to the typical embodiments of the present invention, in relation to the touch-sensor-equipped display device, the touch drive time and the touch detection period can be shortened by reducing the loads in the paths including the capacitors formed by the intersections of the drive electrodes and the detection electrodes. Moreover, according to the typical embodiments of the present invention, the sensitivity of the touch detection can be maintained or improved together with the shortening of the above-mentioned touch drive time and the touch detection period.

Additional features and advantages are described herein, and will be apparent from the following Detailed Description and the figures.

DETAILED DESCRIPTION

Embodiments of the present application will be described below in detail with reference to the drawings. In all the drawings for explaining the embodiments, the same parts are basically denoted by the same symbols, and repeated explanations thereof will be omitted. Moreover, in order to facilitate understanding, cross-sectional hatching will be appropriately omitted. For the sake of explanation, as the directions constituting planes such as a touch detection area in a device, an in-plane horizontal direction is an X-direction, an in-plane perpendicular direction is a Y-direction, a direction perpendicular to the plane of, for example, the touch detection area formed by the X-direction and the Y-direction or the thickness direction of the device is a Z-direction.

<Outlines, Etc.>

Outlines of the configurations of a touch-sensor-equipped display device of the present embodiment are shown in later-described FIG. 5, FIG. 20, FIG. 23, etc. The touch-sensor-equipped display device of the present embodiment is an in-cell-type touch-sensor-equipped display device applied to a liquid-crystal display device. The touch-sensor-equipped display device of the present embodiment reduces loads in the paths including capacitors formed by intersections of shared electrodes and detection electrodes by the configuration in which arrangements are made in the shapes of the shared electrodes, which are elements constituting a display function and a touch-sensor function. Since the loads of the paths are reduced, touch drive time and a touch detection period are shortened.

Figure 1:
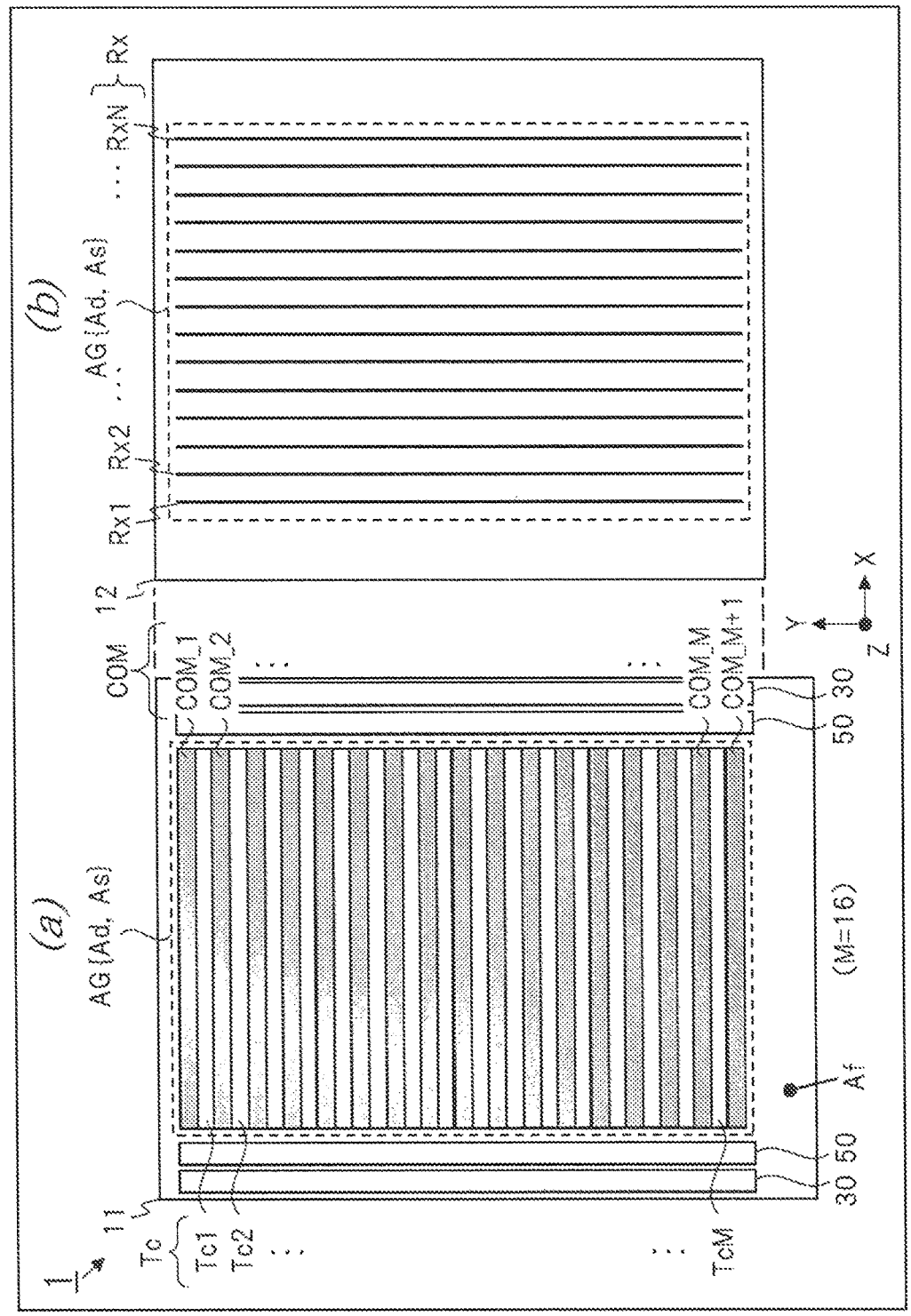
FIG. 1 includes diagrams (a) and (b) each showing an outline of a configuration of a TFT substrate in an XY-plane of a panel unit in a touch-sensor-equipped display device of an embodiment 1A of the present invention.
Figure 5:
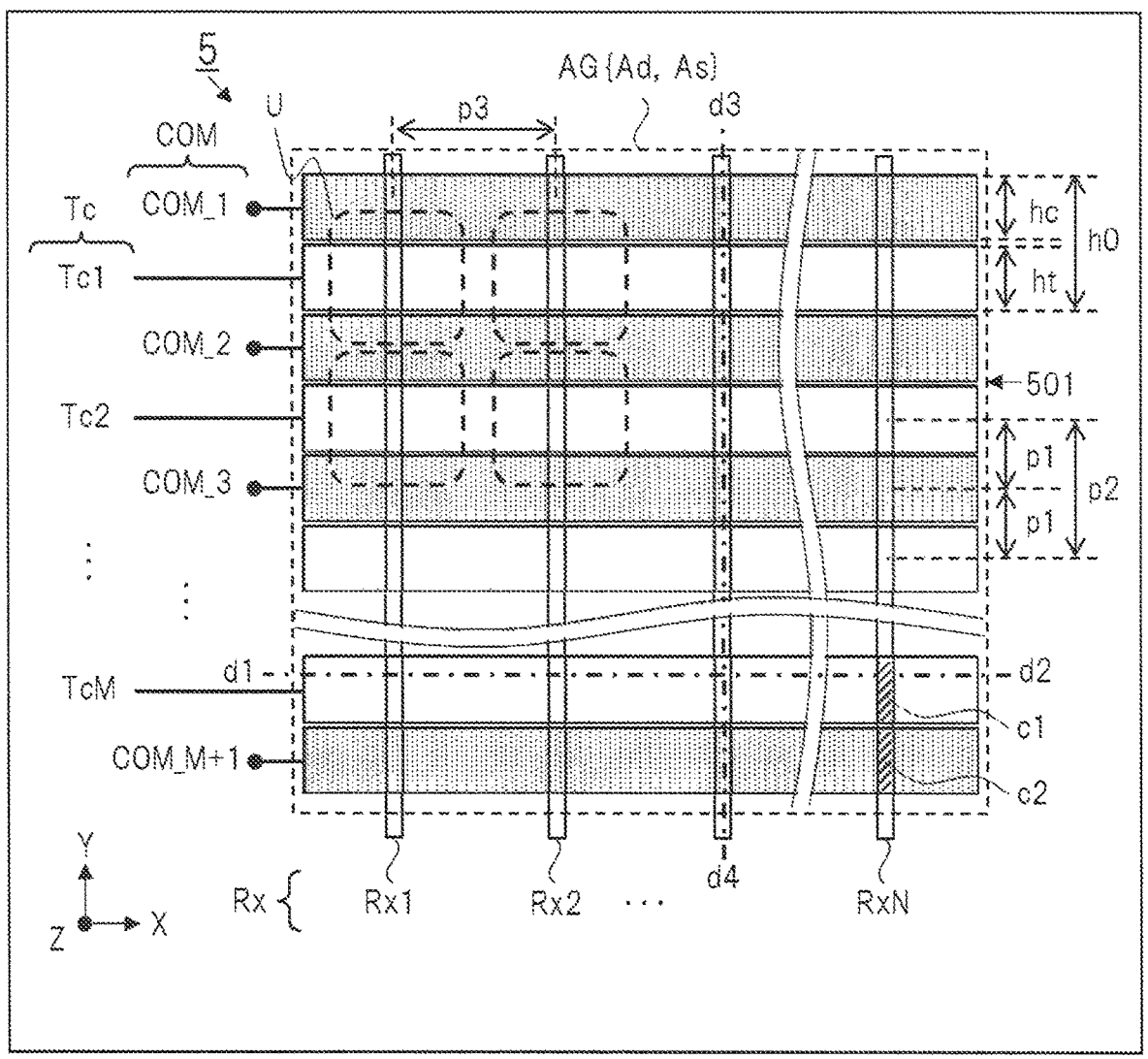
FIG. 5 is a drawing showing a configuration of an XY-plane related to electrodes of a screen area of the touch-sensor-equipped display device of the embodiment 1A.

As the configuration in which the arrangements are made in the shapes of the shared electrodes, the touch-sensor-equipped display device of the present embodiment has a configuration provided with the plurality of shared electrodes in necessary partial regions in a screen area and provided with a plurality of common electrodes in other partial regions as shown in FIG. 1, FIG. 5, etc. instead of a configuration in which the shared electrodes are provided in all the regions in the screen area. Moreover, as a drive method corresponding to the configuration of the arranged electrode shapes, the touch-sensor-equipped display device of the present embodiment has a configuration in which the states of the electric potentials of the above-described plurality of shared electrodes and the plurality of common electrodes are suitably controlled in a touch detection period as shown in later-described FIG. 8, etc. As a result, the loads of the above-described paths are reduced.

Comparative Example

Figure 37:
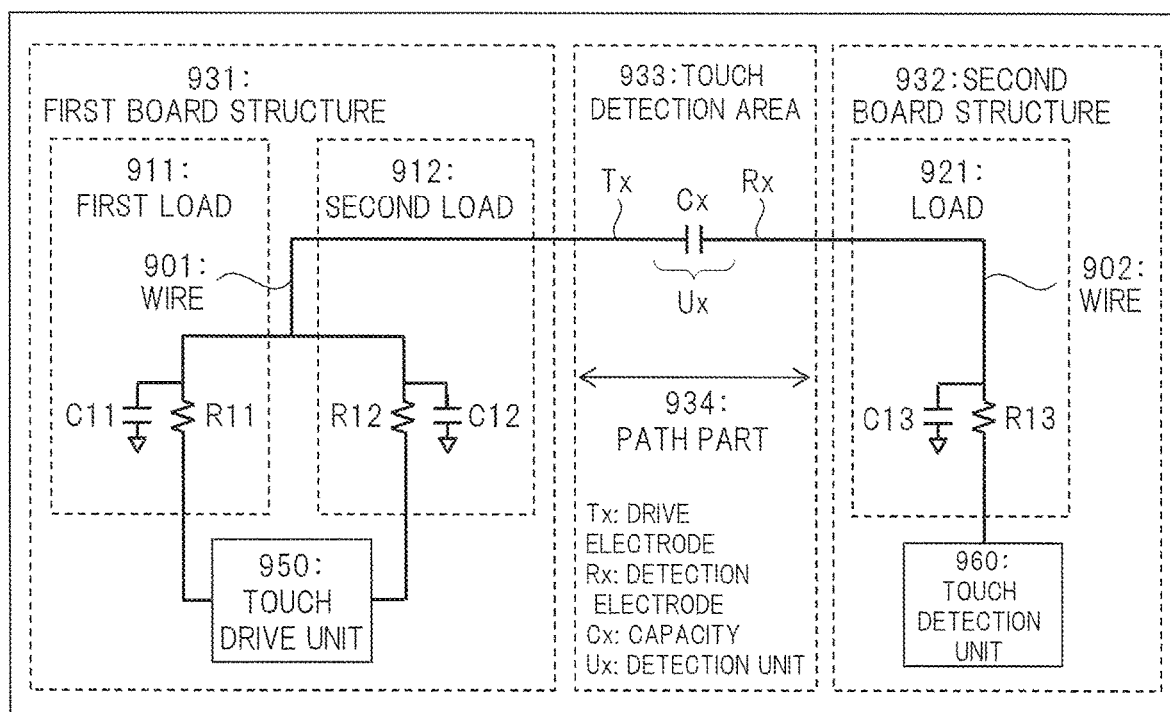
FIG. 37 is a drawing briefly showing an equivalent circuit and loads about a path including a capacity constituting a unit of detection in an in-cell-type touch-sensor-equipped display device of a comparative example.
Figure 38:
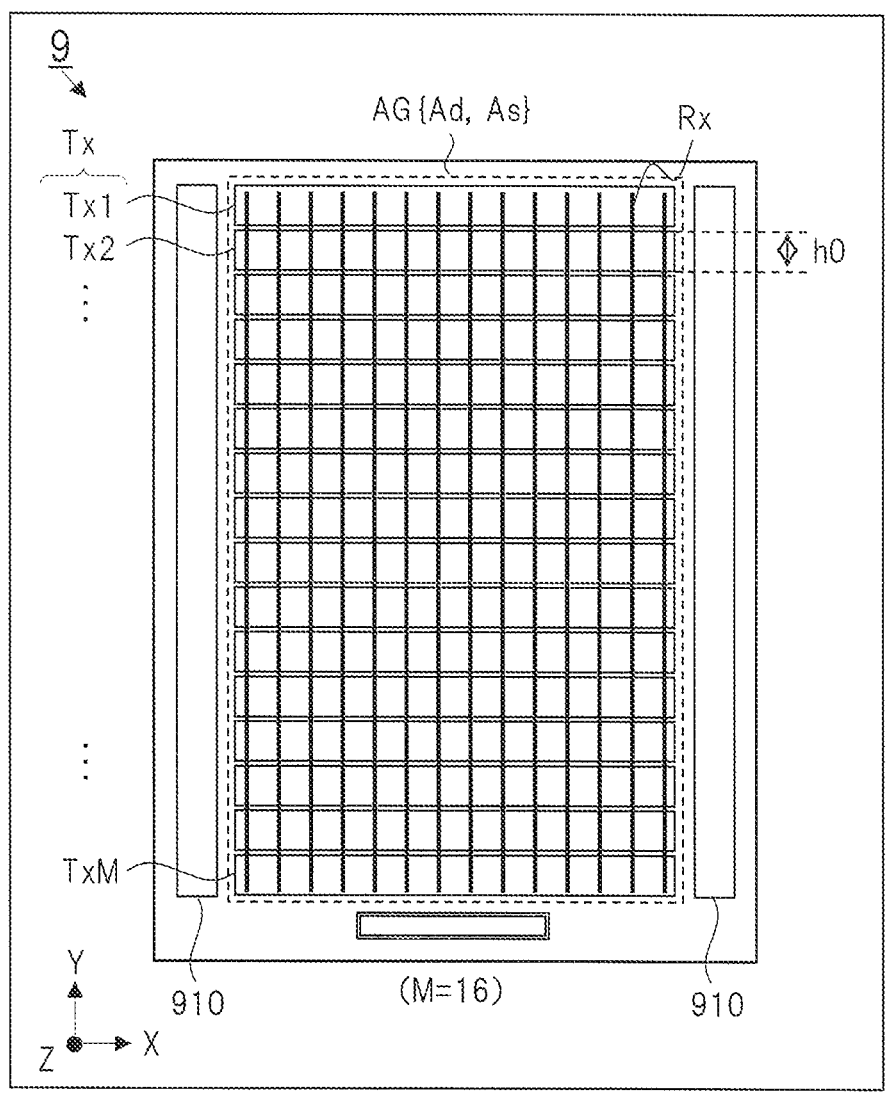
FIG. 38 is a drawing showing a configuration example of electrodes, etc. in the in-cell-type touch-sensor-equipped display device of the comparative example.

FIG. 38 shows a configuration example of electrodes, etc. in an in-cell-type touch-sensor-equipped display device 9 of a comparative example of the present embodiment in order to understandably explain the present embodiment. The in-cell-type touch-sensor-equipped display device 9 of the comparative example has a configuration in which a plurality (assumed to be M) of drive electrodes Tx corresponding to the drive electrodes Tx of above-described FIG. 37 are built in a panel unit thereof. The drive electrodes Tx are shared electrodes, which integrate and share common electrodes for liquid-crystal display and drive electrodes for touch drive. As a drive method corresponding to an in-cell type, the method in which a display period and a touch detection period are driven by time division is used for the in-cell-type touch-sensor-equipped display device 9 of the comparative example.

In the in-cell-type touch-sensor-equipped display device 9 of the comparative example, in a screen area AG on an XY-plane of a panel unit thereof, the plurality of drive electrodes Tx are formed to be parallel to the X-direction, and a plurality of detection electrodes Rx are formed to be parallel to the Y-direction. Capacitors which respectively serve as units of detection are formed by the intersections of the pairs of the drive electrodes Tx and the detection electrodes Rx. The screen area AG is an area in which a display area Ad and a touch detection area As are overlapped with each other.

In the in-cell-type touch-sensor-equipped display device 9 of the comparative example, the Y-direction width of the screen area AG is divided into a plurality of parts to form the M drive electrodes Tx (M is a number). Each of the drive electrodes Tx is formed as a rectangular flat-plate-like block which has a constant Y-direction width of h0 and is long in the X-direction. FIG. 38 shows the M drive electrodes Tx as a drive electrode Tx1 to a drive electrode TxM. FIG. 38 shows an example in which M=16. The plurality of detection electrodes Rx are formed of thin wirings, and the disposing pitch thereof in the X-direction is constant.

Ends of the plurality of drive electrodes Tx of the screen area AG are connected to a drive unit 910 provided in a peripheral area of the screen area AG. The drive unit 910 is a circuit unit including the touch drive unit 950 of FIG. 37 and subjects the plurality of drive electrodes Tx in the screen area AG to touch drive and common drive.

The configuration of the in-cell-type touch-sensor-equipped display device 9 of the comparative example is, in other words, a configuration in which a common electrode formed on the entire surface of a display area of a conventional liquid-crystal display panel unit is divided into a plurality of parts in the Y-direction, which serve as the plurality of drive electrodes Tx which can be individually driven.

Embodiment 1A

A touch-sensor-equipped display device 1 of an embodiment 1A of the present invention will be explained by using FIG. 1 to FIG. 12, etc. The touch-sensor-equipped display device 1 is an in-cell-type touch-sensor-equipped display device, which is particularly applied to a liquid-crystal display device. As shown in FIG. 1, FIG. 5, etc., the touch-sensor-equipped display device 1 of the embodiment 1A has a configuration in which arrangements are made in the shapes of shared electrodes of a screen area AG with respect to the configuration of the electrodes of the in-cell-type touch-sensor-equipped display device 9 of the comparative example of FIG. 38. As the configuration, the embodiment 1A has a plurality of shared electrodes Tc and a plurality of common electrodes COM, which are divided in the Y-direction of the screen area AG, and has a configuration in which the shared electrodes Tc and the common electrodes COM are alternately disposed in the Y-direction. By virtue of this configuration, the area of the intersecting portions of the shared electrodes Tc, which serve as drive electrodes, and the detection electrodes Rx is small compared with the comparative example; therefore, loads in the paths including the capacitors formed by the intersections of the shared electrodes Tc and the detection electrodes Rx are reduced.

Moreover, in the embodiment 1A, as shown in later-described FIG. 8, as a drive method for the configuration of the above-described electrode shapes, in a touch detection period Ks, the common electrodes COM of the screen area AG are controlled to an electric potential using a fixed common voltage Vcom. The drive method of the embodiment 1A is referred to as a first drive method for the sake of explanation. By virtue of this configuration, the above-described loads in the paths are reduced.

[Plane Configuration of Panel Unit]

FIG. 1 shows an outline of a configuration of an XY-plane of a panel unit in the touch-sensor-equipped display device 1 of the embodiment 1A. Schematically, the panel unit of the touch-sensor-equipped display device 1 has a TFT substrate 11 of a diagram (a) in FIG. 1 and a color filter board 12 of a diagram (b) in FIG. 1, which are two board structures overlapped with each other in the Z-direction. The diagram (a) in FIG. 1 shows a configuration in which the TFT substrate 11, which is a first board structure disposed in a Z-direction lower side, includes the shared electrodes Tc and the common electrodes COM. The diagram (b) in FIG. 1 shows a configuration in which the color filter board 12, which is a second board structure disposed in a Z-direction upper side, includes the detection electrodes Rx. Details of the panel unit will be shown with reference to later-described FIG. 6, etc.

The XY-plane of the panel unit has the screen area AG and a peripheral area Af including upper/lower/left/right areas outside of the screen area AG. The screen area AG is an area including a display area Ad of a display function and a touch detection area As of a touch-sensor function and an area in which the display area Ad and the touch detection area As are overlapped with each other in the Z-direction. The shapes of the panel unit and the screen area AG are rectangles which are long in the Y-direction in FIG. 1.

In the screen area AG, in the TFT substrate 11 side, instead of the drive electrodes Tx of the comparative example, the M shared electrodes Tc and the M+1 common electrodes COM parallel to the X-direction are formed. In the screen area AG, on the color filter board 12 side, the plurality (assumed to be N; N is a number) of detection electrodes Rx parallel to the Y-direction are formed. The M shared electrodes Tc are shown as a shared electrode Tc1 to a shared electrode TcM sequentially from the upper side of the Y-direction. The M+1 shared electrodes Tc are shown as a common electrode COM_1 to a common electrode COM_M+1 sequentially from the upper side of the Y-direction. The N detection electrodes Rx are shown as a detection electrode Rx1 to a detection electrode RxN sequentially from the left side of the X-direction. Note that FIG. 1 shows an example in which M=16.

The shared electrodes Tc are electrodes which integrate common electrodes for common drive constituting the display function of liquid-crystal display and drive electrodes for touch drive constituting the touch-sensor function and are shared by these functions. The common electrodes COM are electrodes for common drive constituting the display function of liquid-crystal display. In the screen area AG, the plurality of shared electrodes Tc are extended to be parallel to the X-direction and juxtaposed in the Y-direction interposing the common electrodes COM therebetween, and the plurality of common electrodes COM are extended to be parallel to the X-direction and juxtaposed in the Y-direction interposing the shared electrodes Tc therebetween. The plurality of detection electrodes Rx are extended to be parallel to the Y-direction and are juxtaposed in the X-direction. The shared electrodes Tc and the common electrodes COM intersect with the detection electrodes Rx with predetermined distances in the Z-direction, wherein they are orthogonal to each other particularly in the X-direction and the Y-direction.

In the peripheral area Af, wirings, circuit units, etc. connected to the electrodes of the screen area AG are formed. In the diagram (a) of FIG. 1, the TFT substrate 11 has a liquid-crystal display drive unit 30 and a drive unit 50 as circuit units mounted in the X-direction on left/right both sides of the peripheral area Af. The liquid-crystal display drive unit 30 is a circuit unit which drives pixels of the display area Ad and includes a gate-line drive unit 151, etc. of FIG. 3, which will be described later. The drive unit 50 is a circuit unit which is connected to the plurality of shared electrodes Tc and the plurality of common electrodes COM of the screen area AG and drives these electrodes. The drive unit 50 carries out common drive and touch drive of the plurality of shared electrodes Tc and common drive of the plurality of shared electrodes COM.

Mounting Configuration Example

Figure 2:
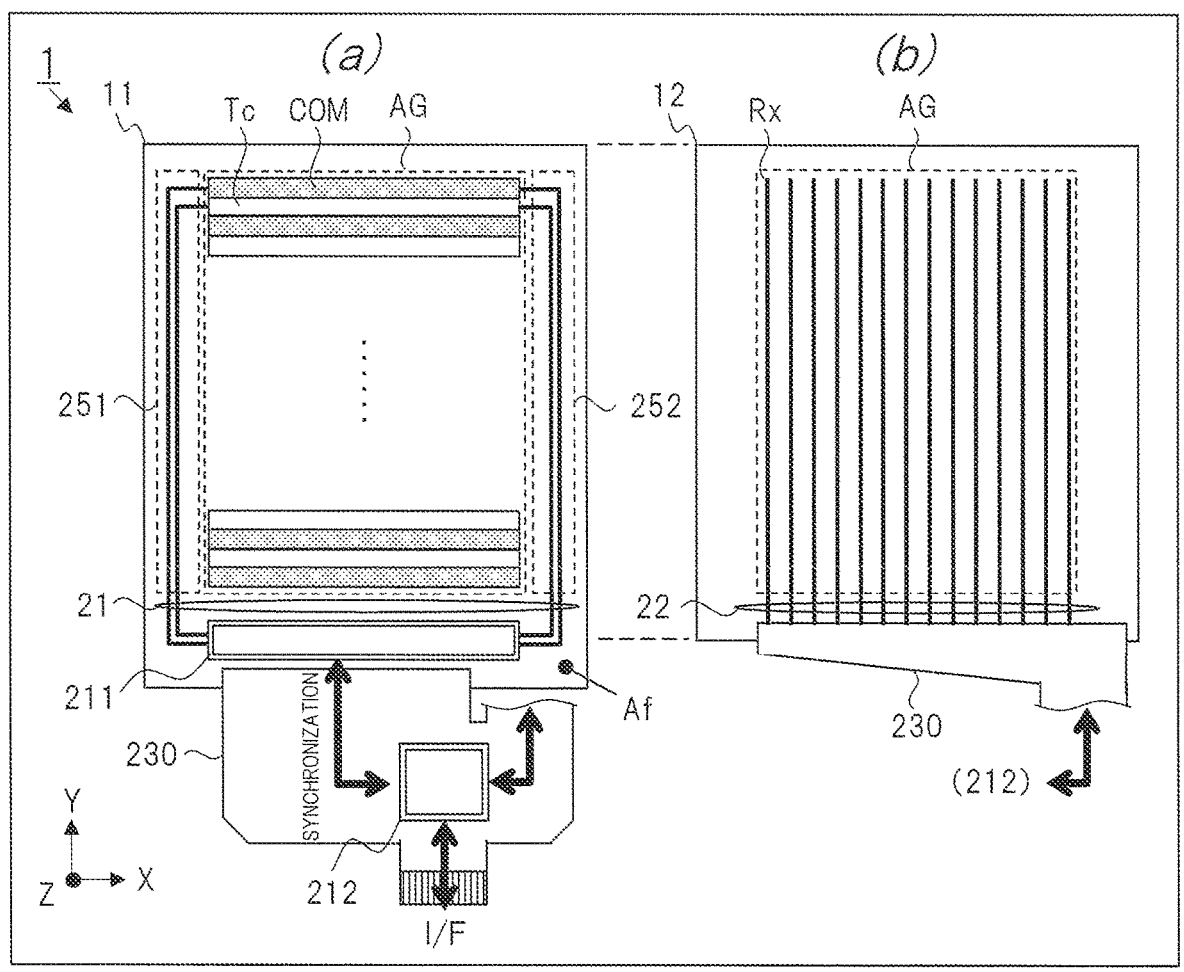
FIG. 2 includes diagrams (a) and (b) each showing a mounting configuration example of the touch-sensor-equipped display device of the embodiment 1A.

FIG. 2 includes diagrams (a) and (b) showing a mounting configuration example of the touch-sensor-equipped display device 1 corresponding to FIG. 1. The diagram (a) in FIG. 2 shows the mounting configuration example of the TFT substrate 11 side, and the diagram (b) in FIG. 2 shows the mounting configuration example of the color filter board 12 side. In the TFT substrate 11, the plurality of shared electrodes Tc and the plurality of common electrodes COM of the screen area AG are connected to the drive unit 50 and a first IC chip 211 through a plurality of wirings 21. A region 251 and a region 252, which are regions in X-direction on left/right both sides of the peripheral area Af, show the regions in which the wirings 21, the drive unit 50, etc. are mounted.

The TFT substrate 11 has the first IC chip 211, which is mounted in the Y-direction lower-side area of the peripheral area Af, and a flexible printed board 230, which is connected to the first IC chip 211. The first IC chip 211 is mounted on a glass substrate constituting the TFT substrate 11. A second IC chip 212 is mounted on the flexible printed board 230. The flexible printed board 230 has a first terminal connected to the first IC chip 211 in the TFT substrate 11 side, a second terminal connected to the plurality of detection electrodes Rx in the color filter board 12 side, and a third terminal serving as an interface with an external electronic device. Note that the term "I/F" is an abbreviation of "interface".

In the color filter board 12, the plurality of detection electrodes Rx of the screen area AG are connected to the terminal of the flexible printed board 230 through a plurality of wirings 22 in the Y-direction lower-side area of the peripheral area Af. The detection electrodes Rx and the wirings 22 may be considered to be an integral electrode or wiring.

Figure 3:
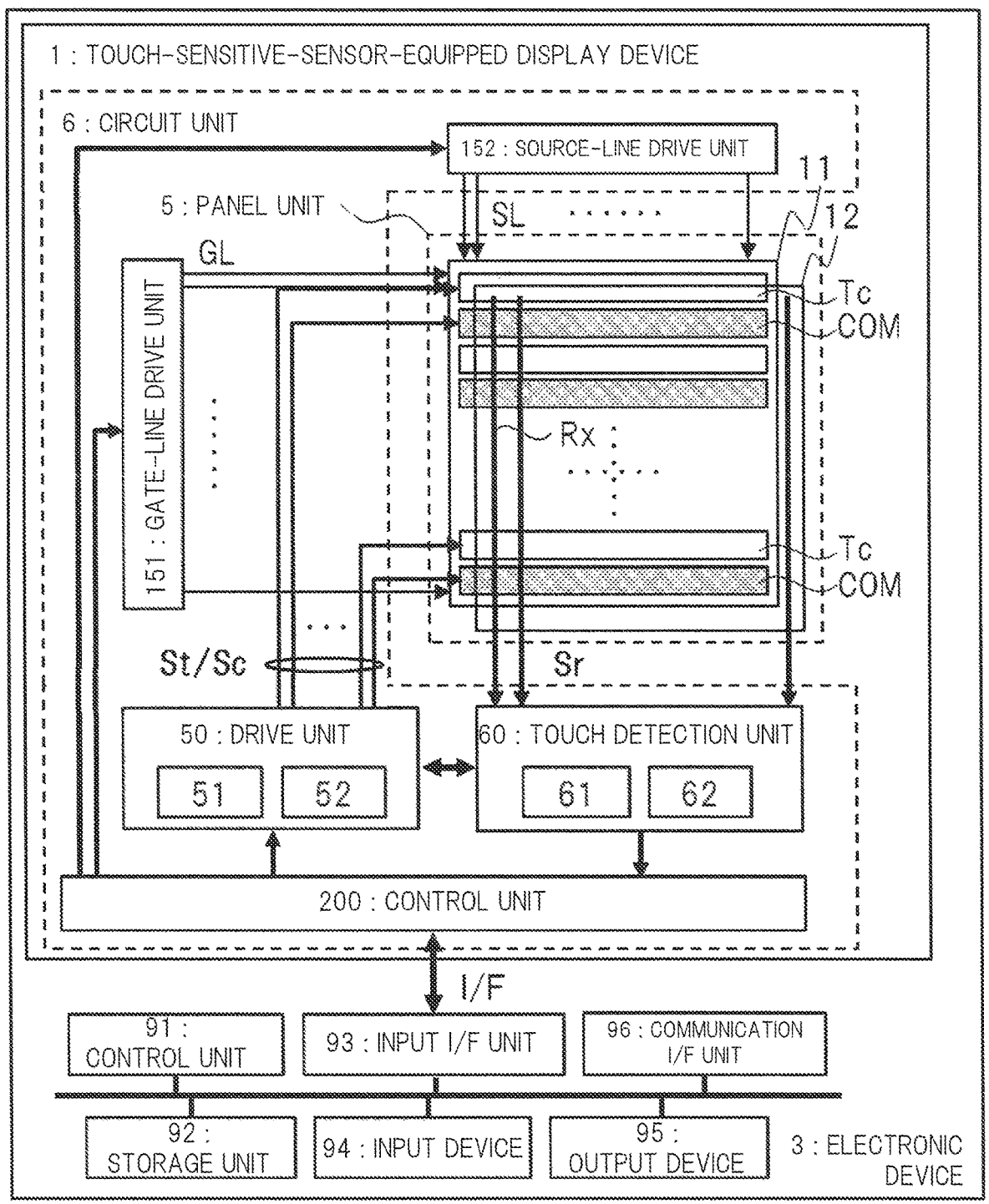
FIG. 3 is a drawing showing a functional block configuration of the touch-sensor-equipped display device of the embodiment 1A and a configuration of an electronic device provided with the touch-sensor-equipped display device.

On the first IC chip 211, for example, a control part of the touch-sensor-equipped display device 1, part of the drive unit 50, a circuit unit for liquid-crystal display, etc. are mounted. On the second IC chip 212, circuit units such as a touch detection part 60 of later-described FIG. 3 are mounted. The first IC chip 211 and the second IC chip 212 are connected and synchronized with each other through the flexible printed board 230. The touch-sensor-equipped display device 1 subjects the first IC chip 211 and the second IC chip 212 to synchronous control.

The wirings 21 formed in the region 251 and the region 252 of the peripheral area Af are connected to X-direction left/right both-side ends of the plurality of shared electrodes Tc and the plurality of common electrodes COM of the screen area AG. The wirings 21 of the region 251 and the wirings 21 of the region 252 have left/right symmetric shapes. Mutually the same signals and voltages are applied to the shared electrodes Tc from the X-direction left/right both-side ends through the wirings 21. Mutually the same signals and voltages are applied to the common electrodes COM from the X-direction left/right both-side ends through the wirings 21.

Note that the configuration is not limited to the configuration in which the shared electrodes Tc, etc. are driven from the X-direction left/right both sides of the above-described screen area AG (also referred to as a both-side drive configuration for the sake of explanation), but may be a configuration in which the shared electrodes Tc, etc. are driven only from one of the X-direction left/right sides of the screen area AG (also referred to as a one-side drive configuration for the sake of explanation). The both-side drive configuration has an advantage that touch drive time and a touch detection period can be shortened compared with those of the one-side drive configuration. The one-side drive configuration has an advantage that the mounting configuration of circuit units, etc. can be simplified as compared with that of the both-side drive configuration.

In the case of the both-side drive configuration, bordered by the X-direction center of the screen area AG, the signals input from the left-side ends of the shared electrodes Tc are used for touch detection in the left-side region thereof, and the signals input from the right-side ends of the shared electrodes Tc are used for touch detection in the right-side region. In the both-side drive configuration, overall paths are shortened as compared with the one-side drive configuration since the paths of signals can be separately used in the above-described left/right regions. Therefore, in the both-side drive configuration, the touch drive time and the touch detection period can be shortened.

[Functional Block Configuration and Electronic Device]

FIG. 3 shows a functional block configuration of the touch-sensor-equipped display device 1 of the embodiment 1A and a configuration of an electronic device 3 provided with the touch-sensor-equipped display device 1. The touch-sensor-equipped display device 1 has a panel unit 5 and a circuit unit 6. The panel unit 5 includes the above-described TFT substrate 11 and the color filter board 12. The circuit unit 6 includes a control unit 200, a drive unit 50, a touch detection part 60, the gate-line drive unit 151, a source-line drive unit 152, etc. The gate-line drive unit 151 and the source-line drive unit 152 are circuit units which compose the above-described liquid-crystal display drive unit 30. In the drawing, the panel unit 5 and the circuit unit 6 are separated from each other; however, the circuit unit 6 can be mounted on the panel unit 5 like the example of FIG. 2. Modes in which parts of the circuit unit 6 are arbitrarily integrated or separated can be employed.

The control unit 200 is a control part of the touch-sensor-equipped display device 1, and the drawing shows a configuration example in which a control part of the touch-sensor function and a control part of the display function are integrated into one. The control unit 200 synchronously controls the touch-sensor function and the display function. The control unit 200 works together with a control part 91 of the electronic device 3 via an input/output I/F part 93 and controls the touch-sensor function and the display function based on instructions from the control part 91. The control unit 200 gives control signals of common drive and control signals of touch drive to the drive unit 50 and receives touch detection information from the touch detection part 60. Moreover, the control unit 200 gives drive control signals to the gate-line drive unit 151, the source-line drive unit 152, etc. based on video signals, timing signals, and control instruction information from the control part 91. Moreover, the control unit 200 transmits the touch detection information to the control part 91 as a report.

The gate-line drive unit 151 subjects a group of gate lines GL of the TFT substrate 11 to scanning drive by scanning signals. In synchronization with scanning of the gate lines GL, the source-line drive unit 152 gives data signals to a group of source lines SL of the TFT substrate 11. The present embodiment is about an in-cell type and has the shared electrodes Tc and the common electrodes COM on the TFT substrate 11; therefore, the circuit unit for common drive of liquid-crystal display is integrated in the drive unit 50.

The drive unit 50 includes a touch drive unit 51, a common drive unit 52, a scanning circuit unit 53, etc., shown in later-described FIG. 9, etc. Based on control instructions from the control unit 200, the drive unit 50 drives the plurality of shared electrodes Tc and the plurality of common electrodes COM of the screen area AG while synchronizing the touch drive unit 51 and the common drive unit 52 by time division. The touch drive unit 51 is a circuit unit which carries out touch drive of the touch-sensor function and carries out touch drive by scanning drive by causing the shared electrodes Tc to function as drive electrodes in the touch detection period Ks shown in later-described FIG. 8. The common drive unit 52 is a circuit unit which carries out common drive corresponding to the display function of liquid-crystal display and carries out common drive together with the common electrodes COM by causing the shared electrodes Tc to function as common electrodes in the display period Kd shown in later-described FIG. 8.

The touch detection part 60 includes a detection circuit unit 61, a position calculating part 62, etc. The touch detection part 60 receives inputs from the plurality of detection electrodes Rx of the screen area AG of the color filter board 12 by the detection circuit unit 61 at the timing following the touch drive by the drive unit 50 and detects the signals as touch detection signals Sr. Then, the touch detection part 60 carries out a process of calculating the presence/absence, position, etc. of a touch in the screen area AG by the position calculating part 62 by using the touch detection signals Sr, acquiring them as touch detection information, and outputting the information.

The detection circuit unit 61 includes, for example, an amplifier, a rectifier, an analog/digital converter, etc. The detection circuit unit 61 receives inputs of, for example, signals from the detection electrodes Rx, amplifies and rectifies the signals, and subjects the signals to analog/digital conversion, thereby acquiring them as the touch detection signals Sr. The position calculating part 62 calculates the detailed presence/absence, position, etc. of the touch in the touch detection area As by using the plurality of touch detection signals Sr corresponding to the plurality of units of detection of the touch detection area As obtained by the detection circuit unit 61 and acquires the result thereof as the touch detection information.

The electronic device 3 includes the touch-sensor-equipped display device 1, the control part 91, a storage part 92, the input/output I/F part 93, an input device 94, an output device 95, a communication I/F part 96, buses, other unshown power source parts, etc. The control part 91 carries out control processing of the electronic device 3. The input/output I/F part 93 is connected to the touch-sensor-equipped display device 1 and carries out interface processing thereof. The control part 91, for example, receives inputs of video signals from outside or generates video signals therein and stores the signals in the storage part 92. The control part 91 gives the video signals, timing signals, and control instruction information to the control unit 200 of the touch-sensor-equipped display device 1 via the input/output I/F part 93. The control part 91 acquires a report of the touch detection information from the control unit 200 of the touch-sensor-equipped display device 1 via the input/output I/F part 93.

[Pixels of Liquid-Crystal Display Device]

Figure 4:
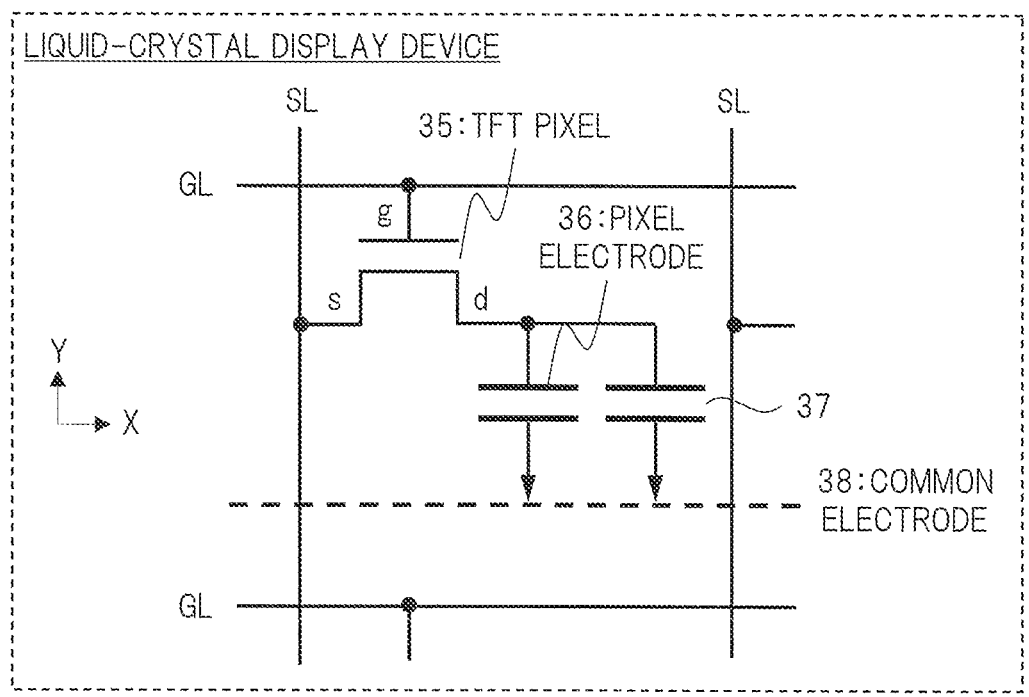
FIG. 4 is a drawing showing a configuration of an equivalent circuit of a pixel in a liquid-crystal display device of a TFT type.

FIG. 4 shows a configuration of an equivalent circuit of a pixel in a liquid-crystal display device of a thin-film transistor (TFT) type used in the panel unit 5 of the embodiment 1A. In the panel unit of the liquid-crystal display device, the pixel is formed to correspond to each of the intersecting portions of the plurality of gate lines GL parallel to the X-direction and the plurality of source lines SL parallel to the Y-direction. The pixel has a TFT element 35, which is a switch element, a pixel electrode 36, and a storage capacitor 37. A gate terminal "g" of the TFT element 35 is connected to the gate line GL, a source terminal "s" is connected to the source line SL, and a drain terminal "d" is connected to the pixel electrode 36 and a first-side terminal of the storage capacitor 36. The gate lines GL serve as scanning lines for selecting the pixels of the display area Ad. The source lines SL serve as data lines for giving display data to the pixels of the display area Ad. The data lines are also referred to as signal lines. An electrode on the opposite side of the pixel electrode 36 and a second-side terminal of the storage capacitor 36 are commonly connected among the pixels as common electrodes 38. The common electrodes 38 are configured by the function as common electrodes among the common electrodes COM and the shared electrodes Tc in the panel unit 5 of the embodiment 1A.

[Electrode Configuration of Screen Area]

FIG. 5 shows a configuration of an XY-plane related to the electrodes of the screen area AG in the touch-sensor-equipped display device 1 of the embodiment 1A. In FIG. 5, the above-described both-side drive configuration is used; however, omissions are made in the illustration so that the wirings 21 are connected only on the left side in the X-direction.

The configuration of the electrodes of the screen area AG of the embodiment 1A corresponds to a configuration in which the plurality of drive electrodes Tx of the screen area AG in the in-cell-type touch-sensor-equipped display device 9 of the comparative example of FIG. 38 are divided into the plurality of shared electrodes Tc and the plurality of common electrodes COM, and the shared electrodes Tc and the common electrodes COM are alternately disposed in the Y-direction. The plurality of shared electrodes Tc and the plurality of common electrodes COM in the screen area AG are formed in the same layer in the Z-direction.

The drive electrodes Tx having the Y-direction width h0 in the comparative example are divided into the shared electrodes Tc having a width ht and the common electrodes COM having a width hc in the embodiment 1A. The plurality of shared electrodes Tc have the Y-direction width of ht, which is constant. The plurality of common electrodes COM have the Y-direction width of hc, which is constant. In the embodiment 1A, the width ht of the shared electrodes Tc and the width hc of the common electrodes COM are mutually the same. The X-direction size and Y-direction size of the screen area AG of the embodiment 1A are assumed to be the same as the sizes of the screen area AG of the comparative example. "M" which is the number of the shared electrodes Tc of the embodiment 1A is the same as "M" which is the number of the drive electrodes Tx of the comparative example.

In the embodiment 1A, the plurality of shared electrodes Tc and the plurality of common electrodes COM are formed by dividing the Y-direction width of the region of the screen area AG in the XY-plane into a plurality of regions by the predetermined width ht and width hc. For example, when the Y-direction width of the screen area AG is divided into 2M+1 regions, the M shared electrodes Tc and the M+1 common electrodes COM are formed. As a result of this division, the plurality of shared electrodes Tc and the plurality of common electrodes COM are formed as rectangular flat-plate-like blocks which are long in the X-direction. The shared electrodes Tc and the common electrodes COM adjacent to each other in the Y-direction are juxtaposed with short intervals and electrically separated from each other. Between the shared electrode Tc and the common electrode COM adjacent to each other in the Y-direction, for example, between the shared electrode Tc1 and the common electrode COM_2, a slit corresponding to the above-described short interval is disposed. In this manner, the shared electrode Tc and the common electrode COM adjacent to each other in the Y-direction are electrically separated from each other. 501 of FIG. 5 represents the above-described slit, and FIG. 5 shows an example of the positions where the slits 501 are disposed.

The Y-direction disposing pitch of the plurality of shared electrodes Tc and the plurality of common electrodes COM is denoted by p2, which is constant. The disposing pitch of the shared electrode Tc and the common electrode COM adjacent to each other in the Y-direction is denoted by p1, which is constant. The Y-direction width ht of the shared electrode Tc and the Y-direction width hc of the common electrode COM are larger than the X-direction width of the thin wiring of the detection electrode Rx. The detection electrodes Rx, for example, have a configuration similar to that of the detection electrodes Rx of the comparative example. The detection electrodes Rx have the shapes of linear thin wirings having a constant width. The X-direction disposing pitch of the plurality of detection electrodes Rx is denoted by p3, which is constant.

The shared electrodes Tc, the common electrodes COM, and the detection electrodes Rx are formed of, for example, later-described ITO.

The capacitors serving as units of detection U are formed by the intersections of the pairs of the shared electrodes Tc and the detection electrodes Rx. The pairs of the shared electrodes Tc and the detection electrodes Rx have intersecting portions c1 in an XY planar view since the electrodes mutually intersect with a predetermined distance therebetween in the Z-direction. The intersecting portion c1 is a region in which the shared electrode Tc and the detection electrode Rx are overlapped with each other in the Z-direction and, in FIG. 5, is part of the thin wiring of the detection electrode Rx. Similarly, the pairs of the common electrodes COM and the detection electrodes Rx have intersecting portions c2 in the XY planar view. The intersecting portion c2 is a region in which the common electrode COM and the detection electrode Rx are overlapped with each other in the Z-direction and, in FIG. 5, also is part of the thin wiring of the detection electrode Rx.

A region in the vicinity of the intersecting portion c1 of the shared electrode Tc and the detection electrode Rx is a region in which an electric field is formed between the region of the shared electrode Tc, which is on the lower side in the Z-direction, and the region of the detection electrode Rx, which is on the upper side in the Z-direction, and touch detection is enabled by the capacitor formed to correspond to this electric field. The electric field formed in the region in the vicinity of the intersecting portion c1 includes the electric fields formed between the regions of the shared electrode Tc which are on the left and right of the intersecting portion c1 in the X-direction and are not overlapped with the detection electrode Rx and the region of the thin wiring of the detection electrode Rx of the intersecting portion c1. In the present specification, the capacitors formed to correspond to the vicinities of the above-described intersecting portions c1 of the shared electrodes Tc and the detection electrodes Rx and the regions in which touch detection can be carried out by the capacitors are defined as the units of detection U. The capacitors serving as the units of detection U correspond to the capacitors Cx serving as the units of detection Ux in FIG. 37 of the comparative example. Note that, in FIG. 5, each of the units of detection U is shown as an approximately square region of which center is at the intersecting portion c1. In the configuration of the electrodes of the panel unit 5, the plurality of units of detection U in the screen area AG are disposed so as to form approximately square lattices when the center points thereof are mutually connected.

In the panel unit 5 of the embodiment 1A, by virtue of the above-described configuration divided into the shared electrodes Tc and the common electrodes COM, the area of the intersecting portion c1 of the shared electrode Tc and the detection electrode Rx is smaller than the area of the intersecting portion of the drive electrode Tx and the detection electrode Rx of the comparative example of FIG. 38. The width ht of the shared electrode Tc of the embodiment 1A is, for example, about ½ with respect to the width h0 of the drive electrode Tx of the comparative example, and, accordingly, the area of the intersecting portion c1 is also about ½.

Because of the above-described configuration of the shared electrodes Tc, the panel unit 5 of the embodiment 1A newly has the intersecting portions c2 of the common electrodes COM and the detection electrodes Rx as the intersecting portions of the detection electrodes Rx. In the embodiment 1A, the area of the intersecting portion c2 of the common electrode COM and the detection electrode Rx is the same as the area of the intersecting portion c1 of the shared electrode Tc and the detection electrode Rx.

In the panel unit 5 of the embodiment 1A, the load in the vicinity of the intersecting portion c1 is low since the area of the above-described intersecting portion c1 of the shared electrode Tc and the detection electrode Rx is small. Moreover, the loads of the path parts in the screen area AG including the intersecting portions c1, the shared electrodes Tc, and the detection electrodes Rx are low. Therefore, in the embodiment 1A, the touch drive time of the touch drive of the shared electrodes Tc and the touch detection period including the touch drive time of the plurality of shared electrodes Tc of the screen area AG can be shortened.

Note that FIG. 5 shows a configuration example in which the first common electrode COM_1 is provided on the Y-direction uppermost side of the screen area AG, and the M+1 common electrode COM_M+1 is provided on the Y-direction lowermost side of the screen area AG. Since the common electrodes COM are disposed in the Y-direction upper/lower both sides of the shared electrode Tc, the characteristics of each of the shared electrodes Tc in the screen area AG and the characteristics, etc. of the loads of paths are equalized. The configuration is not limited to this configuration example, but may be a configuration in which the shared electrode Tc is disposed in the Y-direction uppermost side of the screen area AG or a configuration in which the shared electrode Tc is disposed in the Y-direction lowermost side of the screen area AG.

[Cross-Sectional Configuration of Panel Unit]

Figure 6:
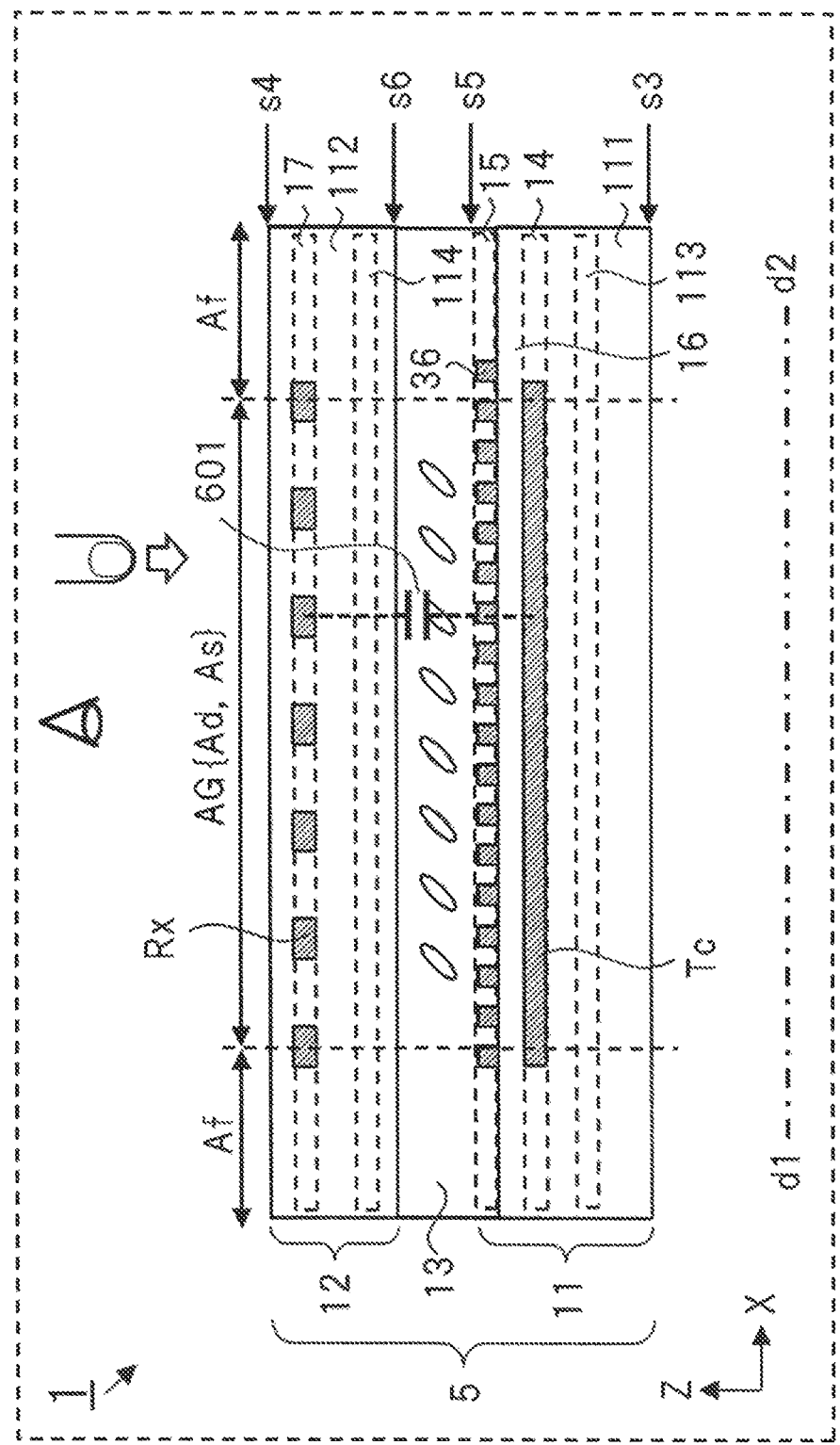
FIG. 6 is a drawing showing a configuration of a schematic XZ cross section of the panel unit of the embodiment 1A corresponding to a line d1-d2 of FIG. 5.

FIG. 6 shows a configuration of a schematic XZ cross section of the panel unit 5 corresponding to a line of d1-d2 of FIG. 5. This cross section particularly shows a cross section corresponding to a location where the shared electrode Tc is present. The cross section corresponding to a location where the common electrode COM is present is also similar to FIG. 6. "601" represents an image of the capacity which serves as the unit of detection U formed by the intersection of the shared electrode Tc and the detection electrode Rx.

Figure 7:
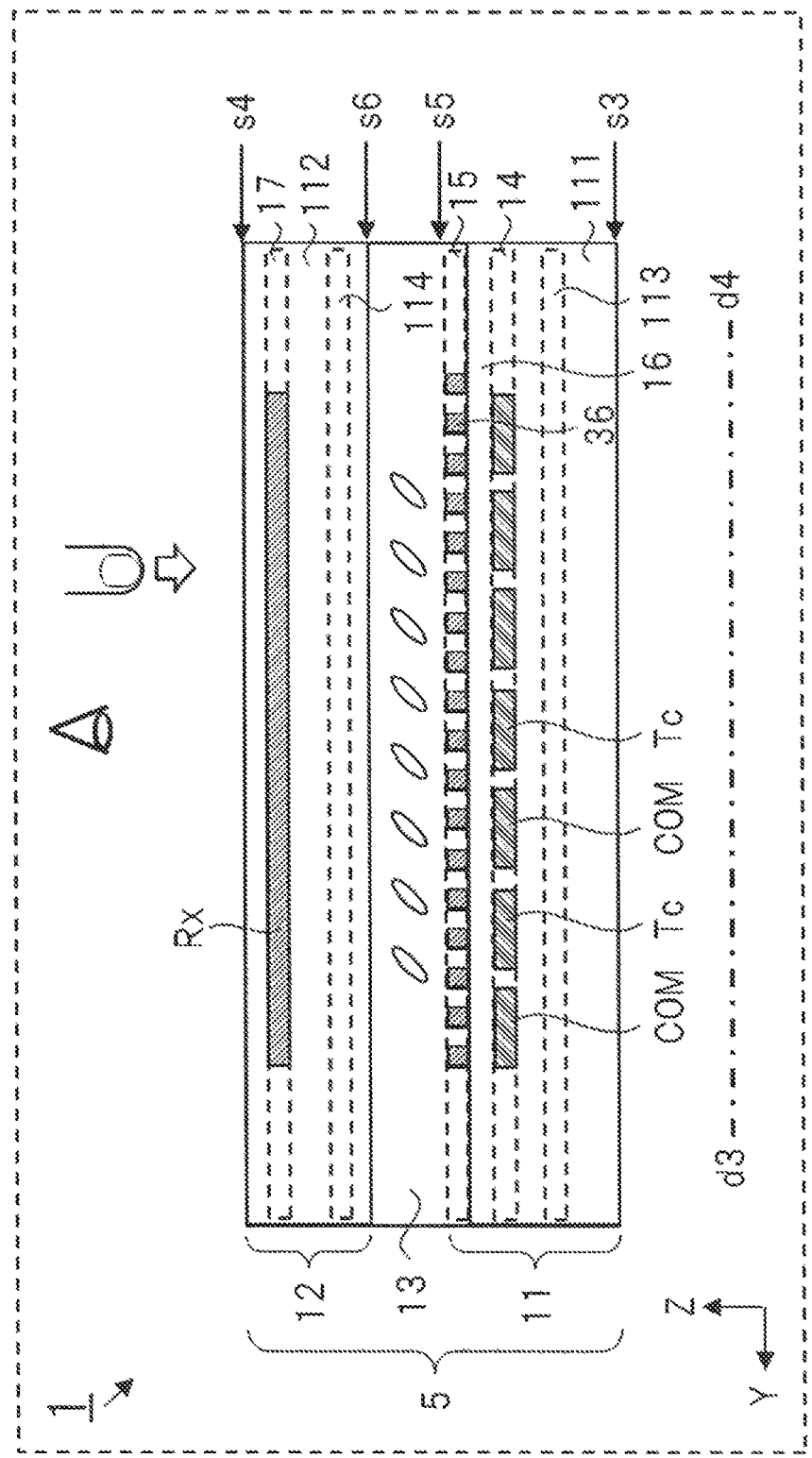
FIG. 7 is a drawing showing a configuration of a schematic YZ cross section of the panel unit of the embodiment 1A corresponding to a line d3-d4 of FIG. 5.

FIG. 7 shows a configuration of a schematic YZ cross section of the panel unit 5 corresponding to a line d3-d4 of FIG. 5. This cross section particularly shows a cross section corresponding to a location where the detection electrode Rx is present.

In FIG. 6 and FIG. 7, the panel unit 5 is a liquid-crystal display panel unit corresponding to the in-cell type in which the shared electrodes Tc, the common electrodes COM, and the detection electrodes Rx are built. The panel unit 5 has the TFT substrate 11, which is the first board structure on a back surface side of the Z-direction; the color filter board 12, which is the second board structure on a front surface side; and a liquid crystal layer 13, which is a display function layer sealed therebetween. Publicly-known polarizing plates, etc. are connected to a rear surface s3 and a front surface s4 of the panel unit 5, and a publicly-known backlight, etc. are connected to the rear surface s3; however, illustration thereof is omitted.

The liquid crystal layer 13 is a layer in which liquid crystals are sealed and the orientations thereof are controlled and is a layer controlled by the pixels of the display area Ad for displaying images. The liquid crystal layer 13 has a lower surface s5 and an upper surface s6 in the Z-direction on which publicly-known oriented films are formed; however, illustration thereof is omitted. Moreover, the liquid crystal layer 13 includes a sealing part in the region corresponding to the peripheral area Af outside of the screen area AG; however, illustration thereof is omitted. As a drive method of the liquid crystal layer 13, the present embodiment shows a case in which fringe field switching (FFS: Fringe Field Switching), which is a type of transverse electric field types, is applied; however, the type is not limited thereto, and various types can be applied. In the case of FFS, in the TFT substrate 11, the shared electrodes Tc, which function as common electrodes, and the pixel electrodes 36 are provided to be overlapped with each other via a dielectric layer 16 therebetween in the Z-direction perpendicular to the surfaces of the board. Based on control of voltages from the circuit unit 6 with respect to the shared electrodes Tc, the pixel electrodes 36, etc., the orientations of the liquid crystals of the liquid crystal layer 13 are controlled. In FFS, electric fields which are in oblique directions mainly with respect to the board surfaces or have parabolic shapes, i.e., so-called fringe electric fields are generated.

In the TFT substrate 11, a TFT layer 113, an electrode layer 14, the dielectric layer 16, a pixel electrode layer 15, etc. are formed on a glass substrate 111. The TFT layer 113 briefly shows a layer in which The TFT elements 35, the gate lines GL, the source lines SL, etc. as shown in FIG. 4 are formed on the glass substrate 111. In the display area Ad, the function of the plurality of common electrodes COM and the plurality of shared electrodes Tc in the electrode layer 14 as common electrodes is to carry out drive so as to achieve a common state. The pixel electrode layer 15 shows a layer in which the pixel electrodes 36 of individual electrode portions corresponding to a matrix of the pixels of the display area Ad are formed. In the display area Ad, the pixel electrodes 36 are driven so as to obtain the states of the respective pixels.

The electrode layer 14 shows a layer in which the shared electrodes Tc and the common electrodes COM are formed. In the cross section of FIG. 6, only the shared electrode Tc is extending in the X-direction. In the cross section of FIG. 7, the common electrodes COM and the shared electrodes Tc are alternately juxtaposed in the Y-direction. The electrode layer 14 includes the part in which the ends of the shared electrodes Tc and the wirings 21 are mutually connected and the part in which the ends of the common electrodes COM and the wirings 21 are mutually connected in the peripheral area Af. As a mode of the connection of the electrodes of the screen area AG and the wirings of the peripheral area Af, for example, a mode using Z-direction layer stacking of the ends of the electrodes and the ends of the wirings can be employed.

In the color filter board 12, a color filter layer 114 and a detection electrode layer 17 are formed on a glass substrate 112. The color filter layer 114 briefly shows a layer on which color filters of respective colors, a light shielding film, an overcoat film, etc. are formed. The color filter layer 114 is, for example, formed on the side closer to the upper surface s6 of the liquid crystal layer 13 in the Z-direction. Note that, in the peripheral area Af, for example, the light shielding film is formed. The detection electrode layer 17 is a layer in which the detection electrodes Rx are formed and is formed, for example, on the side closer to the front surface s4 of the color filter board 11 in the Z-direction. In the cross section of FIG. 6, the cross sections of the thin wirings of the detection electrodes Rx are disposed at a constant pitch p3 in the X-direction. In the cross section of FIG. 7, the thin wiring of the detection electrode Rx is extending in the Y-direction. The detection electrode layer 17 includes the part in which the ends of the detection electrodes Rx and the wirings 22 are mutually connected in the peripheral area Af.

In the embodiment 1A, the shared electrodes Tc and the common electrodes COM of the above-described electrode layer 14 and the detection electrodes Rx of the detection electrode layer 17 are formed of a visible-light-permeable electrically conductive material such as an indium tin oxide (ITO: Indium Tin Oxide). In another embodiment, the electrode layer 14 and the detection electrode layer 17 are not limited to ITO, but, for example, may be formed of a metal material having a lower resistance than that of ITO or may be formed of a combination of ITO and the low-resistance metal material.

The usable structure of the cross section of the panel unit 5 of the touch-sensor-equipped display device 1 is not limited to the above-described structure. The cross-sectional views are schematic; and, upon mounting, for example, the Z-direction thickness of the liquid crystal layer 13 is smaller than the thickness of, for example, the TFT substrate 11, and other dimensions and ratios are also according to mounting.

[Drive Method and Drive Period]

Figure 8:
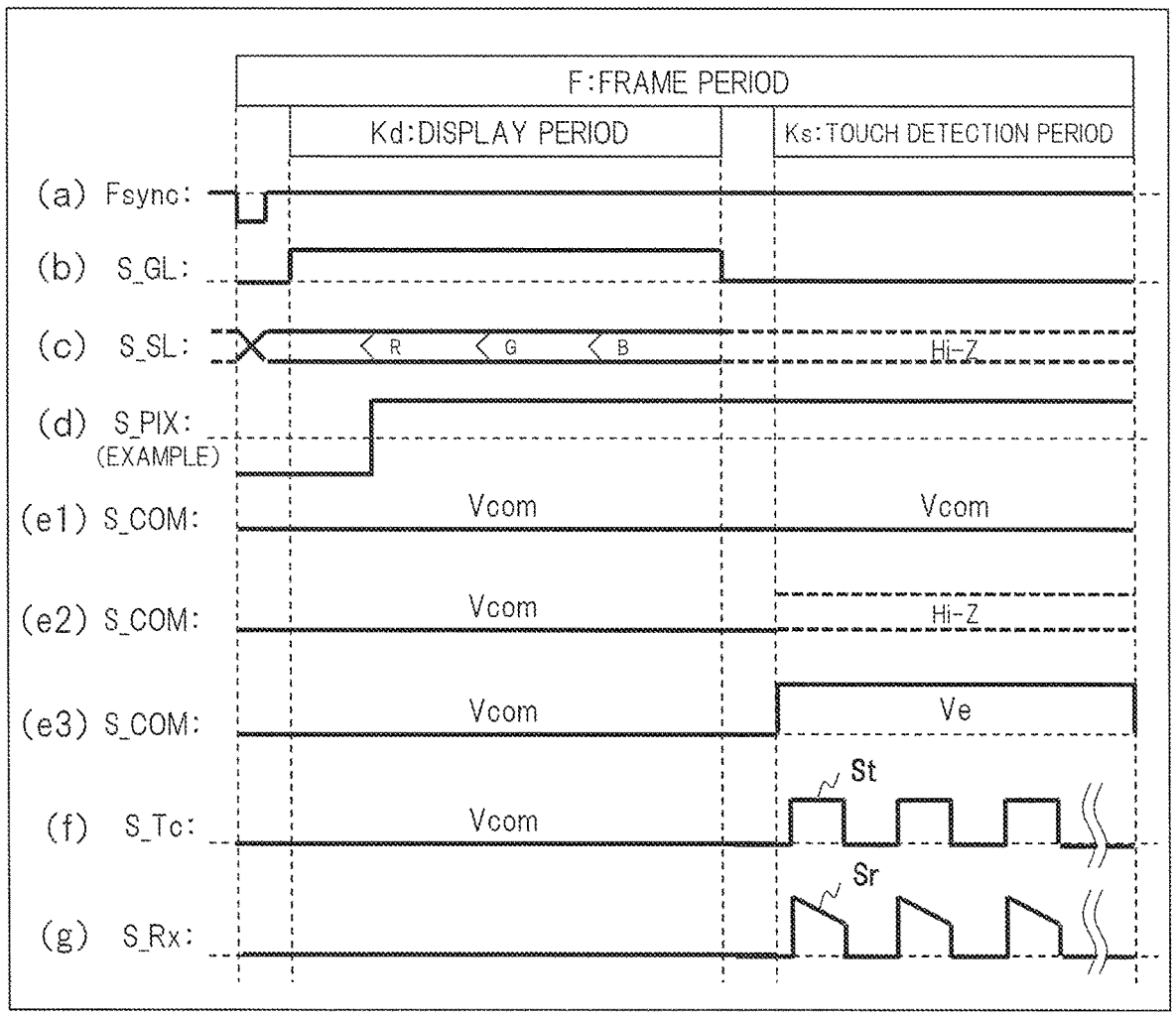
FIG. 8 shows a timing chart of various signals and voltages as a configuration example of a drive method and a drive period in the touch-sensor-equipped display device of the embodiment 1A, etc.

FIG. 8 shows a timing chart of various signals and voltages as a configuration example of a drive method and a drive period in the touch-sensor-equipped display device 1 of the embodiment 1A, etc. The configuration example of the drive method and the drive period of FIG. 8 shows a configuration example of the drive method of time division of the display period Kd and the touch detection period Ks in a frame period F and a drive period corresponding thereto.

The frame period F is a period having a predetermined length for displaying frame images corresponding to liquid-crystal display. The display period Kd is a period including a pixel write period, etc. of the display function for frame-image display in the display area Ad. The touch detection period Ks is a period which ensures the time of touch drive carried out by scanning drive of the plurality of shared electrodes Tc of the touch detection area As by the touch-sensor function and the time of touch detection from the plurality of detection electrodes Rx along with the touch drive. The single touch detection period Ks includes the time of subjecting all the shared electrodes Tc in the plane of the touch detection area As to scanning drive.

In the present drive method, the display period Kd and the touch detection period Ks are synchronized in each frame period F, and drive is carried out by time division in the order of the display period Kd and the touch detection period Ks in the frame period F. The present drive method ensures time so that the display period Kd having a predetermined length and the touch detection period Ks having a predetermined length are within the frame period F having a fixed length. Note that the order of the display period Kd and the touch detection period Ks may be reversed.

"Fsync" of the diagram (a) in FIG. 8 represents a signal which specifies the frame period F having the fixed length. "S_GL" of the diagram (b) in FIG. 8 represents a scanning signal from the gate-line drive unit 151 to the gate line GL. "S_SL" of the diagram (c) in FIG. 8 represents a data signal from the source-line drive unit 152 to the source line SL. "S_PIX" of the diagram (d) in FIG. 8 represents an example of pixel voltages applied to the pixel electrode 36 depending on the transmission rate of each pixel. A signal S_COM of the diagram (e1) in FIG. 8 represents a signal and a voltage applied from the drive unit 50 to the common electrode COM in the case of the first drive method of the embodiment 1A. A signal S_COM of the diagram (e2) in FIG. 8 represents a signal and a voltage applied from the drive unit 50 to the common electrode COM in a case of a later-described second drive method. A signal S_COM of the diagram (e3) in FIG. 8 represents a signal and a voltage applied from the drive unit 50 to the common electrode COM in a case of a later-described third drive method. "S_Tc" of the diagram (f) in FIG. 8 represents a touch drive signal St as an example of a signal and a voltage applied from the drive unit 50 to the shared electrode Tc. "S_Rx" of the diagram (g) in FIG. 8 represents a signal which is output from the detection electrode Rx, input to the touch detection part 60, and detected as a touch detection signal Sr.

[First Drive Method]

The touch-sensor-equipped display device 1 of the embodiment 1A uses the below-described first drive method as a drive method of time division matching the configuration of the above-described electrode shapes of FIG. 5. The first drive method is shown by the signal S_COM, etc. of the diagram (e1) in FIG. 8. In the first drive method, first, in the display period Kd, a voltage Vcom for common drive of liquid-crystal display is applied to all of the shared electrodes Tc and the common electrodes COM of the display area Ad. As a result, all of the shared electrodes Tc and the common electrodes COM of the display area Ad are controlled to the state of a common electric potential. In the first drive method, then, in the touch detection period Ks, the touch drive signal St is sequentially applied to the shared electrodes Tc which are scanning targets and units of scanning among the plurality of shared electrodes Tc of the touch detection area As. Moreover, in the first drive method, along with the touch drive of the above-described shared electrodes Tc, the voltage Vcom which is the same as that in the display period Kd is applied to the plurality of common electrodes COM of the touch detection area As. The loads of the above-described paths are reduced by the first drive method.

A detailed operation example of the first drive method of the embodiment 1A will be described below. In relation to the signal S_COM of the diagram (e1) in FIG. 8 and the signal S_Tc of the diagram (f) in FIG. 8, in the display period Kd, the drive unit 50 applies the signal using the voltage Vcom to all of the common electrodes COM and all of the shared electrodes Tc of the display area Ad by the common drive unit 52 and the scanning circuit unit 53. Note that the voltage Vcom is specifically a voltage specified in accordance with the drive method of liquid-crystal display such as above-described FFS.

Then, in relation to the signal S_Tc of the diagram (f) in FIG. 8, in the touch detection period Ks, the drive unit 50 carries out touch drive by scanning drive of generating the touch drive signals St using a predetermined frequency by the touch drive unit 51 and the scanning circuit unit 53 and sequentially applying the signals to the plurality of shared electrodes Tc in the touch detection area As. At the timing corresponding to this touch drive, as the signal S_Rx of the diagram (g) in FIG. 8, the touch detection part 60 detects the touch detection signals Sr from the detection electrodes Rx.

Moreover, in relation to the signal S_COM of the diagram (e1) in FIG. 8, in the touch detection period Ks, the drive unit 50 applies the signal using the voltage Vcom to all of the common electrodes COM of the screen area AG by the common drive unit 52 and the scanning circuit unit 53. In other words, the common electrodes COM are maintained to the electric potential according to the fixed voltage Vcom in the frame period F. As a result, loads become low in the vicinities of the above-described intersecting portions c2 of the common electrodes COM and the detection electrodes Rx.

[Circuit Configuration of Drive Unit]

Figure 9:
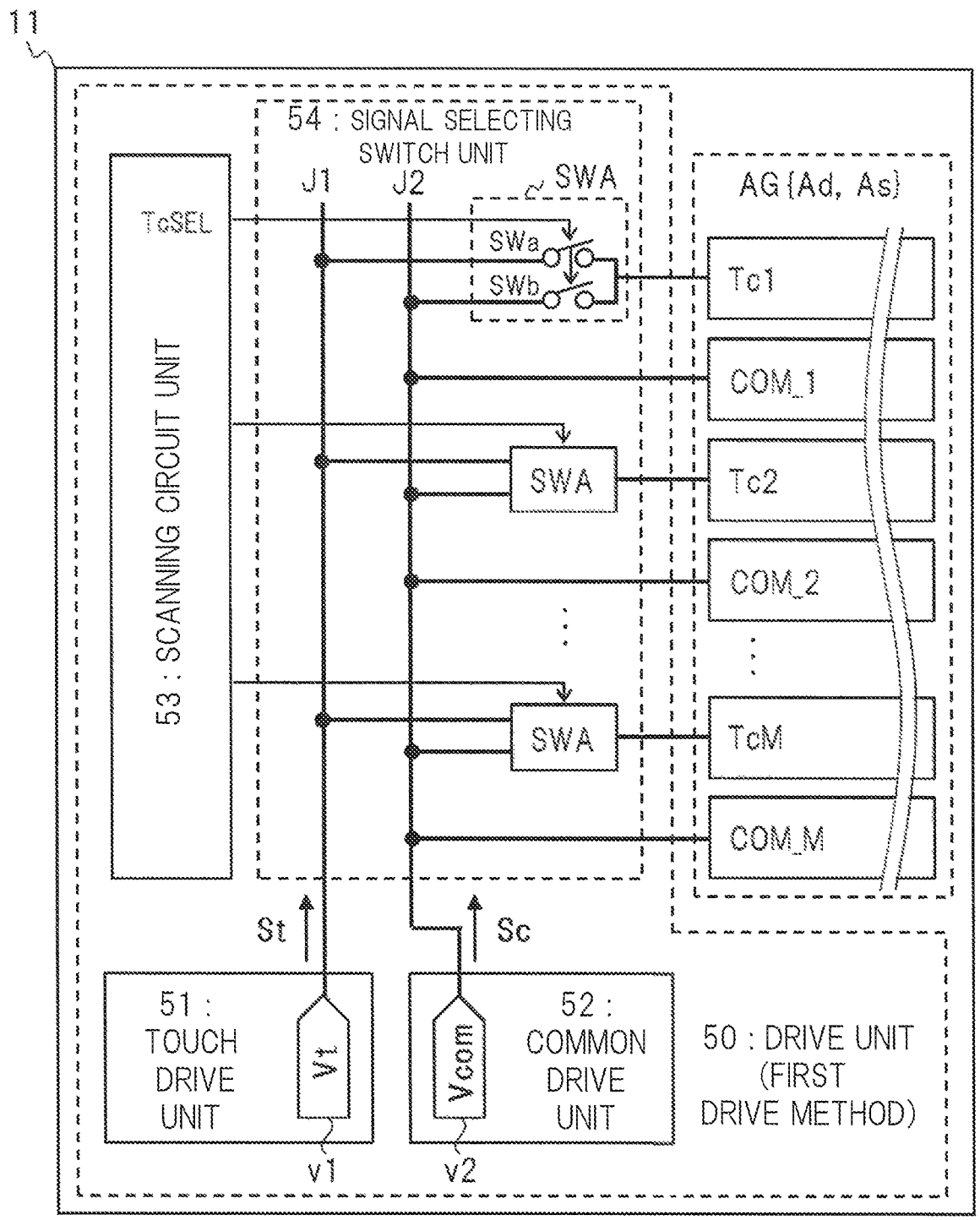
FIG. 9 is a drawing showing a configuration example of a drive unit corresponding to a first drive method in the embodiment 1A.

FIG. 9 shows a circuit configuration of the drive unit 50 corresponding to the first drive method in the embodiment 1A. The configuration of FIG. 9 shows an example in which circuits and wirings of the drive unit 50 are mounted in left-side and lower-side areas of the peripheral area Af in the TFT substrate 11. FIG. 9 shows the above-described both-side drive configuration, in which circuits and wirings are mounted also in a right-side area of the peripheral area Af as well as the left-side area; however, illustration thereof is omitted. Also, illustration of circuits such as the liquid-crystal display drive unit 30 mounted in the peripheral area Af is omitted in FIG. 9. The screen area AG of FIG. 9 shows a configuration example in which, sequentially from the Y-direction upper side, the shared electrode Tc1, the common electrode COM_1, the shared electrode Tc2, the common electrode COM_2, etc., the shared electrode TcM, and the common electrode COM_M are disposed in this order.

The drive unit 50 of FIG. 9 has the touch drive unit 51, the common drive unit 52, the scanning circuit unit 53, and a signal selecting switch part 54. The wirings 21 connected to the shared electrodes Tc and the common electrodes COM include a wiring J1 and a wiring J2 in FIG. 9. Through the wiring J1, the touch drive signal St from the touch drive unit 51 is transmitted. The signal Sc of the voltage Vcom from the common drive unit 52 is applied to the wiring J2.

The touch drive unit 51 includes, as a signal voltage source, a voltage source v1, which generates a predetermined direct-current voltage Vt for generating the touch drive signal St. The touch drive unit 51 generates pulses of the touch drive signal St using the predetermined frequency by a circuit such as a level shifter based on the voltage Vt from the voltage source v1 and outputs the pulses to the wiring J1.

The common drive unit 52 includes, as a signal voltage source, a voltage source v2, which generates the predetermined direct-current voltage Vcom. The common drive unit 52 outputs the common-drive signal Sc using the voltage Vcom from the voltage source v2 to the wiring J2.

The drive unit 50 controls the timing of drive in accordance with a predetermined drive method by the scanning circuit unit 53. The scanning circuit unit 53 is formed of a timing circuit for controlling the timing of drive including scanning drive and common drive upon touch drive, a shift register, etc. The scanning circuit unit 53 generates control signals in accordance with the control of the timing of the drive and outputs the control signals to the signal selecting switch part 54. The control signals switch on/off, etc. of switch elements in the signal selecting switch part 54. The scanning circuit unit 53 of the embodiment 1A outputs control signals TcSEL for controlling the shared electrodes Tc.

The drive unit 50 can arbitrarily control the timing of operations such as on and off of the switch elements in the signal selecting switch part 54 by the scanning circuit unit 53. By virtue of this, for example, selection of the shared electrodes Tc of the scanning targets and units of scanning in the scanning drive of the plurality of shared electrodes Tc in the screen area AG, the scanning order thereof, etc. can be arbitrarily controlled.

The signal selecting switch part 54 is provided between the shared electrodes Tc and the common electrodes COM of the screen area AG, the touch drive unit 51, the common drive unit 52, and the scanning circuit unit 53. The signal selecting switch part 54 includes a plurality of selecting switch parts SWA. Respective output terminals of the plurality of selecting switch parts SWA are connected to the ends of the corresponding shared electrodes Tc among the plurality of shared electrodes Tc of the screen area AG. The wiring J1 of the touch drive signal St is connected to respective input terminals of the plurality of selecting switch parts SWA. The wiring J2 of the signal Sc of the voltage Vcom is connected to respective input terminals of the plurality of selecting switch parts SWA and to respective ends of the plurality of common electrodes COM of the screen area AG.

The signal selecting switch part 54 switches outputs of the signals and voltages of the selecting switch parts SWA based on the control signals TcSEL from the scanning circuit unit 53. Each of the selecting switch parts SWA carries out switching between the input of the touch drive signal St from the wiring J1 and the input of the signal Sc from the wiring J2 to select one of the two inputs in accordance with the control signal TcSEL and outputs the signal to the shared electrode Tc. Each of the selecting switch parts SWA includes a first switch element SWa and a second switch element SWb therein. The first switch element SWa has the input terminal connected to the wiring J1, has the output terminal connected to the shared electrode Tc, and has a control input terminal to which the control signal TcSEL is input. The second switch element SWb has the input terminal connected to the wiring J2, has the output terminal connected to the shared electrode Tc, and has a control input terminal to which the control signal TcSEL is input. The control input of the switch element SWb is connected so that the on-and-off logic is reversed with respect to the control input of the switch element SWa.

In the above-described circuit configuration of the drive unit 50, in the display period Kd, for example, the control signals TcSEL are turned off to turn off the first switch elements SWa of the selecting switch parts SWA and turn on the second switch elements SWb. As a result, the signal Sc using the voltage Vcom is applied to all the shared electrodes Tc and the common electrodes COM of the display area Ad. In the touch detection period Ks, the control signals TcSEL for the selecting switch parts SWA connected to the shared electrodes Tc serving as scanning targets are turned on, and the control signals TcSEL for the selecting switch parts SWA connected to the other shared electrodes Tc are turned off. As a result, the first switch elements SWa of the selecting switch parts SWA connected to the shared electrodes Tc serving as the scanning targets are turned on, and the second switch elements SWb thereof are turned off. As a result, the touch drive signal St is sequentially applied to the plurality of shared electrodes Tc of the touch detection area As.

[First Scanning Drive Method]

Figure 10:
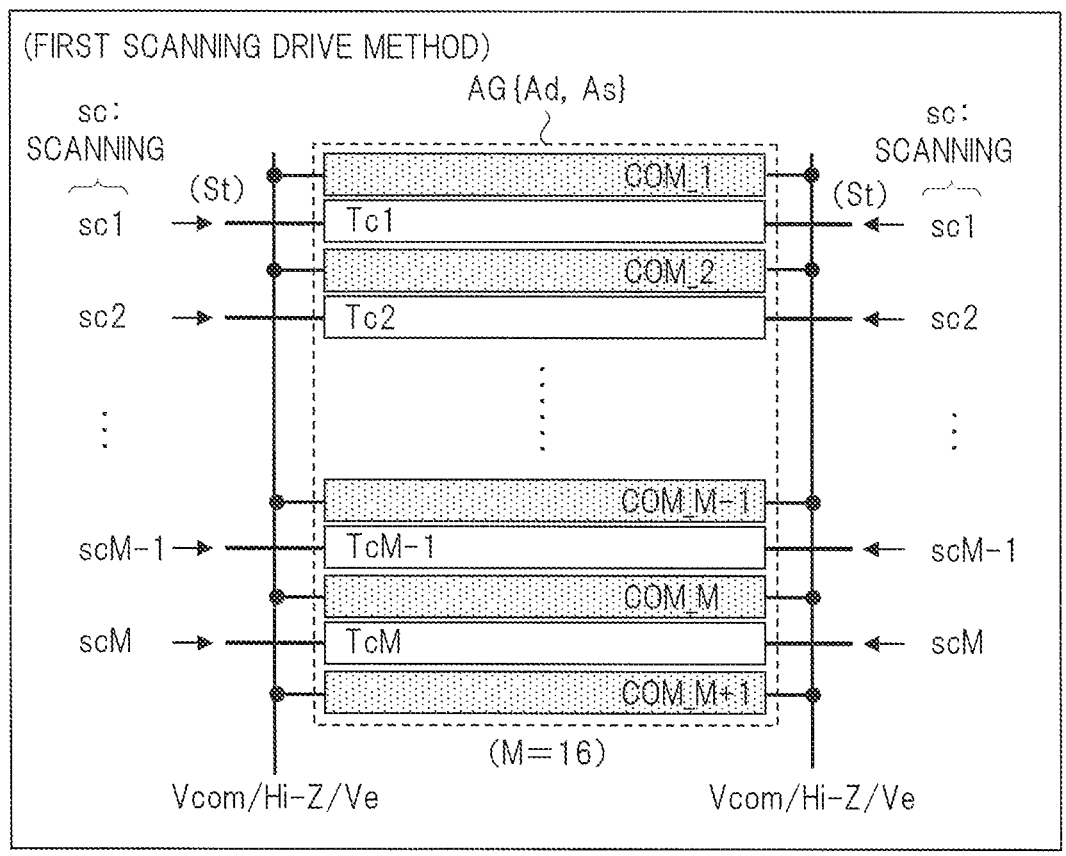
FIG. 10 is a drawing showing a scanning drive method and a scanning drive example of the screen area in a touch detection period according to the embodiment 1A.

FIG. 10 shows a scanning drive method of the screen area AG in the touch detection period Ks in the touch-sensor-equipped display device 1 of the embodiment 1A and a scanning drive example thereof. The scanning drive method of the embodiment 1A is referred to as a first scanning drive method for the sake of explanation. In the first scanning drive method, as touch drive in the touch detection period Ks, the drive unit 50 carries out scanning drive of sequentially applying the touch drive signal St to the M shared electrodes Tc of the touch detection area As one by one from the Y-direction upper side by using the scanning circuit unit 53. The scanning sc of the plurality of shared electrodes Tc in the scanning drive is carried out by using the same touch drive signal St. In the first scanning drive method, the single shared electrode Tc is a scanning target and a unit of scanning of each scanning drive.

In first scanning sc1 of the scanning sc of the touch detection area As, the drive unit 50 applies the touch drive signals St to ends of both left/right sides in the X-direction of the first shared electrode Tc1 at the same time. Then, as second scanning sc2, the drive unit 50 applies the touch drive signals St to ends of both left/right sides in the X-direction of the second shared electrode Tc2 at the same time. As Mth scanning scM, the drive unit 50 similarly repeats the scanning sc and applies the touch drive signals St to the ends of both left/right sides in the X-direction of the Mth shared electrode TcM at the same time. As described above, in the first scanning drive method, every time the entire touch detection area As is scanned one time, the touch drive of each of the shared electrodes Tc is executed M times.

In the case of the first drive method of the embodiment 1A, upon the above-described scanning of each of the shared electrodes Tc, all the common electrodes COM including the common electrodes COM adjacent to, from the Y-direction upper/lower sides, the shared electrode Tc serving as the scanning target are controlled so as to be at the electric potential of the voltage Vcom of above-described FIG. 8. By virtue of this control, the loads of the path parts including the shared electrode Tc serving as the scanning target are reduced, and the touch detection sensitivity of each of the units of detection U at the shared electrode Tc serving as the scanning target is increased.

Although not shown in the drawings, corresponding to the above-described scanning drive, the touch detection part 60 detects, as the touch detection signals, the signals transmitted through the plurality of shared electrodes Tc of the touch detection area As and transmitted and output to the detection electrodes Rx through the capacitors of the units of detection U. As a result, touch detection of all of the units of detection U in the touch detection area As is carried out. The scanning order is not limited to the scanning order of FIG. 10, and the drive unit 50 can carry out scanning in an optional order while selecting optionally shared electrodes Tc in the screen area AG as scanning targets by using the above-described scanning circuit unit 53.

[Touch-Sensor Device of Capacitive Type]

Figure 11A:
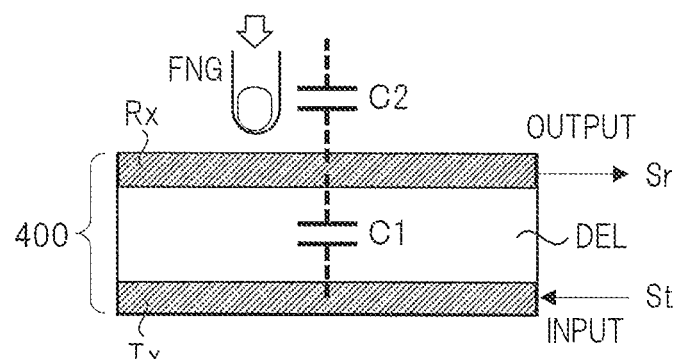
FIG. 11A is a drawing showing a principle of a touch-sensor device of an capacitive type.
Figure 11B:
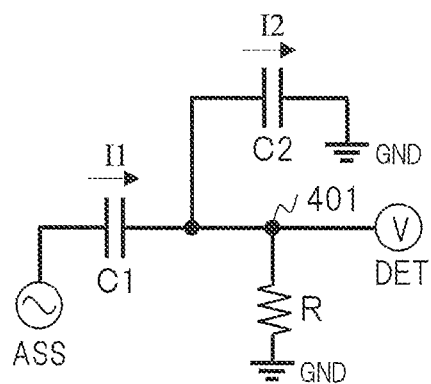
FIG. 11B is a drawing showing a principle of a touch-sensor device of an capacitive type.
Figure 11C:
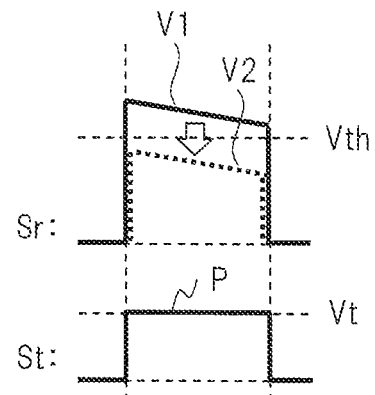
FIG. 11C is a drawing showing a principle of a touch-sensor device of an capacitive type.

FIGS. 11A to 11C briefly show principles of the touch-sensor device of the capacitive type as a supplement. FIG. 11A shows a basic structure of a touch-sensor device 400 of the capacitive type. FIG. 11B shows an equivalent circuit of FIG. 11A. FIG. 11C shows an example of a signal and a voltage upon touch drive and touch detection by the touch-sensor device 400 of FIG. 11A and FIG. 11B. In FIG. 11A, in the touch-sensor device 400, a capacitor C1 associated with the above-described unit of detection U and the capacitor Cx is formed at the electrode pair of the drive electrode Tx and the detection electrode Rx disposed with a dielectric substance DEL interposed therebetween. The touch-sensor device 400 detects the state of presence/absence, etc. of a touch by utilizing a change in the capacitor C1 caused when a conductor such as a finger FNG is close to or in contact with the surface on the detection electrode Rx side.

The drive electrode Tx, which is a first end side of the capacitor C1 of FIG. 11B, is connected to an alternating-current signal source ASS. A node 401 connected to the detection electrode Rx, which is a second end side of the capacitor C1, is grounded via a resistance R and is connected to a voltage detector DET. Upon touch drive, the touch drive signal St, which is an input signal, is applied from the alternating-current signal source ASS to the drive electrode Tx. With respect to the touch drive signal St, which is the input signal, a current I1 flows via the capacitor C1 of the touch-sensor device 400. Then, based on the current I1, the touch detection signal Sr, which is an output signal, is detected by the voltage detector DET in the detection electrode Rx side.

In FIG. 11C, the touch drive signal St, which is the input signal, is a signal of an alternating-current pulse of a predetermined frequency and voltage Vt. In a case with no touch, i.e., in a state in which no conductor is close to or in contact with the detection electrode Rx in the front surface side of the touch-sensor device 400, the voltage of the touch detection signal Sr, which is the output signal, is a voltage V1. In a case with a touch, i.e., in a state in which a conductor is close to or in contact with the detection electrode Rx in the front surface side of the touch-sensor device 400, the voltage of the touch detection signal Sr, which is the output signal, is a voltage V2.

In the case with no touch, as shown in FIG. 11B, along with charge/discharge to/from the capacitor C1, the current I1 corresponding to the electrostatic capacity value of the capacitor C1 flows. As a result, the voltage detected by the voltage detector DET is the voltage V1 of FIG. 11C. In the case with a touch, as shown in FIG. 11B, the capacitor C2 formed by the conductor is additionally connected serially to the capacitor C1 as a result, and electric fields are correspondingly reduced in this region. In this state, along with charge/discharge to/from the capacitor C1 and the capacitor C2, the current I1 and the current I2 corresponding to the respective electrostatic capacity values of the capacitor C1 and the capacitor C2 flow. As a result, the voltage of the node 401 in the detection electrode Rx side has a divided voltage determined by the values of the current I1 and the current I2 corresponding to the electrostatic capacity values of the capacitor C1 and the capacitor C2. In this case, the voltage detected by the voltage detector DET is lower than the voltage V1 of the case with no touch as shown by the voltage V2 of FIG. 11C.

A circuit unit including the voltage detector DET amplifies, for example, the voltage of the output signal input from the detection electrode Rx side and detects the voltage as the touch detection signal Sr. The circuit unit including the voltage detector DET, for example, compares the voltage of the touch detection signal Sr with a threshold voltage Vth and, if the voltage is smaller than the threshold voltage Vth, for example, like the voltage V2, detects the voltage as a state with a touch.

[Effects, Etc.]

As described above, according to the touch-sensor-equipped display device 1 of the embodiment 1A, the touch drive time and the touch detection period can be shortened by reducing the loads in the paths including the capacitors formed by the intersections of the shared electrodes Tc and the detection electrodes Rx.

Figure 12:
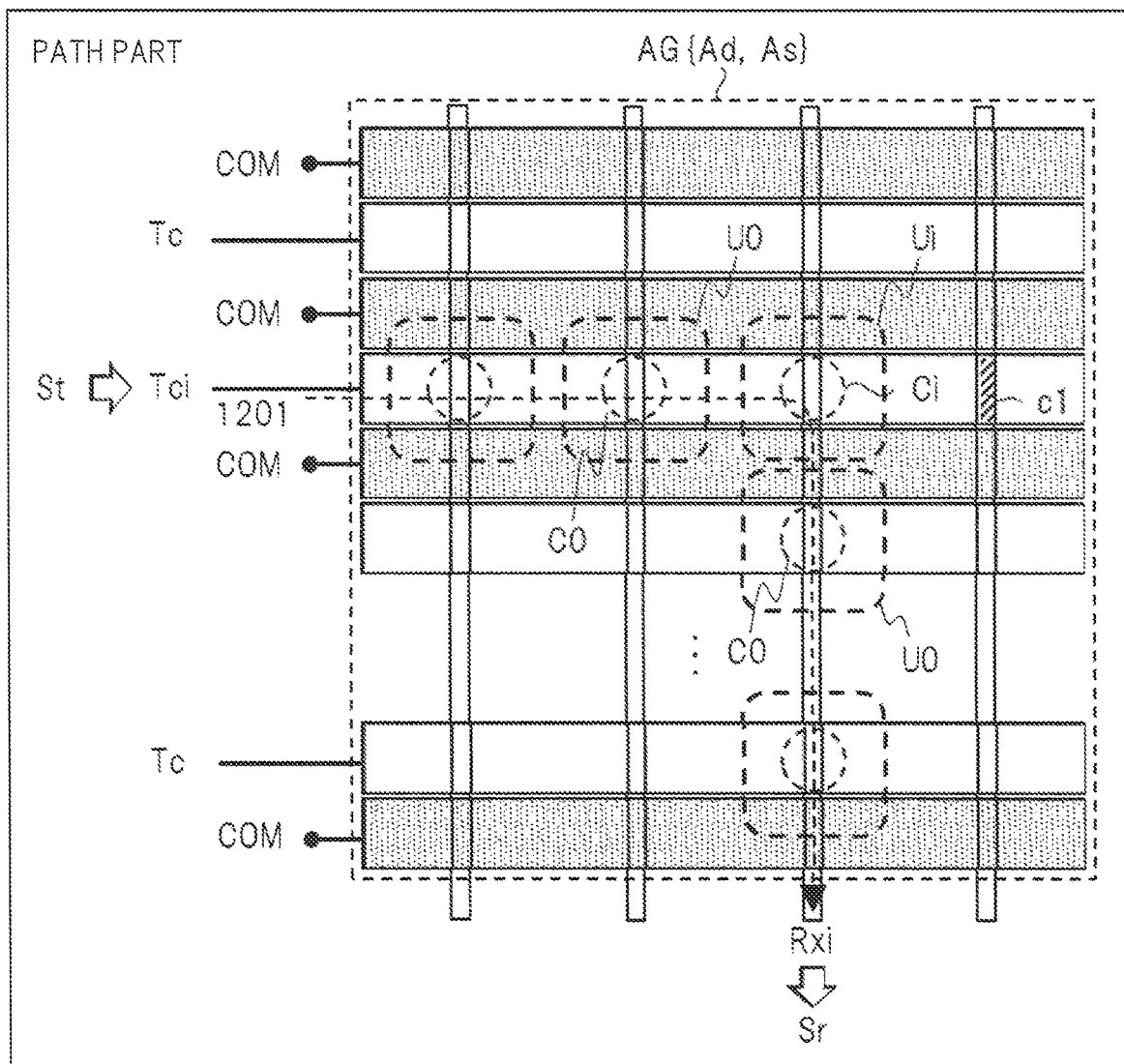
FIG. 12 is a drawing showing loads of paths for explaining effects of the embodiment 1A.

FIG. 12 is an explanatory drawing for supplementing explanations about effects of the embodiment 1A and shows the loads in the path parts including the capacitors Cx formed by the intersections of the shared electrodes Tc and the detection electrodes Rx. FIG. 12 shows an example of a single path part 1201 including a capacitor Ci and a unit of detection Ui serving as detection targets formed by the intersection of an electrode pair of a shared electrode Tci, which is a touch drive target, and a detection electrode Rxi, which is a detection target. The capacitor Ci is formed in the vicinity of an intersecting portion c1 of the shared electrode Tci and the detection electrode Rxi. In FIG. 12, the capacitor Ci is shown by a round mark, and, as the unit of detection Ui, a part including the capacitor Ci is shown by a substantially square shape.

In the path part 1201 in the above-described touch detection area As, the capacitor Ci and the unit of detection Ui of the intersecting portion c1, which are serving as a detection target for the signal which is transmitted through the path part 1201, and, other than that, non-detection-target capacitors C0 and units of detection U0 at the plurality of intersecting portions c1, which are intermediate pathways, are present. For the signal which is transmitted through the path part 1201 when the above-described capacitor Ci and the unit of detection Ui serve as detection targets, the units of detection U0 and the capacitors C0 which are not the detection target of the path part 1201 work as corresponding loads.

Upon scanning drive, the drive unit 50 applies the pulse of the touch drive signal St to, for example, the left-side end of the shared electrode Tci. The pulse of the touch drive signal St is transmitted to the X-direction right side through the shared electrode Tci and transmitted to the detection electrode Rxi via the capacitor Ci of the unit of detection Ui.

Then, the signal transmitted to the Y-direction lower side through the detection electrode Rxi is input to the touch detection part 60, and the touch detection part 60 detects the signal as the touch detection signal Sr.

In the path part 1201 including the shared electrode Tci, the capacitor Ci of the unit of detection Ui, and the detection electrode Rxi, the load in the unit of detection Ui including the capacitor Ci, which is the detection target, is reduced by making arrangements in the above-described electrode shape, etc. in the embodiment 1A. Moreover, also in the capacitors C0 of the units of detection U0, which are present on the way of the path part 1201 other than the capacitor Ci of the unit of detection Ui, loads are reduced also by making arrangements in the electrode shapes, etc. In the embodiment 1A, the loads in the above-described path part 1201 are reduced; therefore, the touch drive time related to the path part 1201 can be shortened. As well as the above-described path part 1201, also in other path parts which pass through the units of detection and capacitors at the other intersecting portions c1 in the screen area AG, the touch drive time can be shortened. Therefore, in the embodiment 1A, the touch detection period Ks including the touch drive time can be shortened.

Modification Examples

The embodiment 1A can be modified to the following modification examples. In the above-described configuration of FIG. 5, the width ht of the shared electrodes Tc and the width hc of the common electrodes COM are mutually the same, and the ratio of the widths is 1 to 1. Moreover, in the configuration shown in FIG. 5, the shared electrodes Tc and the common electrodes COM have the same flat-plate shapes. However, the present invention is not limited to the configuration shown in FIG. 5. The balance of the loads of the paths and touch detection sensitivity can be designed by adjusting the width ht of the shared electrodes Tc and the width hc of the common electrodes COM of the embodiment 1A with respect to the width h0 of the drive electrodes Tx of the comparative example.

Figure 29A:
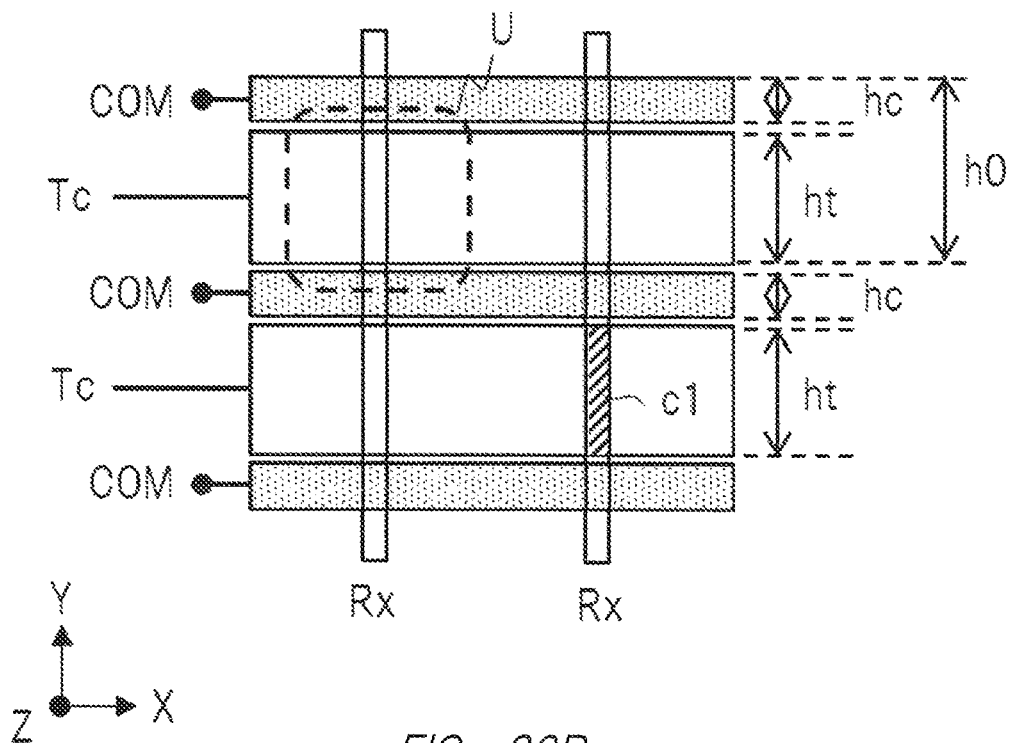
FIG. 29A is a drawing showing a modification example of the embodiment 1A.

FIG. 29A shows a first modification example. The first modification example has a configuration in which the width ht of the shared electrode Tc is larger than the width hc of the common electrode COM. In this configuration, the width ht of the shared electrode Tc is relatively large, and the area of the intersecting portion c1 is relatively large; therefore, touch detection sensitivity at the units of detection U formed by the capacitors formed in the vicinities of the intersecting portions c1 of the shared electrodes Tc and the detection electrodes Rx can be relatively increased.

Figure 29B:
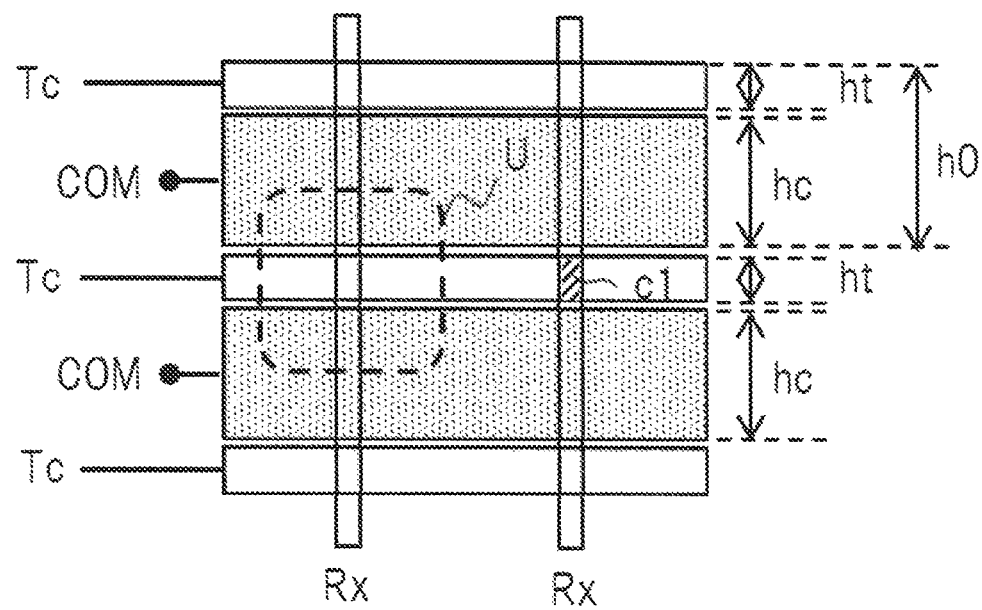
FIG. 29B is a drawing showing a modification example of the embodiment 1A.

FIG. 29B shows a second modification example. The second modification example has a configuration in which the width ht of the shared electrode Tc is smaller than the width hc of the shared electrode COM. In this configuration, the width ht of the shared electrode Tc is relatively small, and the area of the intersecting portion c1 is relatively small; therefore, the loads of the capacitors, which are formed in the vicinities of the intersecting portions c1 of the shared electrodes Tc and the detection electrodes Rx, and the path parts including the capacitors can be caused to be relatively low.

Figure 30A:
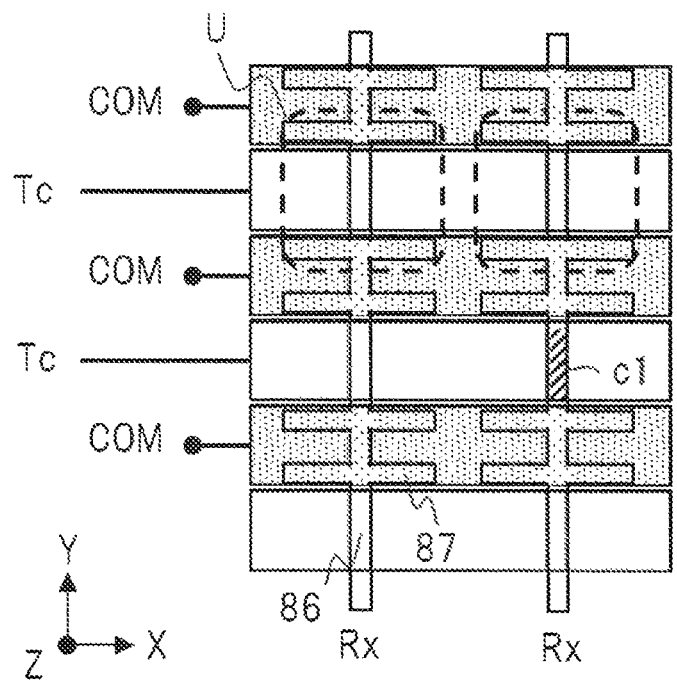
FIG. 30A is a drawing showing a modification example of the embodiment 1A.

FIG. 30A shows a third modification example. As the third modification example, each of the detection electrodes Rx has protruding electrode portions 87 formed by thin wirings protruding to the both left/right sides in the X-direction from a thin wiring part 86 extending in the Y-direction. The protruding electrode portion 87 of the detection electrode Rx is preferred to have a shape of which area overlapped with the shared electrode Tc in the Z-direction is small. The protruding electrode portion 87 is disposed, for example, in the Z-direction upper side of the common electrode COM. In the third modification example, electric fields are generated between the region of the shared electrode Tc between the detection electrodes Rx and the protruding electrode portion 87 of the detection electrode Rx; therefore, touch detection sensitivity can be increased. The protruding direction of the protruding electrode portions may be only one of the X-direction left/right sides.

Figure 30B:
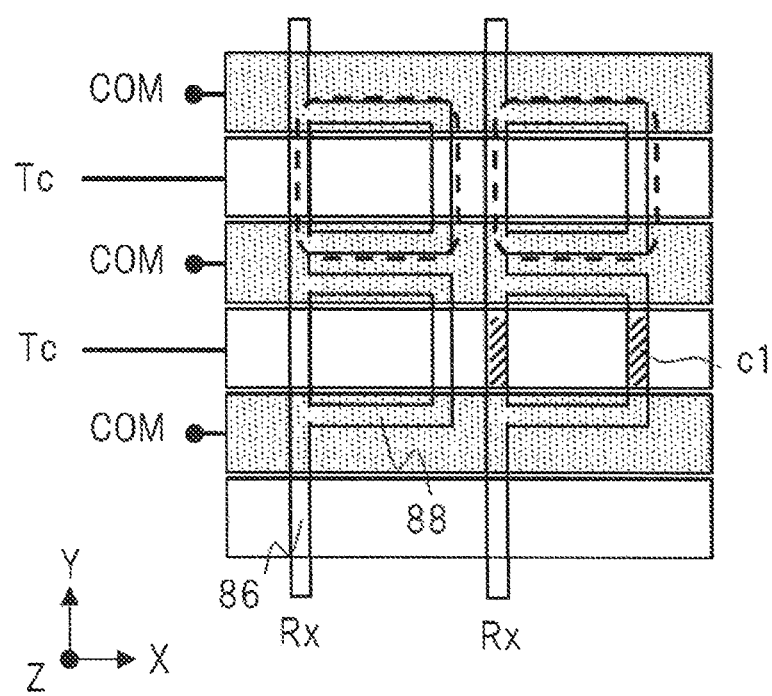
FIG. 30B is a drawing showing a modification example of the embodiment 1A.

FIG. 30B shows a fourth modification example. As the fourth modification example, the detection electrodes Rx have rectangular frame-like protruding electrode portions 88 in an XY planar view. An opening portion of the protruding electrode portion 88 is disposed in the Z-direction upper side of the region of the shared electrode Tc between the detection electrodes Rx. In the fourth modification example, electric fields are generated through the opening portion between the region of the shared electrode between the detection electrodes Rx and the protruding electrode portion 88 of the detection electrode Rx; therefore, touch detection sensitivity can be increased. The protruding direction of the protruding electrode portion 88 may be both of X-direction left/right sides.

Embodiment 1B

A touch-sensor-equipped display device 1 of an embodiment 1B will be explained with reference to FIG. 13 to FIG. 15, etc. In the touch-sensor-equipped display device 1 of the embodiment 1B, the configuration of the panel unit 5 is similar to the configuration of FIG. 5, etc. of the embodiment 1A, and a drive method and the configuration of the circuit unit 6 are different. The embodiment 1B uses the second drive method as a drive method matching the configuration of the electrode shapes, etc. of FIG. 5.

[Second Drive Method]

The second drive method in the embodiment 1B is shown by the signal S_COM, etc. of above-described diagram (e2) in FIG. 8. In the second drive method, control of the common electrodes COM in the touch detection period Ks is different from that of the first method. In the second drive method, the state of the common electrodes COM is switched between two states, i.e., a state of the electric potential using the voltage Vcom and a high-impedance state by the drive unit 50. Note that, in FIG. 8, the high-impedance state is shown as "Hi-Z".

In FIG. 8, an operation example of the second drive method is as described below. First, the operation in the display period Kd and the operation, etc. of the touch drive related to the signal S_Tc of the diagram (f) in FIG. 8 in the touch detection period Ks thereafter are similar to those of the first drive method of the embodiment 1A. In the touch detection period Ks, in relation to the signal S_COM of the diagram (e2) in FIG. 8, based on the control signals from the scanning circuit unit 53, the drive unit 50 switches all the common electrodes COM in the screen area AG from the state of the voltage Vcom to the high-impedance state.

In the case of the second drive method, in the touch detection period Ks, which is shorter than the display period Kd, the state of the common electrodes COM is changed from the electric potential of the voltage Vcom to the high-impedance state; as a result, the loads in the vicinities of the common electrodes COM and the detection electrodes Rx in the above-described paths can be reduced.

[Circuit Configuration of Drive Unit]

Figure 13:
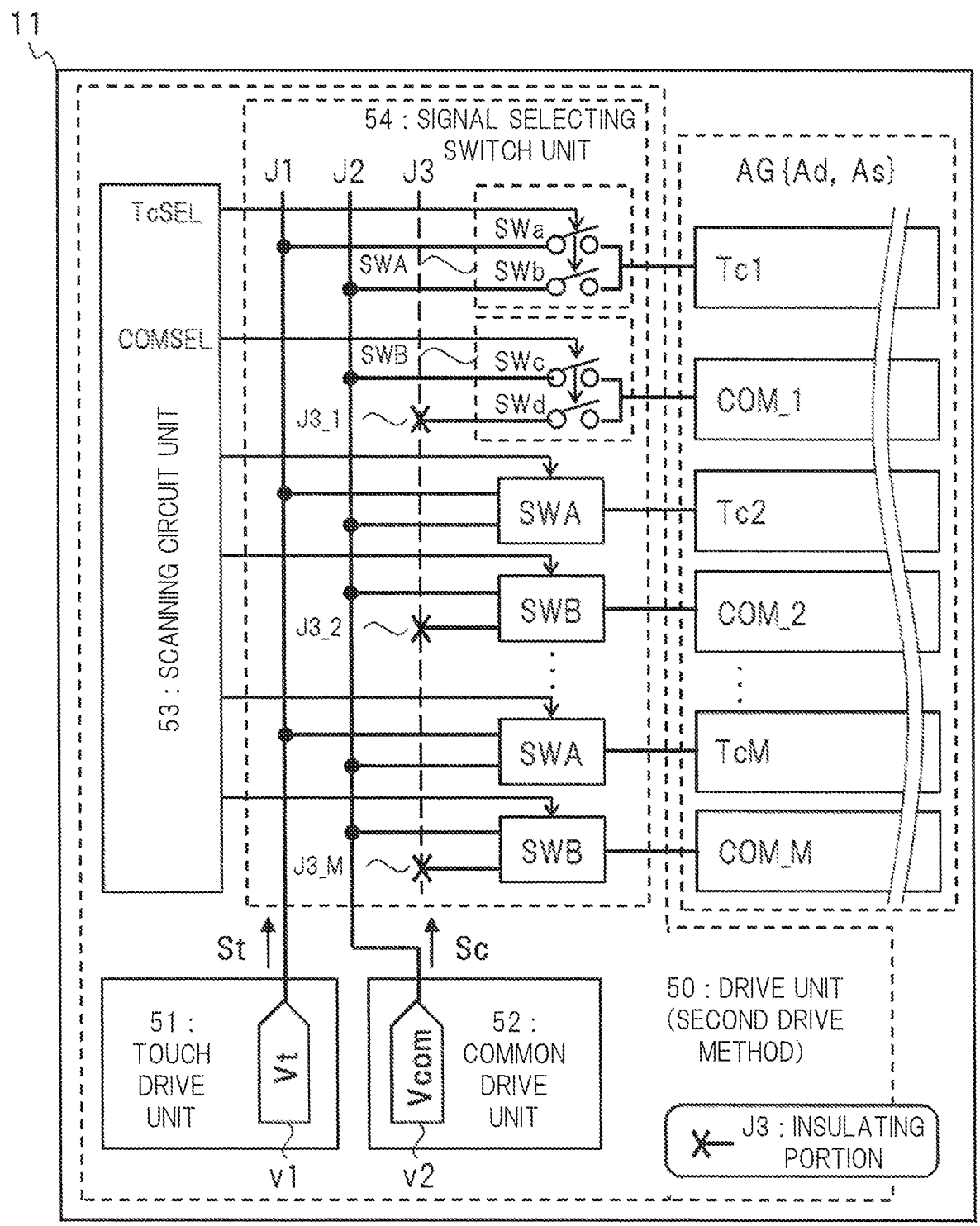
FIG. 13 is a drawing showing a circuit configuration example of a drive unit corresponding to a second drive method in a touch-sensor-equipped display device of an embodiment 1B of the present invention.

FIG. 13 shows a circuit configuration of the drive unit 50 corresponding to the second drive method in the embodiment 1B. As elements different from those of the configuration of FIG. 9, in the configuration of FIG. 13, the signal selecting switch part 54 has a plurality of selecting switch parts SWB, which are connected to the plurality of common electrodes COM of the screen area AG, in addition to the plurality of selecting switch parts SWA same as those of the embodiment 1A. The selecting switch parts SWB are connected to the wiring J2 of the signal Sc of the voltage Vcom and an insulating part J3. The scanning circuit unit 53 outputs control signals COMSEL for controlling the state of the common electrodes COM to the selecting switch parts SWB.

The drive unit 50 switches the plurality of common electrodes COM of the screen area AG to the high-impedance state by switching the state of the plurality of selecting switch parts SWB of the signal selecting switch parts 54 to a state connected to the insulating part J3 by the scanning circuit unit 53 in the touch detection period Ks.

The wiring J2 of the signal Sc is connected to input terminals of the plurality of selecting switch parts SWA and input terminals of the plurality of selecting switch parts SWB. The insulating part J3 includes an insulating part J3_1 to an insulating part J3_M respectively connected to the selecting switch parts SWB. The insulating part J3_1 to the insulating part J3_M are connected to input terminals of the corresponding selecting switch parts SWB. Outputs of the plurality of selecting switch parts SWB are connected to ends of the corresponding common electrodes COM among the plurality of common electrodes COM of the screen area AG.

Based on the control signals COMSEL from the scanning circuit unit 53, the signal selecting switch part 54 switches the outputs of the signals and voltages of the selecting switch parts SWB. According to the control signal COMSEL, the selecting switch part SWB carries out switching between a state of input of the signal Sc from the wiring J2 and a state of connection with the insulating pat J3 and selects one of the two states to obtain a state of output to the common electrode COM. Each of the selecting switch parts SWB includes a first switch element SWc and a second switch element SWd therein. The first switch element SWc has an input terminal connected to the wiring J2, an output terminal connected to the common electrode COM, and a control input terminal to which the control signal COMSEL is input. The second switch element SWd has an input terminal connected to the insulating part J3, an output terminal connected to the common electrode COM, and a control input terminal to which the control signal COMSEL is input. The control input of the switch element SWd is connected so that the on-and-off logic is reversed with respect to the control input of the switch element SWc.

The insulating part J3 is an electrically non-connected part for causing the state of the common electrode COM to the high-impedance state of FIG. 8. If the state of connection with the insulating part J3 is selected as the selected state of the selecting switch part SWB by the control signal COMSEL, the output state of the selecting switch part SWB becomes the high-impedance state. As a result, the common electrode COM connected to the selecting switch part SWB becomes the high-impedance state. In this high-impedance state, the common electrode COM is an electrically separated floating state.

[Shared-Electrode Output Unit]

Figure 14:
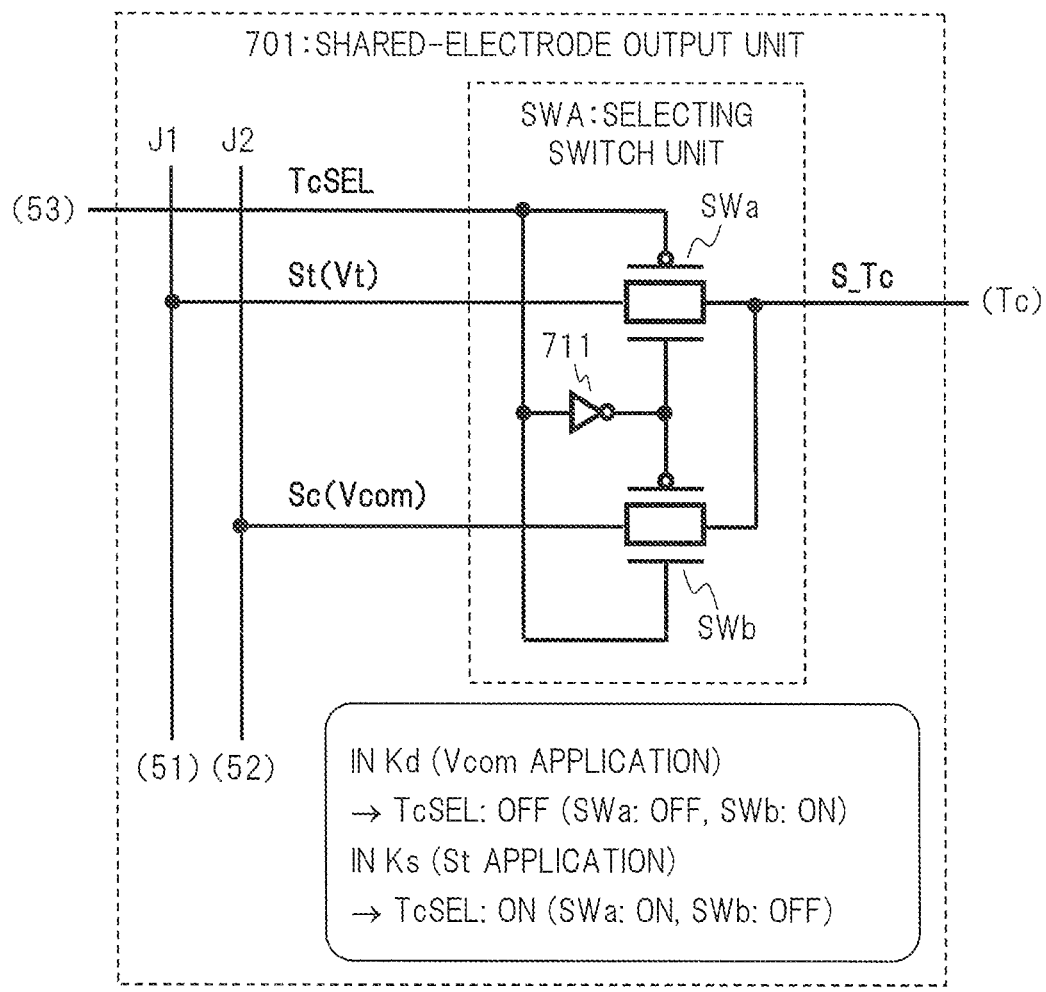
FIG. 14 is a drawing showing a configuration of a shared-electrode output part, which is a circuit unit corresponding to an output to one shared electrode in the drive unit of the embodiment 1B.

FIG. 14 shows a configuration example of a shared-electrode output unit 701, which is a circuit unit corresponding to the output to the single shared electrode Tc in the drive unit 50 of the embodiment 1B. The shared-electrode output unit 701 has a selecting switch part SWA of FIG. 13. In accordance with the control signal TcSEL, the shared-electrode output unit 701 selects one from the two inputs, i.e., the input of the touch drive signal St using the voltage Vt from the wiring J1 and the input of the signal Sc using the voltage Vcom from the wiring J2 by the selecting switch part SWA and outputs the signal as a signal S_Tc to the shared electrode Tc.

The selecting switch part SWA has the switch element SWa connected to the wiring J1, the switch element SWb connected to the wiring J2, and a NOT circuit 711 connected to the line of the control signal TcSEL. The switch element SWa and the switch element SWb are formed of CMOS switches, etc. The control signal TcSEL from the scanning circuit unit 53 is input to the NOT circuit 711, and the output thereof is connected to complementary control input terminals of the switch element SWa and the switch element SWb. The NOT circuit 711 outputs a logically inverted signal of the on and off of the control signal TcSEL.

The switch element SWa has an input terminal to which the touch drive signal St based on the voltage Vt from the wiring J1 is input and has an output terminal, which is connected to the shared electrode Tc and outputs the signal S_Tc to the shared electrode Tc. The control signal TcSEL is input to the complementary control input terminal of the switch element SWa. The switch element SWb has an input terminal to which the signal Sc using the voltage Vcom from the wiring J2 is input and an output terminal, which is connected to the shared electrode Tc and outputs the signal S_Tc to the shared electrode Tc. The inverted signal of the control signal TcSEL from the NOT circuit 711 is input to the complementary control input terminal of the switch element SWb.

An operation example corresponding to the signal S_Tc of the diagram (f) in FIG. 8 in the scanning circuit unit 53 and the shared-electrode output unit 701 will be described below. First, in the display period Kd, the scanning circuit unit 53 turns off the control signals TcSEL to all of the shared electrodes Tc so as to, for example, apply a low-voltage signal. If the control signal TcSEL is off, in the shared-electrode output unit 701, the switch element SWa of the selecting switch part SWA is off, and the switch element SWb is on so as to, for example, apply a high-voltage signal. As a result, the selecting switch part SWA outputs the signal Sc selected by the turned-on switch element SWb to the shared electrode Tc as the signal S_Tc. As a result, as shown in the diagram (f) in FIG. 8, the common voltage Vcom is applied to all the shared electrodes Tc.

Then, in the touch detection period Ks, the scanning circuit unit 53 turns on the control signal TcSEL to the shared electrode Tc serving as a scanning target and turns off the control signal TcSEL to the other shared electrodes Tc. In the shared-electrode output unit 701, if the control signal TcSEL is on, the switching element SWa of the selecting switch part SWA is turned on, and the switch element SWb is turned off. As a result, the selecting switch part SWA outputs the touch drive signal St, which is selected by the turned-on switch element SWa, to the shared electrode Tc as the signal S_Tc. As a result, as shown in the diagram (f) in FIG. 8, the touch drive signal St is applied to the shared electrode Tc serving as the scanning target.

[Common-Electrode Output Unit]

Figure 15:
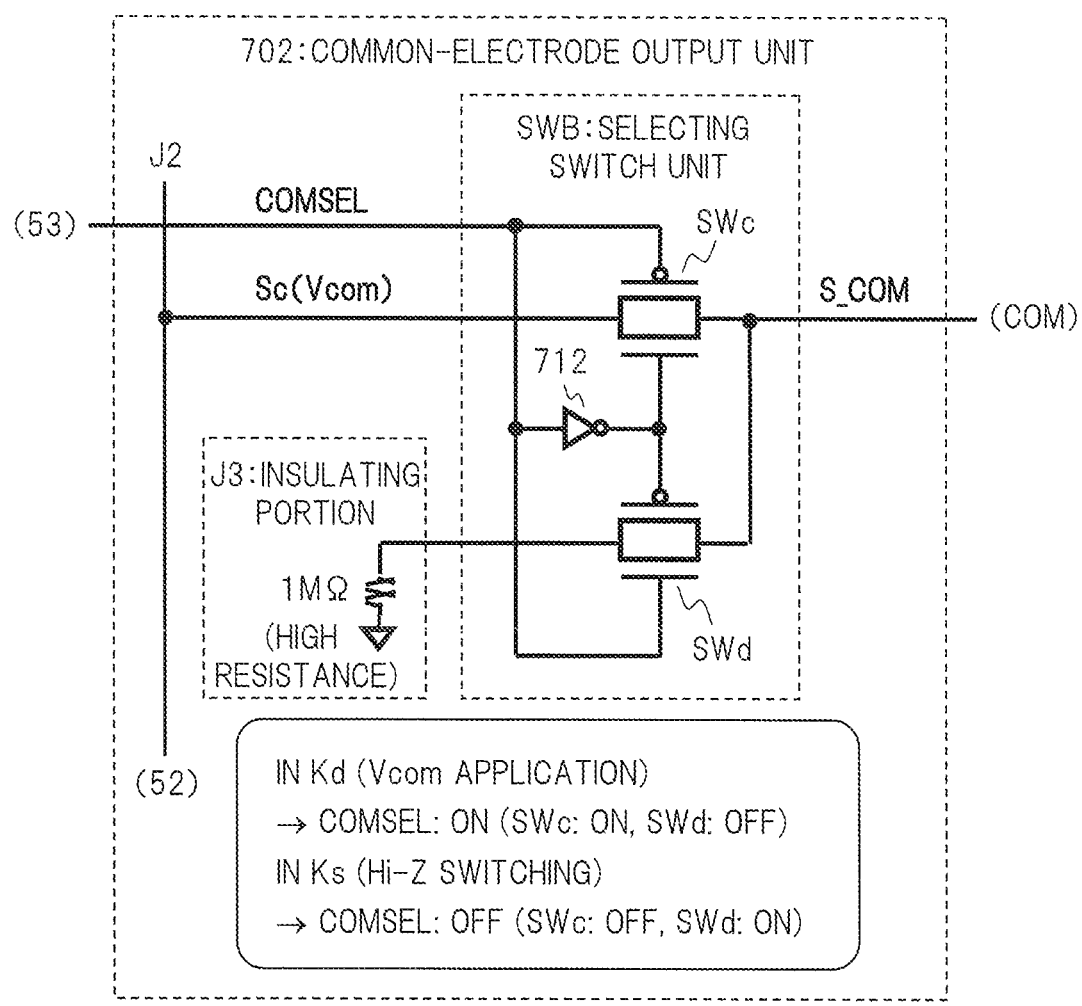
FIG. 15 is a drawing showing a configuration of a common-electrode output part, which is a circuit unit corresponding to output to one common electrode in the drive unit of the embodiment 1B.

FIG. 15 shows a configuration example of a common-electrode output unit 702, which is a circuit unit corresponding to output to the single common electrode COM in the drive unit 50 of the embodiment 1B. The common-electrode output unit 702 has the selecting switch part SWB of FIG. 13. The common-electrode output unit 702 selects one from two states, i.e., a state in which the signal Sc using the voltage Vcom from the wiring J2 is input and a state connected to the insulating part J3 by the selecting switch part SWB in accordance with the control signal COMSEL and obtains the state of the signal S_COM to the common electrode COM.

The selecting switch part SWB has the switch element SWc connected to the wiring J2, the switch element SWd connected to the wiring J2, and a NOT circuit 712 connected to the line of the control signal COMSEL. The switch element SWc and the switch element SWd are formed of CMOS switches, etc. The control signal COMSEL from the scanning circuit unit 53 is input to the NOT circuit 712, and the output thereof is connected to complementary control input terminals of the switch element SWc and the switch element SWd. The NOT circuit 712 outputs a logically inverted signal of on and off of the control signal COMSEL.

The switch element SWc has an input terminal to which the signal Sc based on the voltage Vcom from the wiring J2 is input and has an output terminal connected to the common electrode COM to output the signal S_COM to the common electrode COM. The switch element SWc has the complementary control input terminal to which the control signal COMSEL is input. The switch element SWc has an input terminal connected to the insulating part J3 and has an output terminal connected to the common electrode COM to output the signal S_COM to the common electrode COM. The switch element SWd has the complementary control input terminal to which the inverted signal of the control signal COMSEL from the NOT circuit 712 is input.

The insulating part J3 is an electrically non-connected part having a high resistance such as 1 MΩ. In the selecting switch part SWB, if the state of connection with the insulating part J3 is selected by turning on the switch element SWd, the high-impedance state is obtained as the signal S_COM of the output to the common electrode COM. The insulating part J3 may be formed of a circuit unit such as a three-state buffer.

An operation example corresponding to the signal S_COM of the diagram (e2) in FIG. 8 in the scanning drive unit 53 and the common-electrode output unit 702 will be described below. First, in the display period Kd, the scanning circuit unit 53 turns on the control signal COMSEL to all the common electrodes COM so as to, for example, apply a low voltage signal. If the control signal COMSEL is on, in the common-electrode output unit 702, the switch element SWc of the selecting switch part SWB is on, and the switch element SWd is off so as to, for example, apply a high voltage signal. As a result, the selecting switch part SWB outputs the signal Sc, which is selected by turning on the switch element SWc, to the common electrode COM as the signal S_COM. As a result, as shown in the diagram (e2) in FIG. 8, the common voltage Vcom is applied to all of the common electrodes COM.

Then, in the touch detection period Ks, the scanning circuit unit 53 switches the control signal COMSEL to all the common electrodes COM to off. If the control signal COMSEL is off, in the common-electrode output unit 702, the switch element SWc of the selecting switch part SWB is off, and the switch element SWd is on. As a result, the selecting switch part SWB is in the state connected to the insulating part J3, which is selected by turning on the switch element SWd. As a result, as shown in the diagram (e2) in FIG. 8, all the common electrodes COM become the high-impedance state.

Embodiment 1C

A touch-sensor-equipped display device 1 of an embodiment 1C will be explained with reference to FIG. 16, etc. In the touch-sensor-equipped display device 1 of the embodiment 1C, the configuration of the panel unit 5 is similar to the configuration of the embodiment 1A, and the drive method and the configuration of the circuit unit 6 are different. The embodiment 1C uses the third drive method as a drive method matching the configuration of the electrode shapes, etc. of FIG. 5.

[Third Drive Method]

The third drive method in the embodiment 1C is shown by the signal S_COM, etc. of above-described diagram (e3) in FIG. 8. In the third drive method, the control of the common electrodes COM in the touch detection period Ks is different from that of the first drive method. In the third drive method, the drive unit 50 switches the state of the common electrode COM between two states, i.e., a state of the electric potential using the voltage Vcom and a state of the electric potential using a predetermined voltage Ve different from the voltage Vcom.

An operation example of the third drive method in FIG. 8 will be described below. First, an operation in the display period Kd and an operation, etc. of touch drive related to the signal S_Tc of the diagram (f) in FIG. 8 in the next touch detection period Ks are similar to those of the first drive method of the embodiment 1A. In relation to the signal S_COM of the diagram (e3) in FIG. 8, in the touch detection period Ks, based on the control signals from the scanning circuit unit 53, the drive unit 50 switches all the common electrodes COM in the screen area AG from the state of the voltage Vcom to the state of the electric potential using the voltage Ve.

[Circuit Configuration of Drive Unit]

Figure 16:
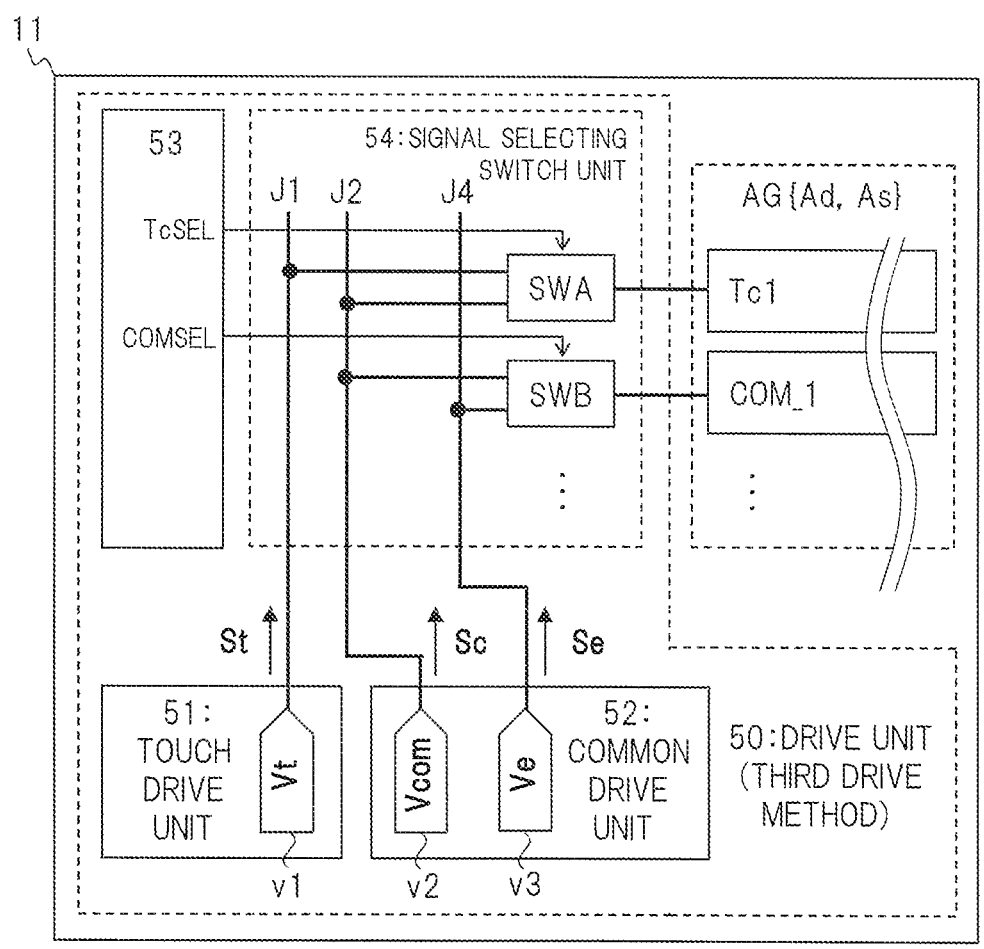
FIG. 16 is a drawing showing a circuit configuration example of a drive unit corresponding to a third drive method in a touch-sensor-equipped display device of an embodiment 1C of the present invention.

FIG. 16 shows a circuit configuration of the drive unit 50 corresponding to the third drive method in the embodiment 1C. As elements different from those of the first drive method, the drive unit 50 of the third drive method includes a circuit unit which generates the signal Se using the voltage Ve, a wiring J4 which transmits the signal Se, a selecting switch part SWB which selects one from the signal Sc and the signal Se and outputs that to the common electrode COM, etc. The scanning circuit unit 53 outputs the control signals COMSEL for controlling the common electrodes COM.

The common drive unit 52 includes a voltage source v3, which generates the predetermined direct-current voltage Ve, as a signal voltage source. The common drive unit 52 applies the signal Se using the voltage Ve from the voltage source v3 to the wiring J4. The signal Se of the wiring J4 is input to an input terminal of the selecting switch part SWB of the signal selecting switch part 54.

In accordance with the control signal COMSEL from the scanning circuit unit 53, the selecting switch part SWB selects one from the two, i.e., the signal Sc using the voltage Vcom and the signal Se using the voltage Ve and outputs the signal to the common electrode COM. The internal configuration of the selecting switch part SWB can be formed of switch elements, a NOT circuit, etc. in the same manner as the embodiment 1B.

In the third drive method, in the touch detection period Ks, the electric potential of the common electrode COM can be changed to the electric potential using the voltage Ve, which is different from the electric potential using the voltage Vcom in the display period Kd. The electric potential using the voltage Ve can achieve, for example, a voltage using the suitable voltage Ve corresponding to the voltage Vt of the touch drive signal St at the shared electrode Tc adjacent to the common electrode COM.

Modification Example

In relation to the first drive method of the above-described embodiment 1A, the second drive method of the embodiment 1B, and the third drive method of the embodiment 1C, a following modification example can be employed. A touch-sensor-equipped display device of this modification example has a function of arbitrarily carrying out switching among a control state according to the first drive method, a control state according to the second drive method, and a control state according to the third drive method. The touch-sensor-equipped display device of this modification example has a circuit configuration of the drive unit 50 capable of carrying out the switching of the above-described control states, and this configuration is a configuration integrating FIG. 9, FIG. 13, FIG. 16, etc. The drive method of this modification example can arbitrarily carry out switching between the control state in which the electric potential using the voltage Vcom is fixed as the state of the common electrodes COM and the control state in which the high-impedance state is obtained. Moreover, the drive method of this modification example can arbitrarily carry out switching between the control state in which the electric potential using the voltage Ve is used as the state of the common electrodes COM and the control state in which the high-impedance state is obtained.

Embodiment 1D

A touch-sensor-equipped display device 1 of an embodiment 1D will be explained with reference to FIG. 17. In the touch-sensor-equipped display device 1 of the embodiment 1D, the configuration of the panel unit 5 is similar to the configuration of FIG. 5 of the embodiment 1A, and the scanning drive method by the circuit unit 6 is different. The scanning drive method of the embodiment 1D will be referred to as a second scanning drive method.

[Second Scanning Drive Method]

Figure 17:
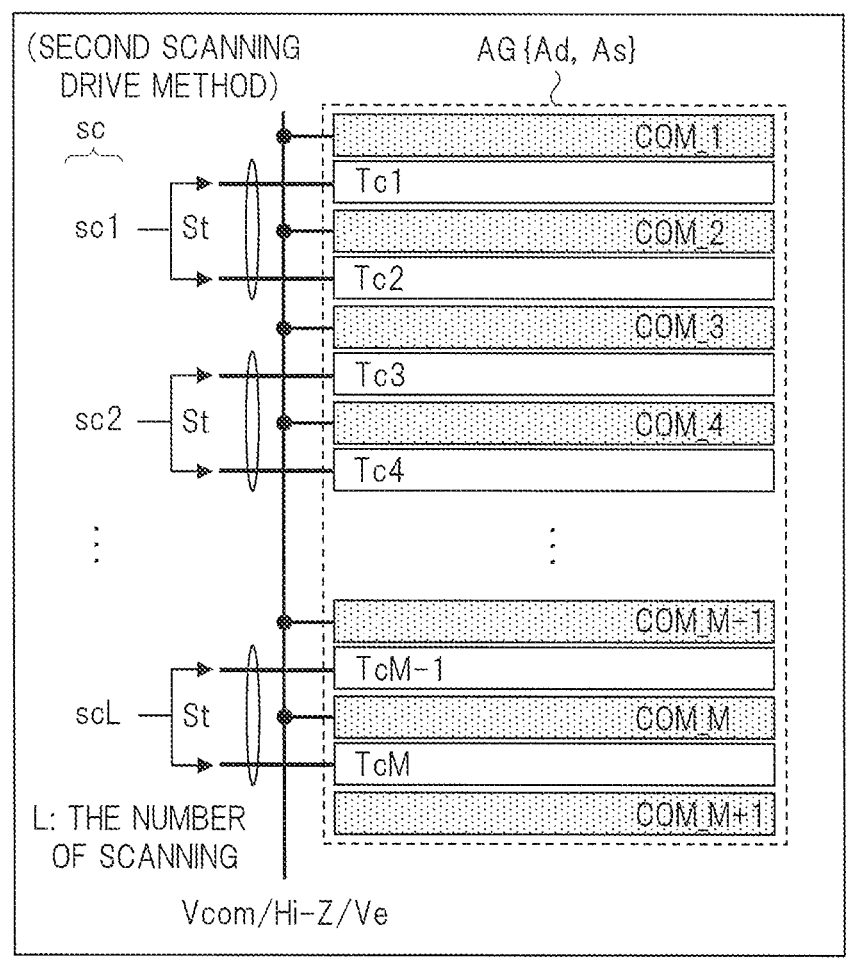
FIG. 17 is a drawing showing an example of scanning drive of a screen area as a scanning drive method in a touch-sensor-equipped display device of an embodiment 1D of the present invention.

FIG. 17 shows a scanning drive example of the plurality of shared electrodes Tc of the screen area AG in the touch detection period Ks as the second scanning drive method in the embodiment 1D. In the second scanning drive method, in the touch detection period Ks, the drive unit 50 carries out scanning drive of sequentially applying the touch drive signal St to two of the M shared electrodes Tc of the touch detection area As at a time from the Y-direction upper side by using the scanning circuit unit 53. In the second scanning drive method, the two shared electrodes Tc are driven at the same time by the same touch drive signal St as scanning targets and units of scanning in every single scanning. FIG. 17 shows only one-side scanning drive in the both-side drive configuration.

In first scanning sc1 of the scanning sc of the touch detection area As, the drive unit 50 applies the touch drive signal St to one set of two electrodes, i.e., the shared electrode Tc1 and the shared electrode Tc2 as scanning targets at the same time. Then, as second scanning sc2, the drive unit 50 applies the touch drive signal St to one set of two electrodes, i.e., the shared electrode Tc3 and the shared electrode Tc4 as scanning targets at the same time. The drive unit 50 similarly repeats scanning in the unit of the one set of two electrodes and applies the touch drive signal St to the one set of two electrodes, i.e., the shared electrode TcM−1 and the shared electrode TcM at the same time as Lth scanning scL. "L" which is the number of scanning is L=M/2, wherein "M" is the number of the shared electrodes Tc.

As described above, in the second scanning drive method, when the entirety of the touch detection area As is subjected to scanning one time, the touch drive of the set of two shared electrodes Tc is executed L times. In the second scanning drive method, the number of scanning of the touch detection area As is small compared with the first scanning drive method; therefore, the touch detection period Ks can be shortened.

Moreover, in the second scanning drive method of the embodiment 1D, upon scanning of each of the above-described shared electrodes Tc, the common electrodes COM adjacent to, from the Y-direction upper/lower sides, the shared electrodes Tc serving as scanning targets are controlled to, for example, the electric potential using the voltage Vcom of above-described FIG. 8. As a result of this control, the loads of the path parts including the shared electrodes Tc serving as scanning targets are reduced, and the touch detection sensitivity of the units of detection U at the shared electrodes Tc serving as the scanning targets is increased.

The scanning order is not limited to the scanning order of FIG. 17, and the drive unit 50 can carry out scanning in an optional order while selecting arbitrary two scanning electrodes Tc in the screen area AG as scanning targets by using the above-described scanning circuit unit 53. For example, the drive unit 50 is not limited to select the two shared electrodes Tc which are mutually adjacent via the common electrode COM in the Y-direction in the screen area AG, but may select the two shared electrodes Tc which are distant from each other via one or more shared electrodes Tc in the Y direction. Moreover, the number of the shared electrodes Tc driven at the same time by the scanning of one time is not limited to two, and a configuration in which a plurality of electrodes such as three or four electrodes serve as scanning targets as one set can be used in the same manner as the above-described case.

In the case of the above-described second drive method, in the first scanning drive method of FIG. 10 and the second scanning drive method of FIG. 17, the common electrodes COM in the touch detection area As are controlled to the high-impedance state. In the case of the above-described third drive method, in the first scanning drive method of FIG. 10 and the second scanning drive method of FIG. 17, the common electrodes COM of the touch detection area As are controlled to the state of the electric potential using the voltage Ve.

Embodiment 1E

A touch-sensor-equipped display device 1 of an embodiment 1E will be explained by using FIG. 18, etc. In the touch-sensor-equipped display device 1 of the embodiment 1E, the configuration of the panel unit 5 is similar to the configuration of FIG. 5 of the embodiment 1A, and the scanning drive method and the configuration of the circuit unit 6 are different. The scanning drive method of the embodiment 1E will be referred to as a third scanning drive method for the sake of explanation.

In the third scanning drive method of the embodiment 1E, in the touch detection period Ks, in scanning drive of sequentially driving the plurality of shared electrodes Tc of the touch detection area As, the touch drive signals St are applied to the shared electrode Tc serving as a scanning target, and the other non-scanning-target shared electrodes Tc are switched to the high-impedance state.

[Third Scanning Drive Method]

Figure 18:
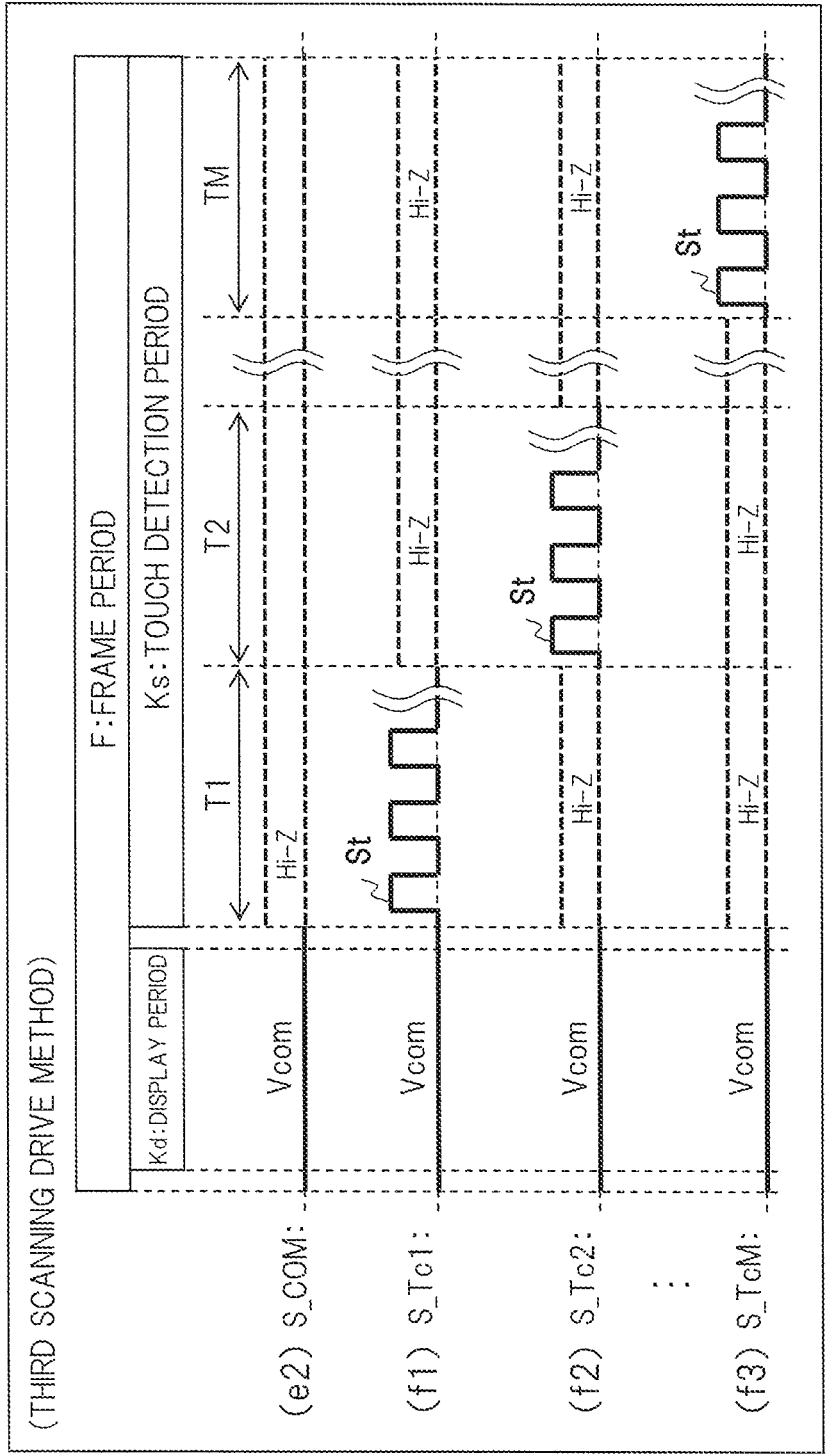
FIG. 18 shows a drawing showing a configuration example of a scanning drive method and a drive period in a touch-sensor-equipped display device of an embodiment 1E of the present invention.

FIG. 18 shows a configuration example of a drive period corresponding to the third scanning drive method in the embodiment 1E. In the frame period F, first, the display period Kd is similar to that described above, in in which all of the shared electrodes Tc and all of the common electrodes COM of the screen area AG are controlled to a state of the electric potential using the common voltage Vcom. In the touch detection period Ks, the plurality of common electrodes COM are controlled to the high-impedance state, which is, for example, the same as the signal S_COM of the above-described diagram (e2) in FIG. 8.

In the touch detection period Ks, the drive unit 50 sequentially subjects the plurality of shared electrodes Tc of the touch detection area As to scanning drive one by one, for example, in the same manner as above-described FIG. 10. A signal S_Tc1 of a diagram (f1) in FIG. 18 shows the state of drive of the first shared electrode Tc1. "T1" represents touch drive time in the scanning drive of the shared electrode Tc1. During the touch drive time T1, the shared electrode Tc1 is a scanning target, and the other shared electrodes Tc in the touch detection area As are not scanning targets. In the touch drive time T1, the pulses of the touch drive signal St are applied to the shared electrode Tc1 serving as the scanning target.

In the same manner, a signal S_Tc2 of a diagram (f2) in FIG. 18 shows the state of drive of the second shared electrode Tc2. In touch drive time T2 subsequent to the touch drive time T1, the pulses of the touch drive signal St are applied to the shared electrode Tc2. Similarly, a signal S_TcM of the diagram (f3) in FIG. 18 shows the state of drive of the Mth shared electrode TcM. In the touch drive time TM, the pulses of the touch drive signal St are applied to the shared electrode TcM.

In the third scanning drive method, while the touch drive signal St is applied to the shared electrode Tc1 in the touch drive time T1, the drive unit 50 carries out control so that the shared electrode Tc2 to the shared electrode TcM, which are the other shared electrodes, obtain the high-impedance state. When the scanning of the shared electrode Tc1 of the touch drive time T1 is finished, the drive unit 50 controls the state of the shared electrode Tc1 to be the high-impedance state in the time in and after the next touch drive time T2. Similarly, the drive unit 50 carries out control so that the touch drive signal St is applied to each of the shared electrodes Tc in the touch detection area As only upon scanning and is caused to be in the high-impedance state in other time.

As described above, in the third scanning drive method, while a certain one of the shared electrodes Tc in the screen area AG is subjected to scanning drive, all of the common electrodes COM and the shared electrodes Tc near the shared electrode Tc on the Y-direction upper and lower sides are maintained to the high-impedance state. As a result, the loads at the path parts including the shared electrode Tc serving as the scanning target are reduced, and the touch detection sensitivity of each of the units of detection at the shared electrode Tc serving as the scanning target can be increased.

[Circuit Configuration of Drive Unit]

Figure 19:
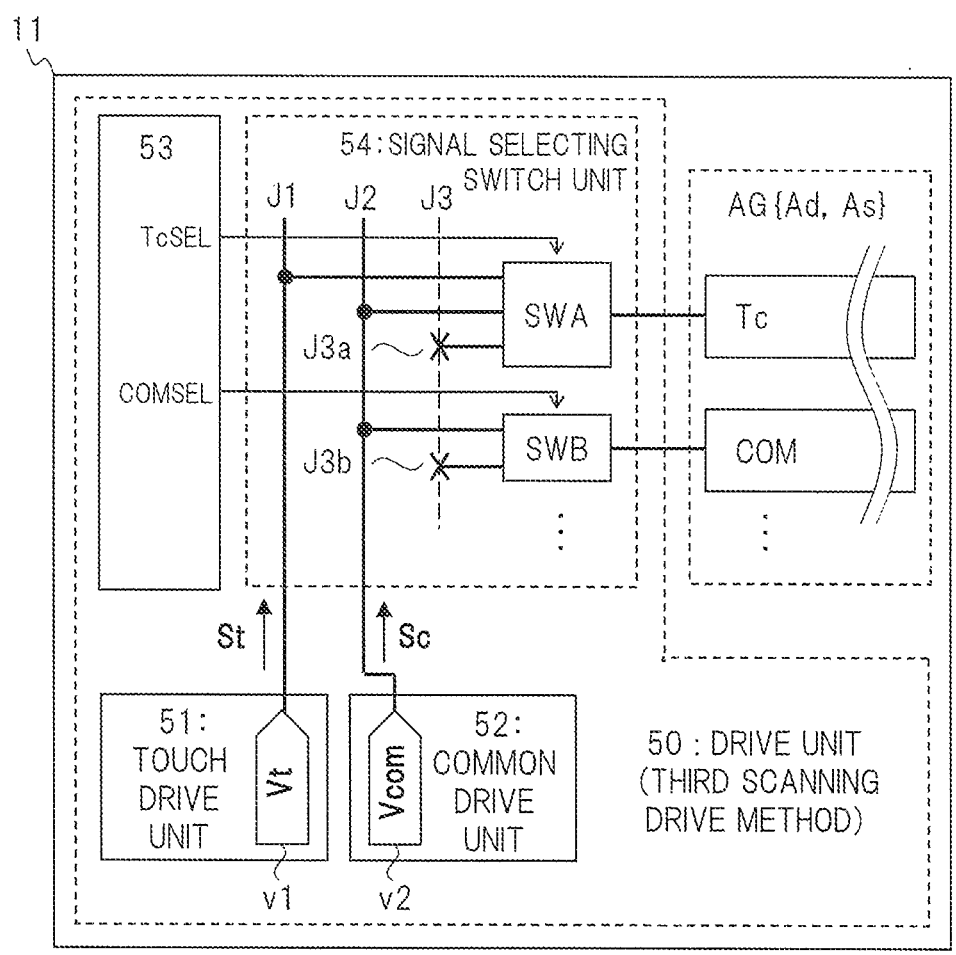
FIG. 19 is a drawing showing a circuit configuration example of a drive unit corresponding to the scanning drive method of the embodiment 1E.

FIG. 19 shows a circuit configuration of the drive unit 50 corresponding to the third scanning drive method in the embodiment 1E. As elements different from those of the configuration of FIG. 13 of the embodiment 1B, in the configuration of the drive unit 50, the signal selecting switch part 54 includes selecting switch parts SWA having an input connected to an insulating part J3a in addition to an input of the touch drive signal St from the wiring J1 and an input of the signal Sc using the voltage Vcom from the wiring J2 as the selecting switch part SWA connected to the shared electrode Tc. In accordance with the control signal TcSEL from the scanning circuit unit 53, the selecting switch part SWA selects one from three states of connection with the touch drive signal St, the signal Sc, and the insulating part J3a and achieves a state in which the selected one is output to the shared electrode Tc. The configuration of the selecting switch part SWB is similar to that of the embodiment 1B and has an input of the signal Sc from the wiring J2 and an input connected to the insulating part J3b.

In the embodiment 1E, as a modification example, in the touch detection period Ks, the shared electrodes Tc, which are not scanning targets, may be controlled to a state of the electric potential using the voltage Ve like the above-described third drive method instead of the high-impedance state. In addition, as another modification example, the embodiment 1E may be combined with the embodiment 1D described above. In this case, in a touch detection period, the drive unit 50 sequentially applies touch-drive signals to two or more of the plurality of drive electrodes taken as a unit of scanning.

Embodiment 2

Figure 20:
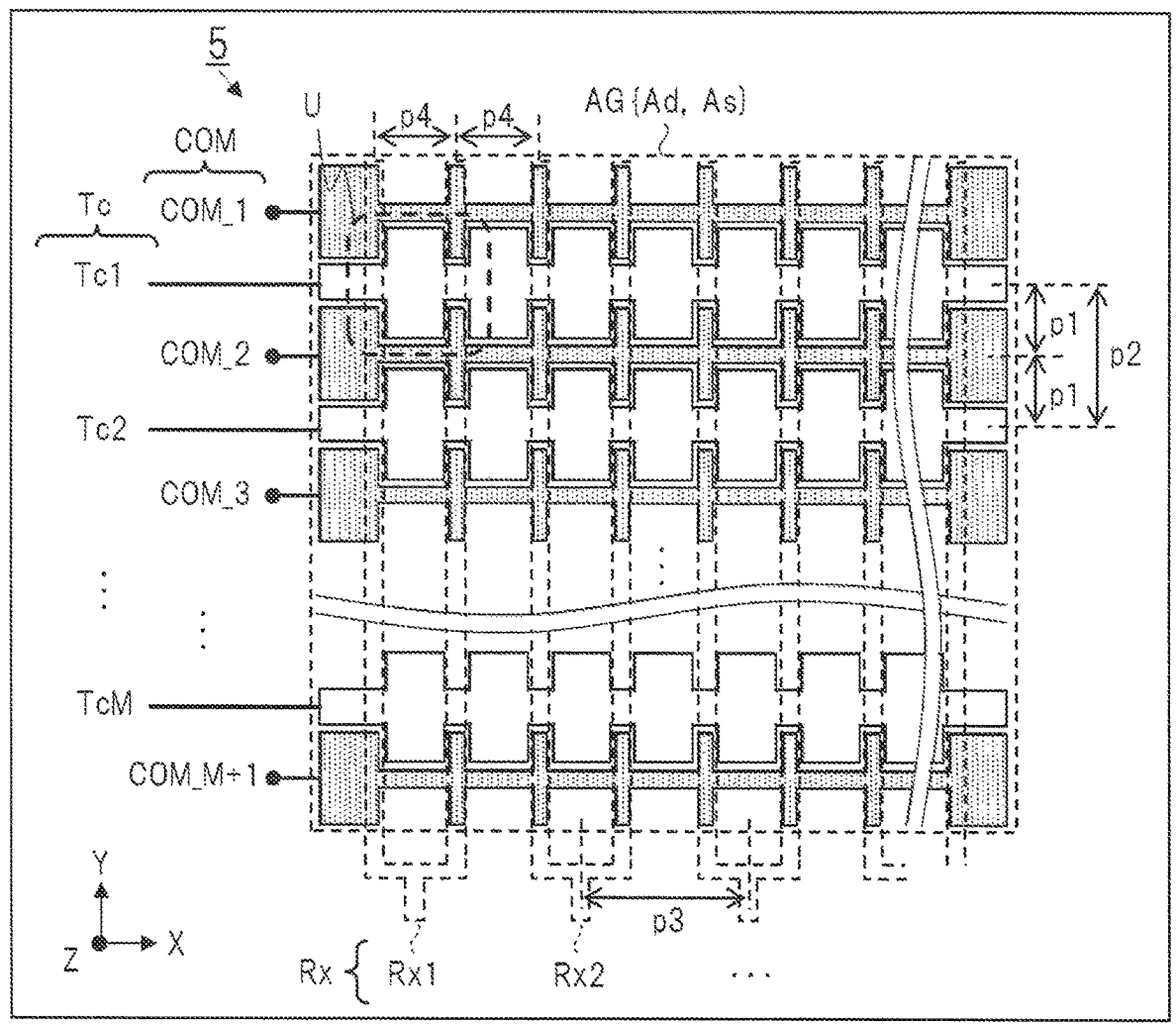
FIG. 20 is a drawing showing a configuration of an XY-plane of electrodes of a screen area in a touch-sensor-equipped display device of a second embodiment of the present invention.
Figure 21:
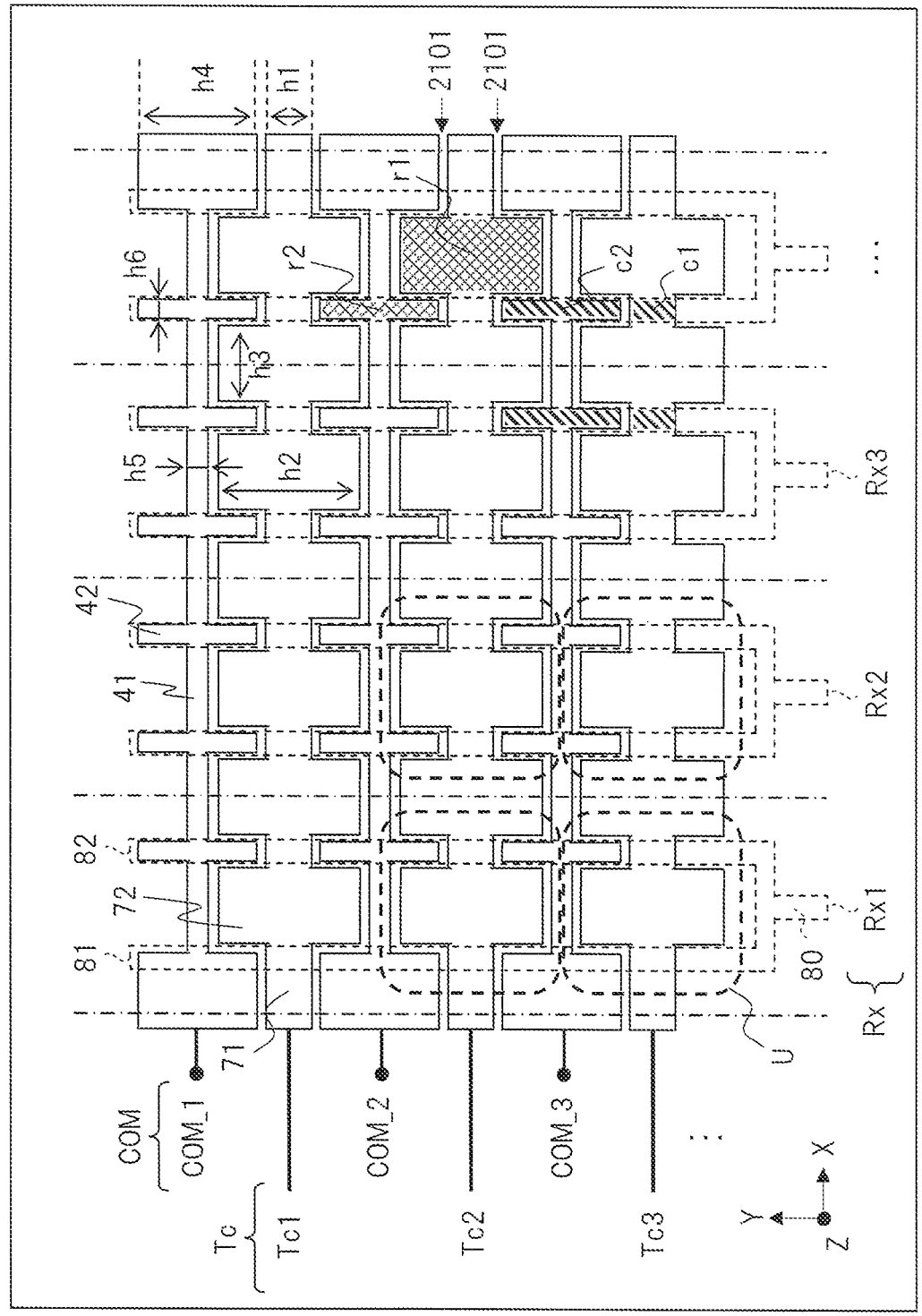
FIG. 21 is a partially enlarged view of the electrode configuration of FIG. 20.
Figure 22:
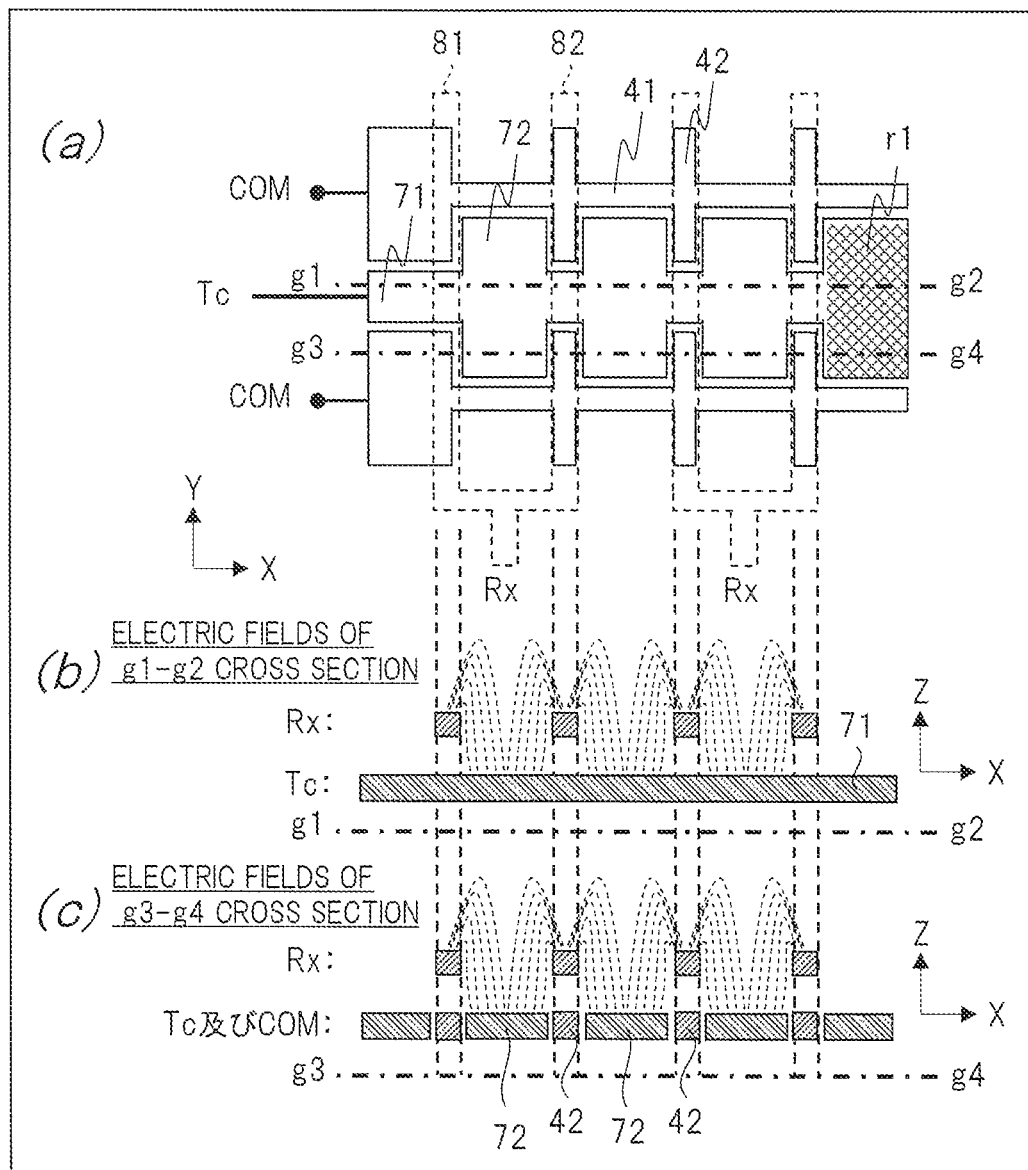
FIG. 22 includes diagrams (a) to (c) showing states of generation of electric fields corresponding to the electrode configuration of FIG. 20.

With reference to FIG. 20 to FIG. 22, a touch-sensor-equipped display device 1 of a second embodiment of the present invention will be explained. The touch-sensor-equipped display device 1 of the second embodiment and a third embodiment has a configuration in which arrangements are further made in the electrode shapes including the shared electrodes Tc and the common electrodes COM of the panel unit 5 of the embodiment 1. By virtue of the present configuration, the loads at the paths including the capacitors formed by the intersections of the shared electrodes Tc and the detection electrodes Rx are reduced, and the touch detection sensitivity is maintained or improved. As the configurations of the entirety of the touch-sensor-equipped display device 1 of the second embodiment and the third embodiment, the circuit unit 6, etc., configurations similar to those of FIG. 1 to FIG. 3, etc. of the embodiment 1A can be used. Drive methods of the second embodiment and the third embodiment may use the configurations similar to the drive method, etc. of FIG. 8 of the embodiment 1A.

[Electrode Configuration of Screen Area]

FIG. 20 shows a configuration of an XY-plane of electrodes of the screen area AG in the panel unit 5 of the touch-sensor-equipped display device 1 of the second embodiment. FIG. 20 particularly shows a configuration of the shared electrodes Tc and the common electrodes COM in the TFT substrate 11 side by solid lines and shows a configuration of the detection electrodes Rx in the color filter board 12 side by broken lines.

The configuration of the panel unit 5 of the second embodiment has a configuration in which the area of the intersecting portions of the shared electrodes Tc and the detection electrodes Rx is reduced as arrangements in the electrode shapes compared with the comparative example of above-described FIG. 38. Moreover, corresponding to the configuration, the panel unit has a configuration in which the area of the intersecting portions of the common electrodes COM and the detection electrodes Rx is large, a configuration in which the area of the regions excluding the intersecting portions of the shared electrodes Tc with the detection electrodes Rx is as large as possible, etc. By virtue of the present configurations, the loads of the above-described path parts including the shared electrodes Tc, the units of detection U, and the detection electrodes Rx are reduced, and the touch detection sensitivity of the units of detection U is increased.

Each of the shared electrodes Tc has a shape in which the Y-direction width thereof is narrowed in the parts intersecting with the detection electrodes Rx, and the Y-direction width thereof is widened in the other parts between the detection electrodes Rx. Corresponding to the shape of the shared electrode Tc, the common electrode COM has a shape in which the Y-direction width thereof in the parts intersecting with the detection electrodes Rx is widened, and the Y-direction width thereof is narrowed in the other parts between the detection electrodes Rx. The shared electrodes Tc and the common electrodes COM mutually adjacent in the Y-direction are formed in the same layer in the Z-direction, juxtaposed with a constant short interval, and electrically separated from each other. A slit corresponding to the above-described short interval is disposed between the shared electrode Tc and the common electrode COM adjacent to each other in the Y-direction, for example, between the shared electrode Tc1 and the common electrode COM_2. Thus, the shared electrode Tc and the common electrode COM adjacent to each other in the Y-direction are electrically separated from each other.

The Y-direction disposing pitch of the plurality of shared electrodes Tc and the plurality of common electrodes COM is constant at the pitch p2, which is the same as that of the embodiment 1A. The disposing pitch of the shared electrode Tc and the common electrode COM adjacent to each other in the Y-direction is constant at the pitch p1, which is the same as that of the embodiment 1A.

The X-direction disposing pitch of the plurality of detection electrodes Rx is the same as the pitch p3 of the embodiment 1A. In the second embodiment, the plurality of detection electrodes Rx have shapes in which the every single detection electrode Rx connected to the touch detection part 60 or the wiring 22 is branched into two thin line portions in the screen area AG. The X-direction disposing pitch of the two thin line portions of the single detection electrode Rx is a pitch p4, which is ½ with respect to the pitch p3 of the detection electrodes Rx. In the second embodiment, the plurality of thin line portions of the detection electrodes Rx of the screen area AG are disposed at the constant pitch p4.

FIG. 21 shows an enlarged view showing details of the configuration of the electrodes of FIG. 20. Each of the shared electrodes Tc has thin line portions 71 and protruding electrode portions 72. The thin line portion 71 is an electrode portion extending in the X-direction and has a width h1. The thin line portion 71 is an electrode portion narrowed to correspond to the configuration in which the area of the intersecting portions c1 of the shared electrodes Tc and the detection electrodes Rx is small. The protruding electrode portion 72 includes a rectangular electrode portion protruding to the Y-direction upper/lower both sides from the thin line portion 71. A region r1 represents a rectangular region including the thin line portion 71 and the protruding electrode portion 72 of the shared electrode Tc. The protruding electrode portion 72 is an electrode portion widened to correspond to the configuration in which the area of the region r1 corresponding to the location in which the capacity serving as the unit of detection U is formed is large. Since the area of the intersecting portions c1 is small, the loads in the vicinities of the intersecting portions c1 are low.

Corresponding to the shape of the shared electrode Tc, the common electrode COM has a thin line portion 41 and protruding electrode portions 42. The thin line portion 41 is an electrode portion formed by a thin line extending in the X-direction and has a width h5. The thin line portion 41 is an electrode portion narrowed to correspond to the configuration in which the areas of the protruding electrode portion 72 and the region r1 of the shared electrode Tc are large. The protruding electrode portion 42 includes a rectangular electrode portion protruding to the Y-direction upper/lower both sides from the thin line portion 41. A region r2 represents a rectangular region including the thin line portion 41 and the protruding electrode portion 42 of the common electrode COM. The region r2 corresponds to the intersecting portion c2 in which the common electrode COM and the detection electrode Rx are overlapped with each other in the Z-direction. The protruding electrode portion 42 is an electrode portion corresponding to the configuration in which the area of the intersecting portion c2 of the common electrode COM and the detection electrode Rx is large. The area of the intersecting portion c2 is large compared with the area of the intersecting portion c1; however, since the common electrode COM is controlled to, for example, the electric potential using the above-described voltage Vcom, the load in the vicinity of the intersecting portion c2 is low.

Regarding the intersecting portion c1 of the shared electrode Tc and the detection electrode Rx, the Y-direction width h1 of the thin line portion 71 of the shared electrode Tc is smaller than the width ht of the shared electrode Tc of the embodiment 1A. The Y-direction width h2 of the region r1 including the protruding electrode portion 72 of the shared electrode Tc is large compared with the width ht of the shared electrode Tc of the embodiment 1A. The relation of the widths is: h1<ht<h2.

Regarding the intersecting portion c2 of the common electrode COM and the detection electrode Rx, the Y-direction width h4 of the region r2 of the region r2 including the thin line portion 41 and the protruding electrode portion 42 of the common electrode COM is larger than the width hc of the common electrode COM of the embodiment 1A. The Y-direction width h5 of the thin line portion 41 of the common electrode COM is smaller than the width hc of the common electrode COM of the embodiment 1A. The relation of the widths is: h5<hc<h4.

In the second embodiment, the detection electrode Rx has the shape in which the single thin line portion 80 is branched into a thin line portion 81 and a thin line portion 82, which are two thin line portions in the screen area AG. In the region between the thin line portion 81 and the thin line portion 82, which are two thin line portions of the detection electrode Rx, in the X-direction, the regions r1 including the protruding electrode portions 72 of the shared electrodes Tc are disposed, and the units of detection U corresponding to the capacitors formed by the intersections of the shared electrodes Tc and the detection electrodes Rx are formed. The second embodiment has a configuration in which the area of the region r1 is as large as possible since the Y-direction width h2 and the X-direction width h3 of the region r1 of the shared electrode Tc between the thin line portions of the detection electrode Rx are large. By virtue of the present configuration, the touch detection sensitivity of the units of detection U formed by the capacitors formed to correspond to the regions r1 and the intersecting portions c1 can be increased. The electric fields formed to correspond to the unit of detection U and the region r1 include the electric fields generated between the region r1 including the protruding electrode portion 72 of the shared electrode Tc in the Z-direction lower side and the thin line portion 81 and the thin line portion 82 of the detection electrode Rx in the Z-direction upper side.

The X-direction width h3 of the protruding electrode portion 72 and the region r1 of the shared electrode Tc is substantially the same as the distance between the thin line portion 81 and the thin line portion 82, which are the two thin line portions of the detection electrode Rx. The X-direction width of the thin line portion 71 of the shared electrode Tc and the X-direction width h6 of the protruding electrode portion 42 of the common electrode COM are substantially the same as the width of the thin line portion 81 and the thin line portion 82 of the detection electrode Rx.

The unit of detection U in the touch detection area As of the second embodiment is formed to correspond to the region r1 of the shared electrode Tc between the thin line portion 81 and the thin line portion 82, which are the thin line portions branched into two from the single thin line portion 80 at the center of the detection electrode Rx in the screen area AG. Electric fields are generated between the first-side thin line portion 81 of the detection electrode Rx and the regions r1 of the shared electrode Tc on both the X-direction left/right sides. Moreover, electric fields are generated between the second-side thin line portion 82 of the detection electrode Rx and the regions r1 of the shared electrode Tc in the X-direction left/right both sides. The capacitors corresponding to the units of detection U are formed by these electric fields.

In the panel unit 5 of the second embodiment, the sizes and ratios of the electrode portions such as the width h1 to the width h6, etc. in the configuration of the above-described electrode shapes are designed. As a result, the loads of the paths including the capacitors of the units of detection U are reduced to predetermined loads, and the touch detection sensitivity of the capacitors of the units of detection U is configured to be equal to or higher than predetermined sensitivity.

The configuration of the electrode shapes of the panel unit 5 of the above-described second embodiment is preferred to be a configuration in which Y-direction edges of the shared electrodes Tc and the common electrodes COM match, as much as possible, Y-direction edges of the pixels of the display area Ad or the electrodes constituting the pixels.

Note that "2101" of FIG. 21 shows examples of the positions of the slits disposed between the shared electrodes Tc and the common electrodes COM, which are adjacent to each other. The slits include slit parts extending in the X-direction and slit parts extending in the Y-direction to correspond to the shapes of the shared electrodes Tc and the common electrodes COM. The slit has the shape in which a slit part extending in the X direction and a slit part extending in the Y-direction to correspond to the shape of the protruding electrode portion 72 of the shared electrode Tc are alternately connected.

[Electric Fields]

FIG. 22 includes diagrams (a) to (c) showing states of generation of electric fields corresponding to the electrode configuration of FIG. 20 of the second embodiment. The diagram (a) in FIG. 22 shows part of the shared electrodes Tc and the common electrodes COM of FIG. 20. The diagram (b) in FIG. 22 shows the state of the electric fields in the XZ cross section of a line g1-g2 of the diagram (a) in FIG. 22. This cross section is a cross section corresponding to the position of the thin line portion 71 of the shared electrode Tc. Many electric force lines are generated between the rectangular region r1 including the thin line portion 71 of the shared electrode Tc and the thin line portion 81 and the thin line portion 82 of the detection electrode Rx, which are in the Z-direction upper side thereof and in the X-direction left/right sides; therefore, the touch detection sensitivity of the units of detection U corresponding to the regions r1 is increased.

The diagram (c) in FIG. 22 shows the state of the electric fields in the XZ cross section of a line g3-g4 of FIG. 22A. This cross section is a cross section corresponding to the positions of the protruding electrode portions 72 of the shared electrode Tc and the protruding electrode portions 42 of the common electrode COM. In the same manner as the diagram (b) in FIG. 22, in the diagram (c) in FIG. 22, many electric force lines are generated between the rectangular regions r1 including the protruding electrode portions 72 of the shared electrode Tc and the thin line portion 81 and the thin line portion 82 of the detection electrode Rx, which are in the Z-direction upper side and in the X-direction left/right sides; therefore, the touch detection sensitivity at the units of detection U corresponding to the regions r1 is increased.

[Effects, Etc.]

As described above, according to the touch-sensor-equipped display device 1 of the second embodiment, the loads in the paths including the capacitors formed by the intersections of the shared electrodes Tc and the detection electrodes Rx can be reduced. The touch drive time and the touch detection period can be shortened by reducing the loads. Moreover, according to the second embodiment, together with shortening of the touch drive time and the touch detection period, touch detection sensitivity can be maintained or improved by making arrangements in the electrode shapes.

Modification Examples

The second embodiment can adopt the following modification examples. First, the shape of the shared electrodes Tc of FIG. 20 is not limited to the shape having the protruding electrode portions 72 in the Y-direction upper/lower both sides from the thin line portion 71, but may be a shape having the protruding electrode portions 72 only in the Y-direction upper/lower one side.

Moreover, the detection electrode Rx is not limited to have the shape in which the single thin line portion 80 is branched into the two thin line portions, but may have a closed frame shape having an opening portion, in which terminal ends of the branched thin line portions are mutually connected. As well as the embodiment 1A, the plurality of detection electrodes Rx may be formed of a plurality of parallel thin lines, which are not branched. In that case, the thin line portions 71 of the shared electrodes Tc and the protruding electrode portions 42 of the common electrodes COM are provided to correspond to the positions where the thin lines of the detection electrodes Rx are present.

Moreover, the second embodiment can adopt other modification examples in the same manner to the modification examples of the embodiment 1A shown in above-described FIGS. 30A and 30B. More specifically, the detection electrode Rx may have X-direction protruding electrode portions. The protruding electrode portions are preferred to be provided at positions overlapped with, from the Z-direction upper side, the thin line portions 41 of the common electrodes COM.

Third Embodiment

By using FIG. 23 to FIG. 28, the touch-sensor-equipped display device 1 of the third embodiment of the present invention will be explained. The third embodiment has a configuration in which further arrangements are made in the electrode shapes of the panel unit 5 of the first embodiment and the second embodiment as shown in FIG. 23, etc. By virtue of the present configurations, the third embodiment reduces the loads of the above-described paths including the shared electrodes Tc, the units of detection U, and the detection electrodes Rx and increases the touch detection sensitivity of the units of detection U.

[Electrode Configuration of Screen Area]

Figure 23:
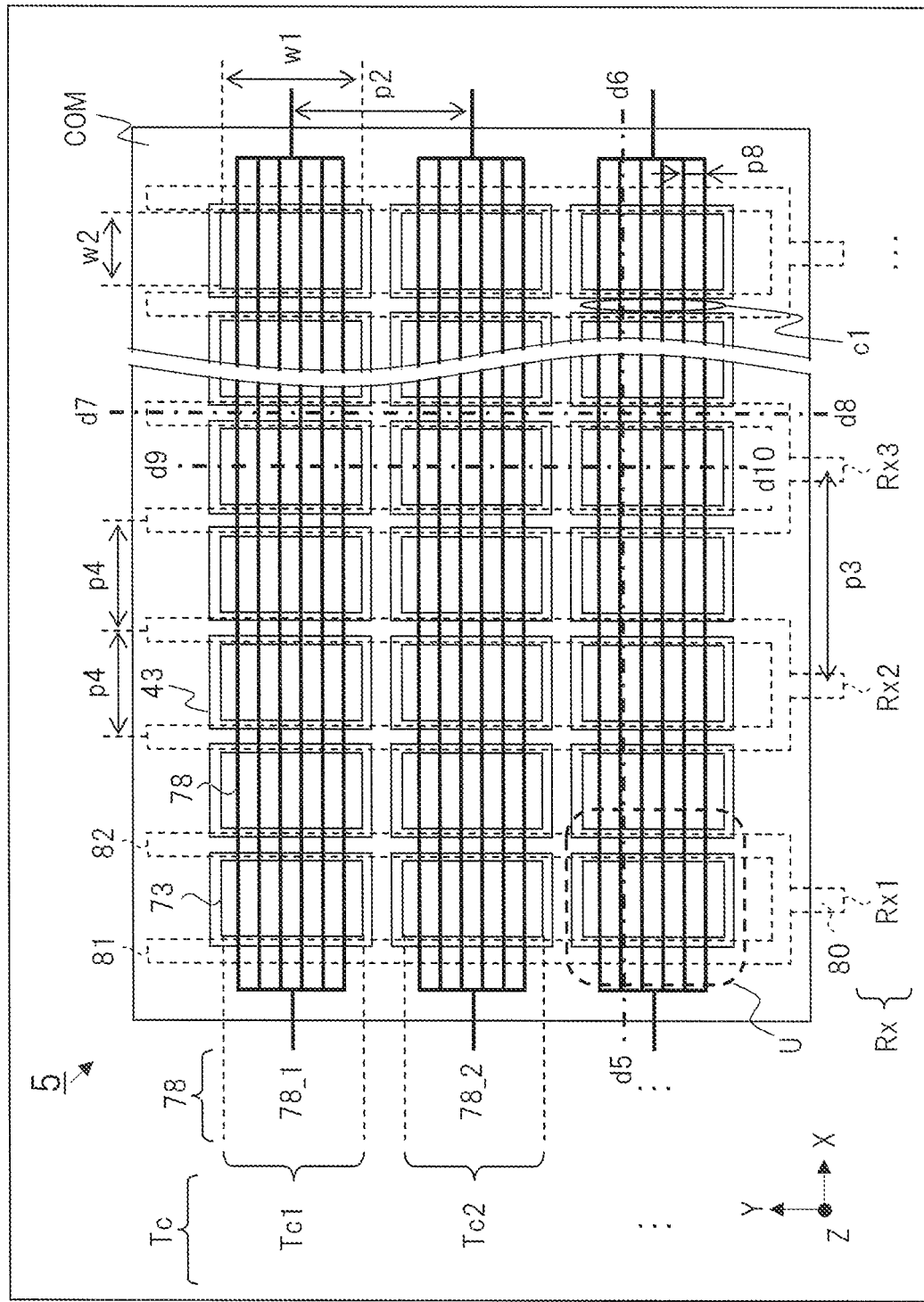
FIG. 23 is a drawing showing a configuration of an XY-plane of electrodes of a screen area in a touch-sensor-equipped display device of a third embodiment of the present invention.

FIG. 23 shows a configuration of an XY-plane of the electrodes of the screen area AG in the panel unit 5 of the touch-sensor-equipped display device 1 of the third embodiment. FIG. 23 particularly shows the configuration of the shared electrodes Tc and the common electrodes COM in the TFT substrate 11 side by solid lines and shows the configuration of the detection electrodes Rx in the color filter board 12 side by broken lines.

In the configuration of the panel unit 5 of the third embodiment, first, the detection electrodes Rx are similar to the configuration of the detection electrodes Rx of the second embodiment. In the third embodiment, each of the plurality of shared electrodes Tc has a plurality of rectangular electrode portions 73, which are separated from each other and juxtaposed in the X direction, and a plurality of metal wirings 78, which are coupled to the electrode portions 73. In the third embodiment, corresponding to the configuration of the electrode portions 73 of the shared electrodes Tc, the plurality of common electrodes COM are formed as a common electrode COM having an integrated shape in the screen area AG having a plurality of opening portions 43 juxtaposed in the X-direction and the Y-direction.

As arrangements of the electrode shapes with respect to the configuration of the second embodiment, the panel unit 5 of the third embodiment has a configuration in which the area of the intersecting portion c1 of the shared electrode Tc and the detection electrode Rx is further small. As this configuration, the shared electrodes Tc eliminates the thin line portions 71 of above-described FIG. 21, which are the parts intersecting with the detection electrodes Rx, and connect the parts in the Y-direction by the protruding electrode portions 42 of the above-described common electrodes COM. Thus, the shared electrode Tc of the third embodiment has the configuration in which it is separated into the plurality of rectangular electrode portions 73 juxtaposed in the X-direction. The electrode portions 73 are provided at the positions between the mutually adjacent thin line portions of the detection electrodes Rx, which are the positions not intersecting with the thin line portions of the detection electrodes Rx. The electrode portions 73 are disposed like islands in the rectangular opening portions 43 of the common electrode COM with short intervals, and the electrode portions 73 and the common electrode COM are electrically separated from each other. Between the electrode portions 73 and the common electrode COM, slits corresponding to the above-described short intervals are disposed. Therefore, the electrode portions 73 and the common electrode COM are electrically separated from each other.

The plurality of electrode portions 73 of the shared electrodes Tc are formed of a visible-light-permeable electrically conductive material such as ITO. The Y-direction disposing pitch of the electrode portions 73 of the plurality of shared electrodes Tc is the same as and constant at the pitch p2 of the second embodiment. The X-direction disposing pitch of the plurality of electrode portions 73 is the same as and constant at the pitch p4 of the disposition of the thin line portion 81 and the thin line portion 82 of the detection electrode Rx. The electrode portion 73 has a Y-direction width of w1 and an X-direction width of w2. The Y-direction width w1 of the electrode portion 73 is, for example, the same as the width h2 of the rectangular region r1 of the second embodiment. The X-direction width w2 of the electrode portion 73 is substantially the same as the distance between the thin line portion 81 and the thin line portion 82 of the detection electrode 81 and the width h3 of the region r1 of the second embodiment.

As the arrangements in the electrode shapes, the panel unit 5 of the third embodiment has a configuration in which, in the intersecting portion c1 of the shared electrode Tc and the detection electrode Rx, a thin line portion of the common electrode COM is disposed to be separated from the electrode portion 73, and the metal wirings 78 are provided. Thus, in the configuration, the intersecting portion c1 is narrowed, and the area of the intersecting portion c1 is small. The metal wirings 78 are formed of a metal material having a lower resistance than that of, for example, ITO. The metal wiring 78 is formed of the metal wiring 78 branched into a plurality of wirings, for example, into six wirings parallel to the X direction for each of the shared electrodes Tc in the screen area AG. Each of the plurality of metal wirings 78 is a thin wiring. The Y-direction disposing pitch of the plurality of metal wirings 78 of each shared electrode Tc is constant at p8. The plurality of metal wirings 78 of each shared electrode Tc are formed in the range of the Y-direction width w1 of the electrode portion 73.

The metal wirings 78 couple the plurality of rectangular electrode portions 73 of the shared electrode Tc in the X-direction. The electrode portions 73 of the shared electrode Tc and the metal wirings 78 are formed in different layers in the Z-direction as shown in later-described cross-sectional views and are coupled in the Z-direction.

By virtue of the above-described configuration, in the intersecting portions c1 of the shared electrodes Tc and the detection electrodes Rx, only the plurality of metal wirings 78 are present. As a result, in the third embodiment, the area of the intersecting portions c1 of the shared electrodes Tc and the detection electrodes Rx is small, and the vicinities of the intersecting portions c1 have low resistance; therefore, the loads of the above-described paths are low. Moreover, together with the configuration in which only the metal wirings 78 are present in the intersecting portions c1 of the shared electrodes Tc and the detection electrodes Rx, it has the configuration in which the area of the electrode portions 73 disposed in the regions in which the shared electrodes Tc and the detection electrodes Rx are not intersecting with each other is as large as possible. As a result, the touch detection sensitivity at the units of detection U of the capacitors formed to correspond to the electrode portions 73 can be increased.

Figure 24:
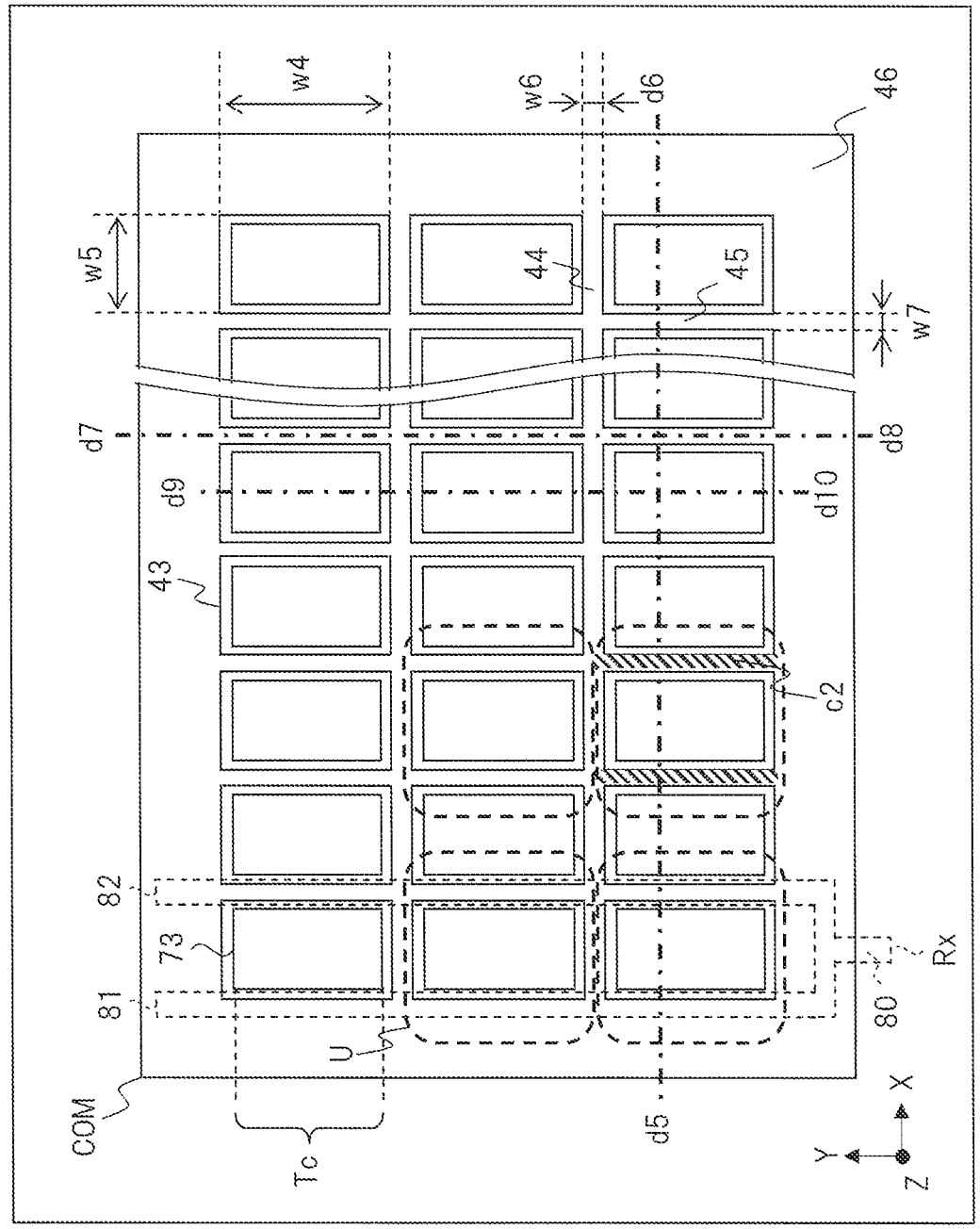
FIG. 24 is a drawing showing a configuration of an XY-plane of common electrodes according to the third embodiment.

FIG. 24 shows a configuration of the XY-plane of the common electrode COM, etc. as a state in which the metal wirings 78 of FIG. 23 are eliminated. The common electrode COM has the plurality of rectangular opening portions 43 juxtaposed in the X-direction and the Y-direction, thin line portions 44 extending in the X-direction between the Y-direction opening portions 43, thin line portions 45 extending in the Y-direction between the X-direction opening portions 43, and an outer peripheral part 46 provided to correspond to an outer peripheral part of the screen area AG. The plurality of rectangular opening portions 43 are provided to correspond to the X-direction and Y-direction disposed positions of the plurality of electrode portions 73. The Y-direction width w4 of the opening portion 43 is larger than the width w1 of the electrode portion 73 by a distance corresponding to the slit. An X-direction width w5 of the opening portion 43 is larger than the width w2 of the electrode portion 73 by a distance corresponding to the slit.

The width of the X-direction thin line portion 44 is w6. The width of the Y-direction thin line portion 45 is w7. The width w6 of the thin line portion 44 and the width w7 of the thin line portion 45 are substantially the same as the width of the thin line portion of the detection electrode Rx. The intersecting portion c2 formed by Z-direction overlapping of the common electrode COM and the detection electrode Rx corresponds to a region of the thin line portion 45.

The X-direction thin line portion 44 of the common electrode COM is provided to correspond to the configuration in which the area of the electrode portions 73 of the shared electrodes Tc is as large as possible. The Y-direction thin line portions 45 of the common electrodes COM are provided to correspond to the configuration in which the area of the intersecting portions c1 of the shared electrodes c1 and the detection electrodes Rx is reduced, and the area of the intersecting portions c2 of the common electrode COM and the detection electrodes Rx is large. By virtue of this configuration, loads in the vicinities of the intersecting portions c2 are low.

The capacity which serves as the unit of detection U in the third embodiment is formed to correspond to a position between the thin liner part 81 and the thin line portion 82, which are branched into two from the single thin line portion 80 of the detection electrode Rx in the screen area AG. In the vicinities of the intersecting portion c1 of the shared electrode Tc and the detection electrode Rx, electric fields are generated between the electrode portion 73 of the shared electrode Tc in the Z-direction lower side and the thin line portion 81 and the thin line portion 82 of the detection electrode Rx in the Z-direction upper side.

In the panel unit 5 of the third embodiment, the sizes and ratios of the electrode portions such as the width w1, the width w7, etc. are designed in the configuration of the above-described electrode shapes. As a result, the loads of the paths including the capacitors of the units of detection are reduced to predetermined loads, and the touch detection sensitivity of the capacitors of the units of detection U are configured to be equal to or higher than predetermined sensitivity.

[Cross-Sectional Configuration of Panel Unit]

Figure 25:
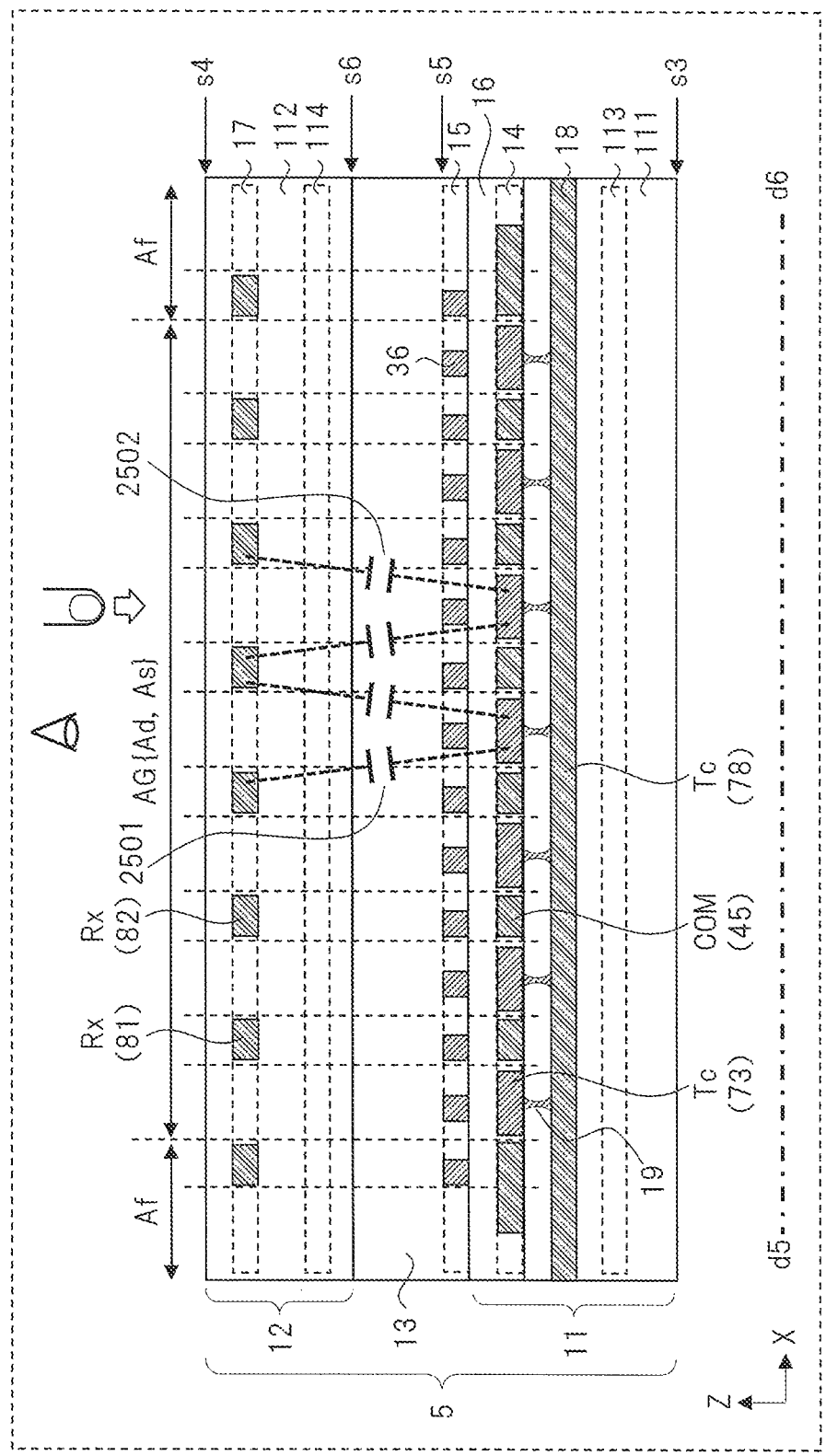
FIG. 25 is a drawing showing a configuration of a schematic XZ cross section of a panel unit of the third embodiment corresponding to a line d5-d6 of FIG. 23.

FIG. 25 shows a cross section corresponding to a line d5-d6 of FIG. 23 and FIG. 24 as an XZ cross section of the panel unit 5 of the third embodiment. This cross section particularly shows a cross section of a location where the metal wirings 78 are present. The configuration of this cross section has an electrode layer 14, a metal wiring layer 18, contact connecting portions 19, etc. as elements different from the cross section of the panel unit 5 of the above-described first embodiment.

The electrode layer 14 is a layer in which the electrode portions 73 of the shared electrodes Tc and the common electrode COM are formed of, for example, ITO. In the cross section of FIG. 25, in the electrode layer 14, the electrode portions 73 of the shared electrode Tc and the thin line portions 45 of the common electrode COM are alternately disposed in the X-direction.

The metal wiring layer 18 is a layer in which the metal wirings 78 are formed. The metal wirings 78 of the metal wiring layer 18 and the plurality of electrode portions 73 of the shared electrodes Tc of the electrode layer 14 in the Z-direction upper side thereof are coupled to each other by the contact connecting portions 19. In an insulating layer between the metal wiring layer 18 and the electrode layer 14, the plurality of contact connecting portions 19 of an electrically conductive material are provided.

"2501" and "2502" show images of the capacitors formed between the electrode portions 73 of the shared electrode Tc and the thin line portions 81 and the thin line portions 82 of the detection electrodes Rx. The capacitors corresponding to the above-described units of detection U are formed by the capacity 2501 and the capacity 2502.

As shown in the cross section of FIG. 25, the electrodes such as the shared electrodes Tc, the common electrode COM, and the detection electrodes Rx and electrodes such as the pixel electrodes 36 constituting the pixels and unshown gate lines GL and source lines SL are preferred to be formed so that the edges thereof extending in the Y-direction mutually match in the Z-direction as much as possible.

Figure 26:
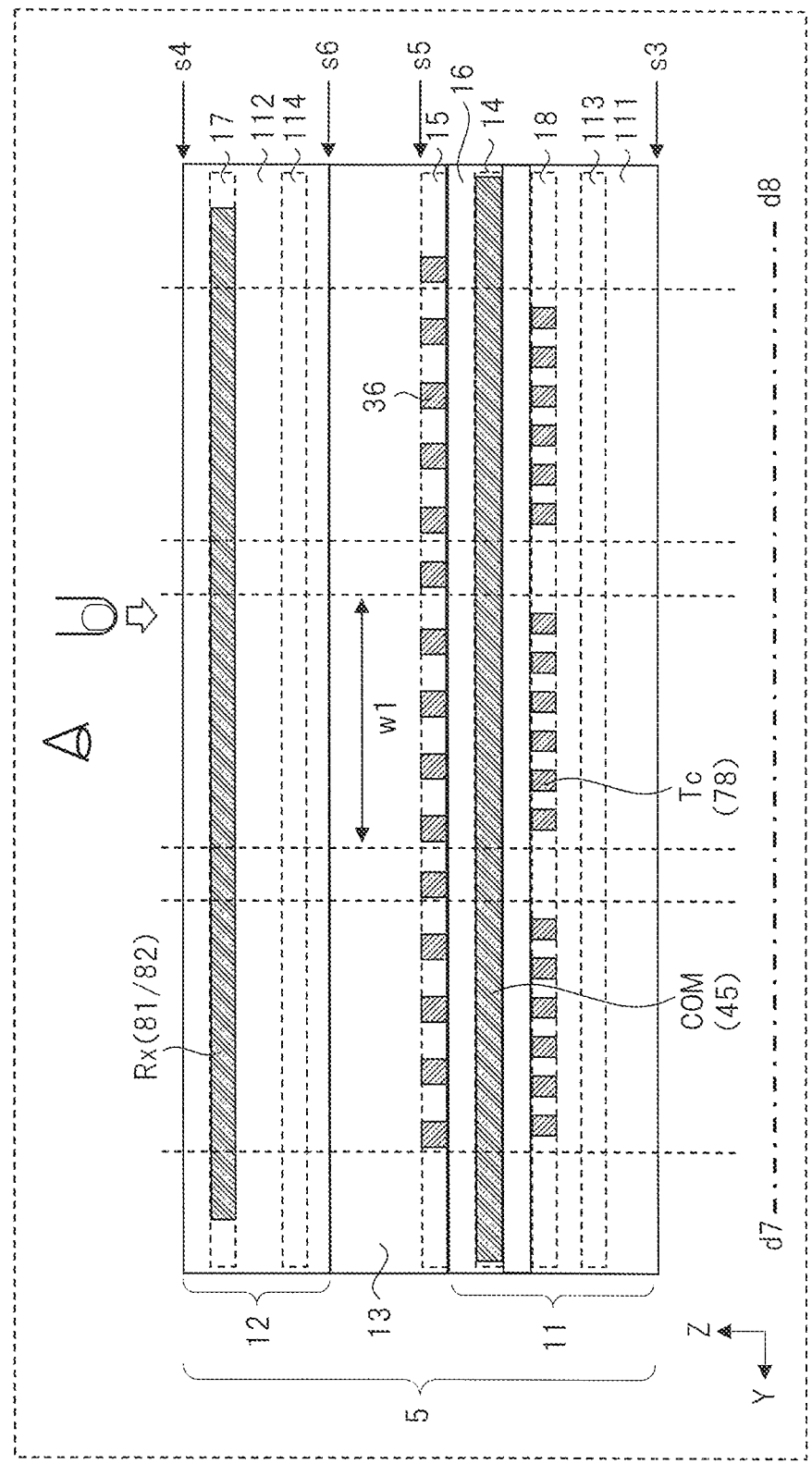
FIG. 26 is a drawing showing a configuration of a schematic YZ cross section of the panel unit of the third embodiment corresponding to a line d7-d8 of FIG. 23.

FIG. 26 shows a cross section corresponding to a line d7-d8 of FIG. 23 and FIG. 24 as a YZ cross section of the panel unit 5 of the third embodiment. This cross section particularly shows the cross section of the location in which the thin line portion 81 or the thin line portion 82 of the detection electrode Rx and the thin line portion 45 of the common electrode COM are present. The electrode layer 14 has the thin line portion 45 of the common electrode COM. In the metal wiring layer 18, the plurality of, for example, six metal wirings 78 are formed in every width w1 corresponding to the electrode portion 73 of the shared electrode Tc.

Figure 27:
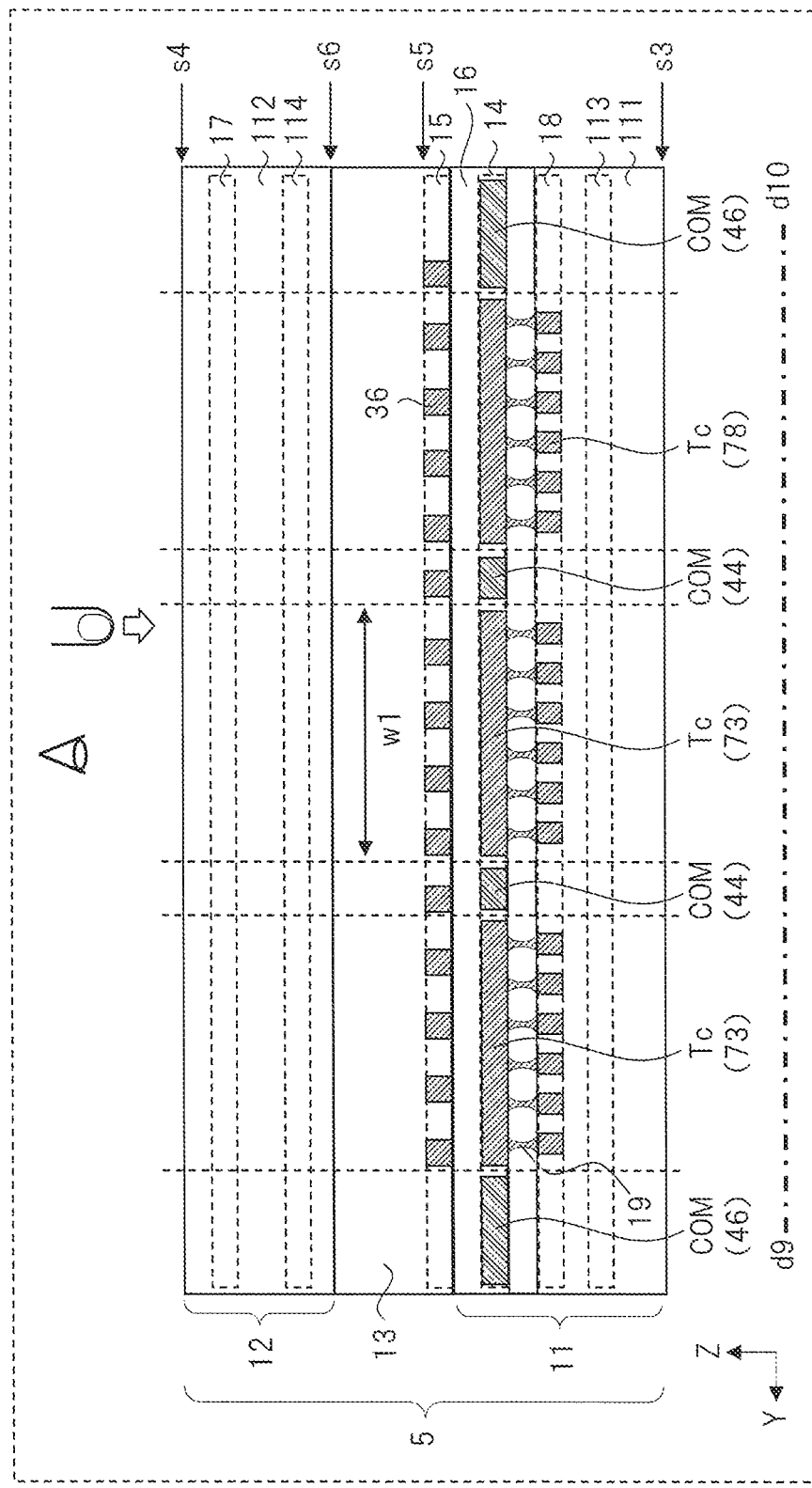
FIG. 27 is a drawing showing a configuration of a schematic YZ cross section of the panel unit of the third embodiment corresponding to a line d9-d10 of FIG. 23.

FIG. 27 shows a cross section corresponding to a line d9-d10 of FIG. 23 and FIG. 24 as a YZ cross section of the panel unit 5 of the third embodiment. This cross section particularly shows a cross section of a location where the electrode portions 73 of the shared electrodes Tc and the thin line portions 44 of the common electrode COM are present. In the electrode layer 14, the electrode portions 73 of the shared electrodes Tc and the thin line portions 44 of the common electrodes COM are alternately disposed in the Y-direction. In the outer peripheral part of the screen area AG, the outer peripheral part 46 of the common electrode COM is disposed. In the metal wiring layer 18, the plurality of metal wirings 78 are formed for every width w1 corresponding to the shared electrode Tc, and the plurality of metal wirings 78 and the electrode portions 73 are coupled to each other by the plurality of contact connecting portions 19, respectively.

In the third embodiment, the configuration in which the common electrode COM and the electrode portions 73 are provided in the Z-direction upper side of the metal wirings 78 has been explained; however, the present invention is not limited thereto. In the panel unit 5 of the present invention, the metal wirings 78 may be disposed in the Z-direction upper side of the common electrode COM and the electrode portions 73. For example, in FIG. 25, etc., the Z-direction positions of the electrode layer 14 and the metal wiring layer 18 may be configured to be reversed. In the configuration in which the metal wirings 78 are disposed in the Z-direction upper side of the common electrode COM and the electrode portion 73, the widths of the thin lines of the metal wirings 78 are preferred to be as small as possible.

[Electric Fields]

Figure 28:
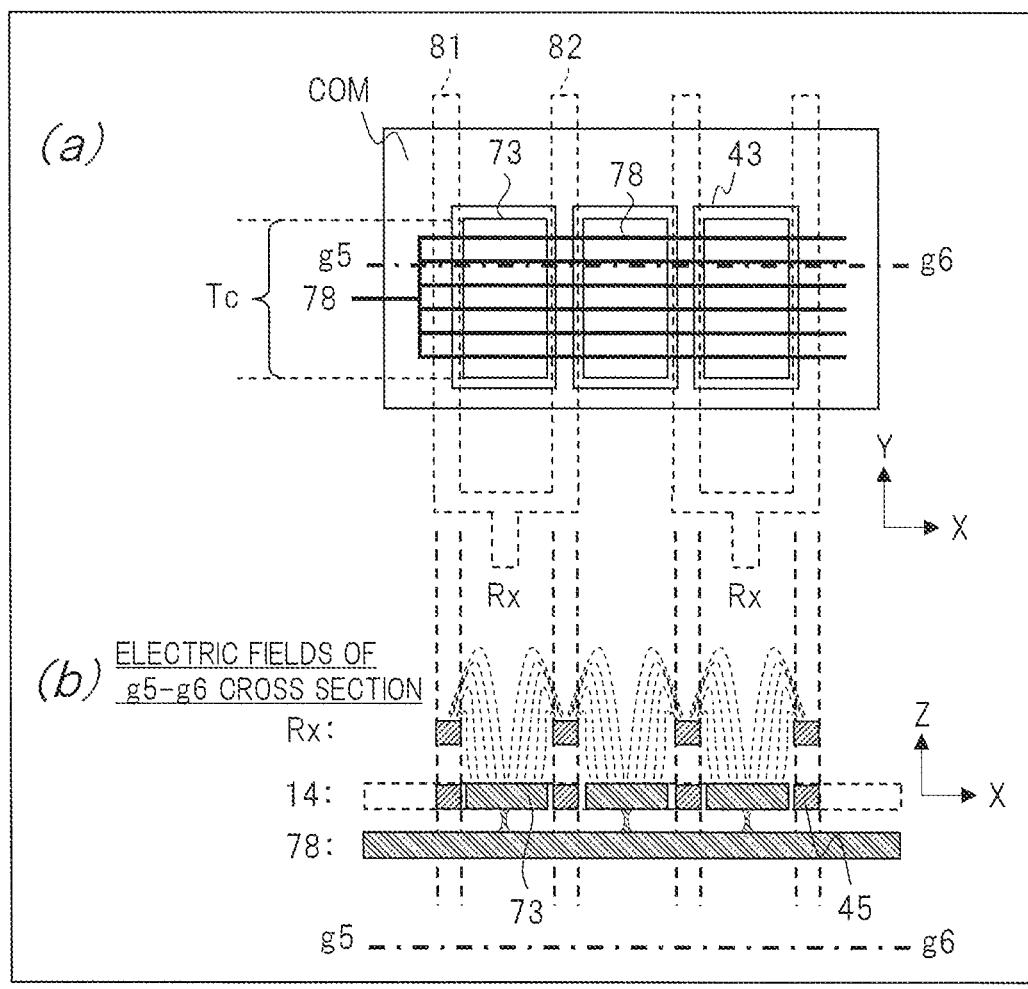
FIG. 28 includes diagrams (a) and (b) showing states of generation of electric fields corresponding to the electrode configuration of FIG. 23.

FIG. 28 includes diagrams (a) and (b) showing a state of generation of electric fields corresponding to the electrode configuration of FIG. 23 of the third embodiment. The diagram (a) in FIG. 28 shows part of the shared electrodes Tc and the common electrode COM of FIG. 23. The diagram (b) in FIG. 28 shows the state of the electric fields in the XZ cross section of the line g5-g6 of the diagram (a) in FIG. 28. This cross section is a cross section corresponding to the positions of the electrode portions 73 of the shared electrode Tc and the metal wirings 78. Many electric force lines are generated between the electrode portion 73, which is connected to the metal wirings 78 of the shared electrode Tc in the Z-direction lower side, and the thin line portion 81 and the thin line portion 82 of the detection electrode Rx in the X-direction left/right sides in the Z-direction upper side; therefore, the touch detection sensitivity at the units of detection U formed by the capacitors formed to correspond to the electrode portions 73 is increased.

[Effects, Etc.]

As described above, according to the touch-sensor-equipped display device 1 of the third embodiment, the loads at the paths including the capacitors formed by the intersections of the shared electrodes Tc and the detection electrodes Rx can be reduced. The touch drive time and the touch detection period can be shortened by reducing the loads. Moreover, according to the third embodiment, together with shortening of the touch drive time and the touch detection period, touch detection sensitivity can be maintained or improved by making arrangements in the electrode shapes.

Modification Examples

The third embodiment can employ below modification examples. The electrode portion 73 of the shared electrode Tc disposed in the opening portion 43 of the common electrode COM between the detection electrodes Rx is not limited to the electrode portion of a single rectangular region, but may be an electrode portion separated into a plurality of regions. As well as the modification examples of the above-described embodiment 1A and the second embodiment, the detection electrode Rx may be provided with an electrode portion protruding to the X-direction. Moreover, the common electrode COM is not limited to the shape integrated into one, but may have a shape divided into a plurality of common electrodes COM in the Y-direction as well as the second embodiment.

Fourth Embodiment

[Electronic Device]

Figure 31A:
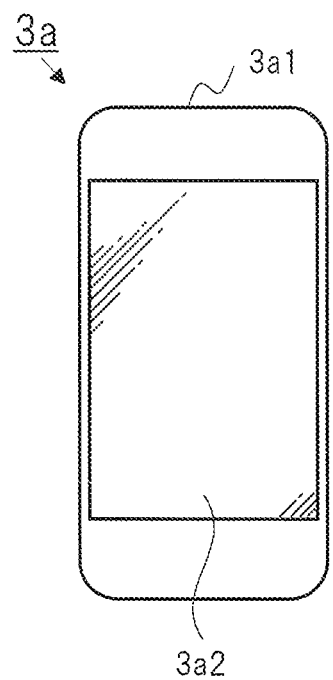
FIG. 31A is a drawings showing an external appearance of cases in which an electronic device of a fourth embodiment is a smartphone.
Figure 31B:
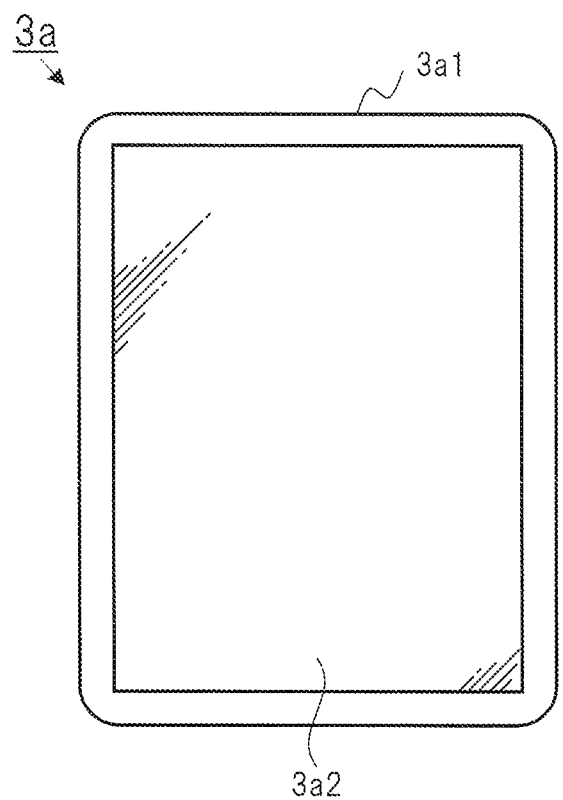
FIG. 31B is a drawings showing an external appearance of cases in which an electronic device of a fourth embodiment is a tablet terminal.

FIG. 31A to FIG. 36 show configurations of an electronic device of a fourth embodiment, which are application examples of the electronic device 3 of the first embodiment to the third embodiment. An electronic device 3*a* of FIG. 31A shows an example of a schematic external appearance shape of a case of a smartphone. An electronic device 3*a* of FIG. 31B shows an example of a schematic external appearance shape of a case of a tablet terminal. A chassis 3*a*1 of the electronic device 3*a* of FIG. 31A or FIG. 31B has a region 3*a*2 corresponding to the above-described screen area AG.

Figures 32A, 32B:
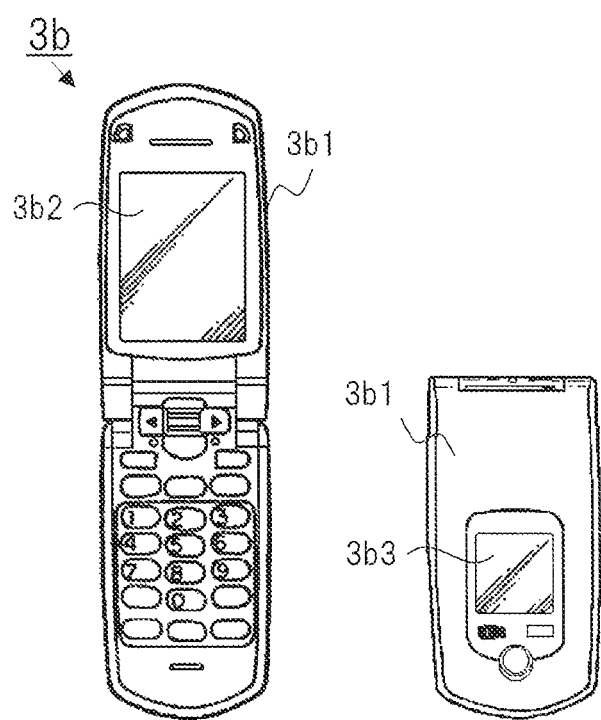
FIG. 32A is a drawing showing an external appearance of a case in which the electronic device of the fourth embodiment is a mobile phone.
FIG. 32B is a drawing showing an external appearance of a case in which the electronic device of the fourth embodiment is the mobile phone.

An electronic device 3*b* of FIG. 32 shows an example of an external appearance shape of a case of a mobile phone. FIG. 32A and FIG. 32B show a state before and after a chassis 3b1 of the electronic device 3b is folded. The chassis 3b1 of the electronic device 3b of FIG. 32A has a region 3b2 corresponding to the above-described screen area AG in the inner surface side thereof. The folded chassis 3b1 of FIG. 32B has a region 3b3 corresponding to the above-described screen area AG on the outer surface side thereof.

Figure 33:
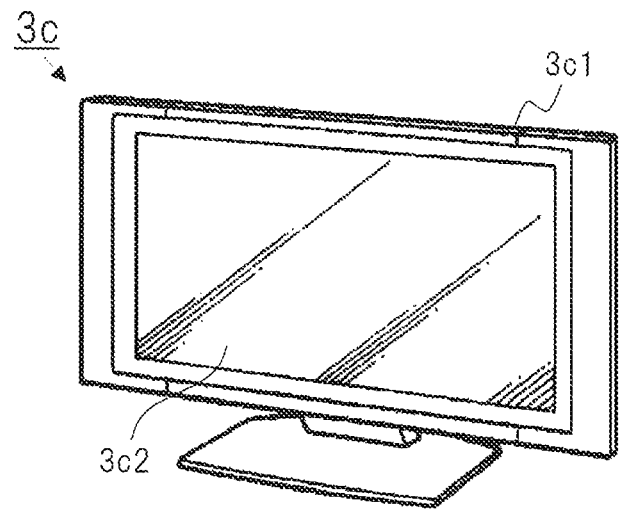
FIG. 33 is a drawing showing an external appearance of a case in which the electronic device of the fourth embodiment is a television device.
Figure 34:
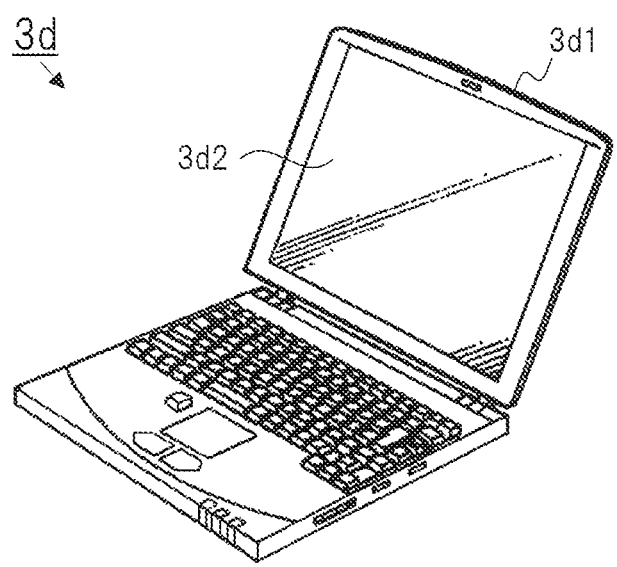
FIG. 34 is a drawing showing an external appearance of a case in which the electronic device of the fourth embodiment is a notebook PC.

An electronic device 3c of FIG. 33 shows an example of an external appearance shape of a case of a television device. A chassis 3c1 of the electronic device 3c has a region 3c2 corresponding to the above-described screen area AG. An electronic device 3d of FIG. 34 shows an example of an external appearance shape of a case of a notebook PC. A foldable chassis 3d1 of the electronic device 3d has a region 3d2 corresponding to the above-described screen area AG on a surface in the display side thereof.

Figure 35:
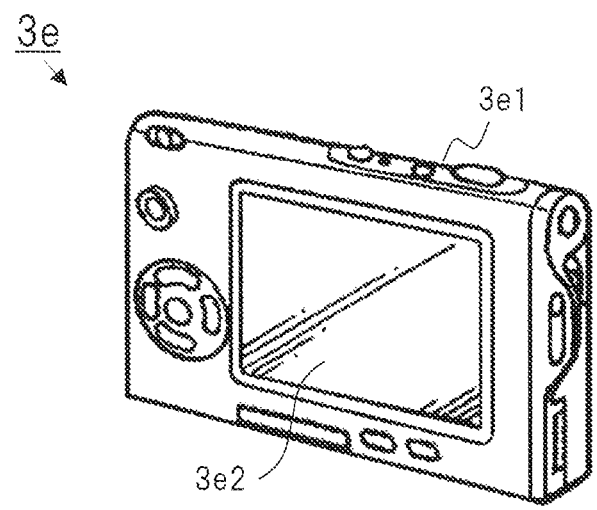
FIG. 35 is a drawing showing an external appearance of a case in which the electronic device of the fourth embodiment is a digital camera.
Figure 36:
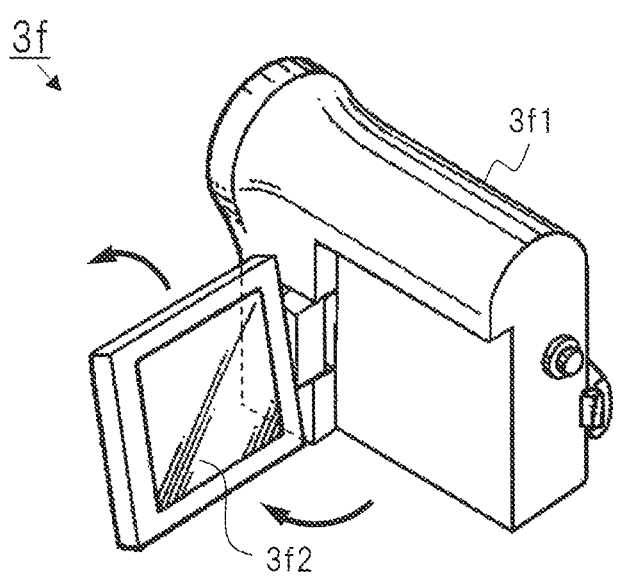
FIG. 36 is a drawing showing an external appearance of a case in which the electronic device of the fourth embodiment is a digital video camera.

An electronic device 3e of FIG. 35 shows an example of an external appearance shape of a case of a digital camera. A chassis 3e1 of the electronic device 3e has a region 3e2 corresponding to the above-described screen area AG on a surface thereof in a monitor side. An electronic device 3f of FIG. 36 shows an example of an external appearance shape of a case of a digital video camera. A chassis 3f1 of the electronic device 3f has a region 3f2 corresponding to the above-described screen area AG on a surface in a monitor side when an openable/closable part thereof is opened to the outer side.

<Effects, Etc.>

As described above, according to the embodiments, by virtue of the configurations, etc. of the arrangements of the electrode shapes, the loads in the paths including the capacitors formed by the intersections of the shared electrodes Tc and the detection electrodes Rx can be reduced. The touch drive time and the touch detection period can be reduced by reducing the loads.

In the foregoing, the invention made by the inventor of the present invention has been concretely described based on the embodiments. As another embodiment, the detection electrode Rx of the embodiment 1A may have a shape in which the single detection electrode Rx is branched into the thin line portion 81 and the thin line portion 82, which are two thin line portions, like the second embodiment, etc. In the second embodiment and the third embodiment, the ratio of the width of the shared electrode Tc and the common electrode COM may be configured like the modification example of FIG. 29 of the embodiment 1A.

As another embodiment, the display device applied to the touch-sensor-equipped display device is not limited to a liquid-crystal display device, and various display devices such as organic EL display devices, plasma display devices, etc. can be also applied. In the above-described embodiments, the cases applied to the liquid-crystal display device having the liquid crystal layer 13 as the display function layer have been explained; however, a display device having a different display function layer can be applied. For example, in an organic EL display device having an organic EL layer as a display function layer, when the configuration of the shared electrodes Tc, the common electrodes COM, etc. and the configuration of the circuit unit 6 similar to those of the above-described embodiments are applied, a touch-sensor-equipped organic EL display device can be provided. The material of the glass substrate, etc. constituting the above-described panel unit is not limited to a highly rigid material. When the panel unit is formed of a material having a low rigidity, it can be applied to electronic paper, etc.

The present invention can be utilized in various touch-sensor-equipped display devices, electronic devices, etc.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
   a panel unit including a screen area in which units of detection composing a touch-sensor function and pixels composing a display function are formed in a matrix pattern;
   a plurality of drive electrodes which are formed in the screen area, parallel to a first direction, and configured to be used in both a display mode and a touch detection mode;
   a plurality of common electrodes which are formed in the screen area, parallel to the first direction, and configured to be used in the display mode and not to be used in the touch detection mode, the drive electrodes and the common electrodes are alternately disposed in a second direction intersecting with the first direction; and
   a plurality of detection electrodes which are formed in the screen area, parallel to the second direction, and intersect with the plurality of drive electrodes and the plurality of common electrodes,
   wherein each of the plurality of drive electrodes has
      a thin wiring part extending in the first direction and intersecting with the detection electrode,
      protruding electrode portions protruding from the thin wiring part along the second direction in a region not intersecting with the detection electrode, and
      wherein each of the protruding electrode portions is separated from an edge of corresponding each of the plurality of drive electrodes.

2. The display device according to claim 1, wherein a width of each of the plurality of drive electrodes in the second direction is larger than a width of each of the plurality of detection electrodes in the first direction and is the same as a width of each of the plurality of common electrodes in the second direction.

3. The display device according to claim 1, wherein a width of each of the plurality of drive electrodes in the second direction is larger than a width of the plurality of detection electrodes in the first direction and is smaller than a width of each of the plurality of common electrodes in the second direction.

4. The display device according to claim 1, wherein a width of each of the plurality of drive electrodes in the second direction is larger than a width of each of the plurality of detection electrodes in the first direction and is larger than a width of each of the common electrodes in the second direction.

5. The display device according to claim 1, wherein each of the plurality of common electrodes has
   a thin wiring part extending in the first direction, and
   a protruding electrode portion protruding from the thin wiring part to the second direction in a region intersecting with the detection electrode.

6. The display device according to claim 1, wherein, in the screen area, the plurality of drive electrodes and the plurality of common electrodes are formed in a same layer in a third direction perpendicular to the screen area; and the plurality of drive electrodes are respectively juxtaposed with the plurality of respective common electrodes with a constant interval therebetween.

7. The display device according to claim 1,
wherein the plurality of detection electrodes are disposed at a constant pitch in the first direction; and
each of the plurality of detection electrodes is formed of a thin line portion branched into two in the screen area.

8. The display device according to claim 1,
wherein the plurality of detection electrodes are formed of thin line portions disposed at a constant pitch in the first direction, and
each of the plurality of detection electrodes has, at a position overlapped with the common electrode in a third direction perpendicular to the screen area, a protruding electrode portion protruding in the first direction from the thin line portion extending in the second direction.

\* \* \* \* \*